US011756137B2

(12) United States Patent
Forbes, Jr. et al.

(10) Patent No.: US 11,756,137 B2
(45) Date of Patent: Sep. 12, 2023

(54) SYSTEMS AND METHODS FOR ADVANCED ENERGY SETTLEMENTS, NETWORK-BASED MESSAGING, AND SOFTWARE APPLICATIONS FOR ELECTRIC POWER GRIDS, MICROGRIDS, GRID ELEMENTS, AND/OR ELECTRIC POWER NETWORKS

(71) Applicant: Causam Enterprises, Inc., Raleigh, NC (US)

(72) Inventors: Joseph W. Forbes, Jr., Raleigh, NC (US); Nathaniel Taylor Brockman, Mt. Pleasant, SC (US)

(73) Assignee: CAUSAM ENTERPRISES, INC., Raleigh, NC (US)

( * ) Notice: Subject to any disclaimer, the term of this patent is extended or adjusted under 35 U.S.C. 154(b) by 307 days.

(21) Appl. No.: 17/012,692

(22) Filed: Sep. 4, 2020

(65) Prior Publication Data
US 2020/0402185 A1 Dec. 24, 2020

Related U.S. Application Data

(63) Continuation of application No. 14/993,703, filed on Jan. 12, 2016, now Pat. No. 10,769,734.
(Continued)

(51) Int. Cl.
*G06Q 50/06* (2012.01)
*G06Q 30/04* (2012.01)
(Continued)

(52) U.S. Cl.
CPC ........... *G06Q 50/06* (2013.01); *G06Q 20/085* (2013.01); *G06Q 20/102* (2013.01);
(Continued)

(58) Field of Classification Search
CPC .... G06Q 50/06; G06Q 50/085; G06Q 50/102; G06Q 50/145
(Continued)

(56) References Cited

U.S. PATENT DOCUMENTS

| 5,696,695 A | 12/1997 | Ehlers et al. |
| 6,216,956 B1 | 4/2001 | Ehlers et al. |

(Continued)

FOREIGN PATENT DOCUMENTS

| AU | 2010300341 A1 * | 5/2012 | ............. G05B 17/02 |
| CA | 2752094 A1 * | 8/2010 | ............. G06Q 10/06 |

(Continued)

OTHER PUBLICATIONS

Clement-Nyns, Kristien, Edwin Haesen, and Johan Driesen. "The Impact of Vehicle-to-Grid on the Distribution Grid." Electric power systems research 81.1 (2011): 185-192. Web. (Year: 2011).*
(Continued)

*Primary Examiner* — Akiba K Robinson
(74) *Attorney, Agent, or Firm* — NEO IP

(57) ABSTRACT

Systems and methods for advanced energy settlements in electric power grid are proposed. At least one energy customer, at least one retail electric provider and at least one distributed generator connect to an advanced energy settlement platform communicatively. The advanced energy settlement platform is operable to summate a customer balance from all the settlement blocks during a billing period and collect payments from the at least one energy customer automatically; aggregate and settle distributed energy charges with distributed generators and fixed energy charges with the energy retailer or retail energy provider for the at least one energy customer during the billing period. The advanced energy settlement platform also provides interactive graphical user interface for different participants in the
(Continued)

advanced energy settlement and for advanced energy settlements application development kit (ADK) for access to functionality within the advanced energy settlement platform.

20 Claims, 65 Drawing Sheets

Related U.S. Application Data

(60) Provisional application No. 62/102,893, filed on Jan. 13, 2015.

(51) Int. Cl.
  *G06Q 20/14* (2012.01)
  *G06Q 20/08* (2012.01)
  *G06Q 20/10* (2012.01)

(52) U.S. Cl.
  CPC ........... *G06Q 20/145* (2013.01); *G06Q 30/04* (2013.01); *Y04S 50/12* (2013.01)

(58) Field of Classification Search
  USPC .................................. 705/7.11, 1.1, 7.12, 63
  See application file for complete search history.

(56) References Cited

U.S. PATENT DOCUMENTS

| | | | |
|---|---|---|---|
| 6,636,977 | B1 | 10/2003 | Chen |
| 6,900,556 | B2 | 5/2005 | Provanzana et al. |
| 6,978,931 | B2 | 12/2005 | Brobeck |
| 7,274,975 | B2 | 9/2007 | Miller |
| 7,305,282 | B2 | 12/2007 | Chen |
| 7,890,436 | B2 | 2/2011 | Kremen |
| 2003/0160595 | A1 | 8/2003 | Provanzana et al. |
| 2004/0095237 | A1 | 5/2004 | Chen et al. |
| 2004/0117330 | A1 | 6/2004 | Ehlers et al. |
| 2004/0206813 | A1 | 10/2004 | Brobeck |
| 2004/0249775 | A1 | 12/2004 | Chen |
| 2005/0125243 | A1 | 6/2005 | Villalobos |
| 2006/0276938 | A1* | 12/2006 | Miller .................. G06Q 50/06 705/412 |
| 2007/0043478 | A1 | 2/2007 | Ehlers et al. |
| 2007/0213878 | A1 | 9/2007 | Chen |
| 2007/0276547 | A1 | 11/2007 | Miller |
| 2008/0091580 | A1 | 4/2008 | Kremen |
| 2008/0091581 | A1 | 4/2008 | Kremen |
| 2008/0091590 | A1 | 4/2008 | Kremen |
| 2008/0091625 | A1 | 4/2008 | Kremen |
| 2008/0091626 | A1 | 4/2008 | Kremen |
| 2008/0177678 | A1 | 7/2008 | Di Martini et al. |
| 2008/0211481 | A1 | 9/2008 | Chen |
| 2009/0157529 | A1 | 6/2009 | Ehlers et al. |
| 2009/0177548 | A1 | 7/2009 | Eisenlohr |
| 2009/0281932 | A1* | 11/2009 | Axilrod ................ G06Q 20/102 705/40 |
| 2010/0045232 | A1 | 2/2010 | Chen et al. |
| 2010/0076835 | A1 | 3/2010 | Silverman |
| 2011/0208365 | A1 | 8/2011 | Miller |
| 2011/0288905 | A1 | 11/2011 | Mrakas |
| 2012/0271686 | A1 | 10/2012 | Silverman |
| 2013/0339272 | A1 | 12/2013 | Willism |
| 2014/0316876 | A1 | 10/2014 | Silverman |
| 2014/0316973 | A1 | 10/2014 | Steven et al. |
| 2016/0203569 | A1 | 7/2016 | Forbes, Jr. et al. |

FOREIGN PATENT DOCUMENTS

| | | | | |
|---|---|---|---|---|
| CN | 1256465 A | * | 6/2000 | |
| EP | 2752094 B1 | * | 4/2019 | ............. G01S 11/16 |

OTHER PUBLICATIONS

Gopalan, Harish et al. "A Coupled Mesoscale-microscale Framework for Wind Resource Estimation and Farm Aerodynamics." Journal of wind engineering and industrial aerodynamics 132 (2014): 13-26. Web. (Year: 2014).*

United States of America Federal Energy Regulatory Commission (FERC), Order No. 745, "Demand Response Compensation in Organized Wholesale Energy Markets", 134 FERC ¶ 61,187, (issued Mar. 15, 2011) (entire document).

* cited by examiner

EnergyNet Application Development Kit

1. Browser Construction and layout, or provide code!
2. Connectivity with all Real Time Communication
3. Connectivity with all Command and Control
4. Connectivity with all Payments and Settlements
5. Connectivity to 3rd Party SOA Services, Enterprises

EnergyNet Application Developer Kit Login

Username: IntelligentGrid-Demo1
Password:
Login

To create your login, visit www.energynet.us

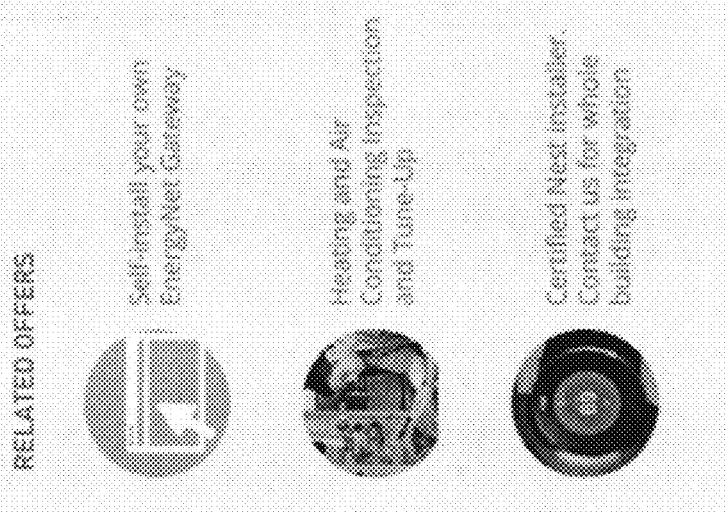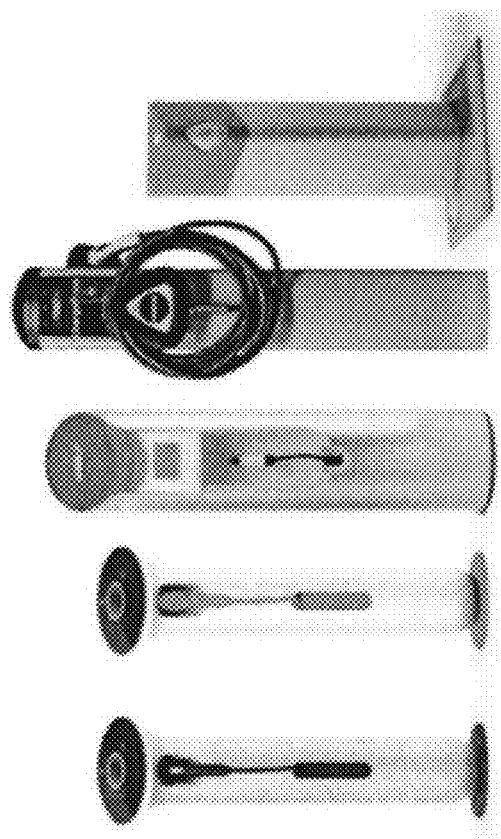
FIG. 28

FIG. 30

Find a Station

1. Locate and reserve stations near you now, in advance, or on your GPS itinerary.
2. Target marketing to user profile and priority
3. "Green" app for people focused on recharging
4. "Urban" app for people focused on reserved parking
5. "Healthy" app for people focused on shopping.

Reserve a Station

1. Browse availability, fees, recharge strength, amenities, and nearby services
2. Book your reservation in advance
3. Pre-purchase one time or with subscription.

Arrive at your Station

1. Simply park your car, receive a push notification call to action
2. Purchase via smartphone device or in vehicle dash display
3. New users sign up by GPS Location, QR, RFID, Video, or EV Charger identification.

Enjoy your Parked Time

1. Vehicle recharging status, fees associated, browse offers, order food
2. Easily top-up or extend reservation
3. Discounts and parking validation is automatic by local retailers and marketers
4. Find my car! Video security monitoring. Enjoy your free WiFi videos and games!

SYSTEMS AND METHODS FOR ADVANCED ENERGY SETTLEMENTS, NETWORK-BASED MESSAGING, AND SOFTWARE APPLICATIONS FOR ELECTRIC POWER GRIDS, MICROGRIDS, GRID ELEMENTS, AND/OR ELECTRIC POWER NETWORKS

CROSS-REFERENCES TO RELATED APPLICATIONS

This application is a continuation of U.S. patent application Ser. No. 14/993,703 filed Jan. 12, 2016, which claims priority from U.S. Provisional Patent Application No. 62/102,893 filed Jan. 13, 2015, each of which is in incorporated herein by reference in its entirety.

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever

BACKGROUND OF THE INVENTION

1. Field of the Invention

The present invention relates to electric power messaging and settlements, and more particularly, to advanced energy settlements, messaging, and applications for electric power supply, load, and/or curtailment and data analytics associated with the same.

2. Description of the Prior Art

Generally, it is known in the prior art to provide electric power systems management including financial settlements and messaging. However, limited information is available to electric power consumers regarding their past, present, and future projected use of power with sufficient details to make informed choices about types of power supply and pricing alternatives. Furthermore, retail electric providers (REPs) in prior art systems and methods have no access to data and analytics to provide optimal pricing for power supply to business and/or residential electricity customers, and do not have the ability to provide advanced energy settlements to provide the lowest pricing for power supplied at predetermined times, due at least in part to costs associated with obtaining power agreements without visibility to the data and analytics that provides reduced risk of capital and performance associated with the supply and demand sides.

Examples of prior art documents include the following:

U.S. Pat. No. 6,978,931 for Energy credit card system by inventor Brobeck issued Dec. 27, 2005 describes a method of providing an energy credit system for providing redeemable energy or mass transit credits to consumers who contribute power to a shared electric power grid, wherein at least some of the consumers have their own local renewable energy source connected to the power grid including the steps of measuring the excess power generated by each consumer's energy source that is fed into the electric power grid, awarding energy credits to each of the consumers in relation to the excess power contributed to the electric power grid by the consumer, allowing each consumer receiving the energy credits to redeem them by acquiring fuel, power, or mass transit tickets from a fuel or power provider or mass transit system, and requiring the operator of the electric power grid to compensate the fuel for energy provided or mass transit system in direct relation to the energy credits redeemed by each consumer. Additionally, it claims recording the credits at an energy brokerage house, requiring the operator of the power grid to compensate the brokerage house for the expenses generated by the consumers, and allowing the brokerage house to retain as profit a portion of the compensation received from the operator of the power grid. See also, US Patent Application Publication No. 20040206813.

U.S. Pat. No. 6,900,556 by Provanzana, and assigned on the face of the patent to American Electric Power Company, Inc., for Power load-leveling system and packet electrical storage issued May 31, 2005, describing a large-scale, capacitor-based electrical energy storage and distribution system capable of effectuating load-leveling during periods of peak demand and a cost savings associated with the purchase of electrical energy; and disclosing a method of storing and distributing electrical energy to achieve a cost savings associated with the purchase thereof including the steps of providing a source of electrical energy, providing at least one electrical energy storage capacitor capable of storing a significant amount of energy, the capacitor in communication with the source, providing control equipment adapted to analyze and monitor the real-time cost of purchasing electrical energy from the source and to predict a future cost, supplying an amount of electrical energy to the capacitor to charge it in response to a charge signal from control equipment, discharging at least a portion of the stored energy to a load, and repeating to maximize cost savings; also disclosing deducting the value of the electrical energy sold back to the source for any costs of purchasing energy from the source. See also US Patent Application Pub. No. 20030160595.

US Patent Application Pub. No. 20090177548 for Cooperative environmental and life benefit exchange system by Eisnlohr filed Jan. 9, 2009 and published Jul. 9, 2009 describing a cooperative environmental and life benefit system including a grid transmitting available energy, a plurality of rate payers using energy generated from available energy sources, a plurality of utility companies providing the grid, a plurality of credits redeemable for acquiring one or more of a plurality of life benefits, and an administrator overseeing a redemption process, wherein credits are accumulated by the rate payers based on either a predetermined amount of electrical energy purchased from or sold back to the grid; further describing the redemption process wherein credits accumulated by the payers are redeemed at a redemption rate to provide a redemption value, which is remitted by the rate payers to satisfy benefit cost for acquiring the benefits, or portions thereof.

U.S. Pat. No. 7,274,975 for Optimized energy management system by Miller and assigned to Gridpoint, Inc., issued Sep. 25, 2007 describing methods and systems for optimizing the control of energy supply and demand, including activating battery storage and alternative energy sources to sell energy to the power grid during favorable cost conditions, including method steps for allocating energy at a location where the electrical energy is consumed, with computer-implemented steps of: determining a marginal cost for each of a plurality of energy sources available at the location, at least one of which is a non-grid source of electricity; determining a capacity of electrical energy available from each non-grid energy source; determining a demand for electrical energy at the location; dynamically allocating, in order of lowest marginal cost to highest marginal cost, electrical energy capacity from each of the plurality of energy sources to meet the demand; reducing demand at the location by automatically deferring electrical consumption for a device for which consumption can be deferred from a higher-cost time period to a lower-cost time period, including the computer-implemented step of issuing a command to the device to cause the deferral to occur, and further including determining projected marginal costs in each of a plurality of future time frames and deferring electrical consumption for the device to one of the plurality of future time frames, while conforming to an operational constraint for the device, the operational constraint for the device comprising a maximum time duration for which the device can be switched off; further including step of determining, on the basis of time-varying cost of grid-based electrical energy, whether it is cost-effective to sell electrical energy back to a grid-based source, and if so, automatically initiating such sale; and the step of selling electrical energy from a battery to the grid-based source. See also US Patent Application Pub. Nos. 20110208365, 20070276547, and 20060276938.

U.S. Pat. No. 7,890,436 for Billing and payment methods and systems enabling consumer premises equipment by Kremen and assigned to Clean Power Finance, Inc. issued Feb. 15, 2011 and describes a variety of systems and methods enabling renewable energy consumer premises equipment (CPE) such as dual metering techniques, and disclosing supporting by increasing a likelihood of meeting financing obligations, a consumer purchasing, leasing, installing, and/or maintaining renewable energy CPE for power generation at a consumer premises; coupling the CPE to a power grid operable to receive at least a portion of the power generated by the CPE, measuring power generated by the CPE and delivered onto the power grid of a utility, and processing receivables from the utility associated with the power generated and delivered onto the power grid directly to the lender at times corresponding to power measurement to fulfill the consumer's obligation to repay the loan. See also US Patent Ap. Pub. Nos. 20080091625, 20080091581, 20080091626, 20080091590, 20080091580.

Thus, there remains a need for improved information, controls, real-time or near-real-time data on power consumption for electric power market participants, REPs, customers, data centers, microgrid owners, and messaging and management of financial settlement therefor.

SUMMARY OF THE INVENTION

The present invention relates electric power messaging and settlements, and more particularly, to advanced energy settlements, messaging, and applications for electric power supply, load, and/or curtailment and data analytics associated with the same. Systems and methods for providing data analytics and customer or consumer guidance and controls are provided, and coupled with graphic user interfaces for interactive control and command of grid elements, design, specification, construction, management and financial settlement for data centers and/or microgrids, business and residential power consumption, control, management, messaging and settlements, mobile applications, websites, marketing offers, optimal pricing for comparable energy plans, retail electric provider and direct consumer alternatives, network of power architecture, EnergyNet applications, software development kit, application web-based storefronts, and combinations thereof.

The present invention provides for systems, methods, and graphic user interface embodiments for providing electric power usage (past, current, and/or future projected) information, management, financial settlements, and messaging, and applications as described herein.

Systems and methods for advanced energy settlements in electric power grid are proposed. At least one energy customer, at least one retail electric provider and at least one distributed generator connect to an advanced energy settlement platform communicatively. The advanced energy settlement platform is operable to aggregate consumption data from the at least one energy customer and revenue grade metrology data from distributed generators into settlement blocks; underpin a settlement process for a billing period based on the settlement blocks; map settlement blocks to appropriate energy power purchase agreement in effect; calculate the cost of each settlement block; summate a customer balance from all the settlement blocks during a billing period and collect payments from the at least one energy customer automatically; aggregate and settle distributed energy charges with distributed generators for the at least one energy customer during the billing period through a clearing house; and aggregate and settle fixed energy charges with the energy retailer or retail energy provider for the at least one energy customer during the billing period.

The advanced energy settlement platform also provides interactive graphical user interface for different participants in the advanced energy settlement and for advanced energy settlements application development kit (ADK) for access to functionality within the advanced energy settlement platform.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 17 illustrates a graphic user interface screen shot for an embodiment of the present invention showing an EnergyNet application development kit.

FIG. 23 illustrates another GUI screen shot showing EnergyNet App dashboard view for commercial building or facilities data associated with FIG. 22 for developing a profile for a building or facility.

FIG. 28 illustrates another GUI screen shot showing EnergyNet App dashboard view for at least one of the selected automatically generated recommendations for the user and/or account associated with FIG. 27, including automatically generated related offers.

FIG. 30 illustrates another GUI screen shot showing EnergyNet App dashboard view for completing AES plan enrollment and showing Recommend Upgrades options for interactive selection.

FIG. 35 relates to finding a station and includes a GPS-based map and current location of the EV App user. FIG. 36 relates to reserving a station and includes a blow-out section from a GPS-based map. FIG. 37 relates to arriving at the station reserved in FIG. 36. FIG. 38 relates to data associated with the parked and/or charging time for the EV and related reserved station of FIG. 36.

FIG. 41 provides a screen shot diagram illustrating billing and payments with real-time communication, customer profile, command and control, advanced energy settlement, monitoring and alarming, and market-based pricing for electricity supply from the market participants (plan shopping) and plan recommendation for predetermined facilities and locations, such as by way of example and not limitation, commercial office building location and its corresponding profile, including historical data and real-time data for electrical power consumption and pricing.

FIG. 44 includes a screen shot GUI diagram illustrating consumer engagement with related offers (from FIG. 43) for individual (person or corporate entity) energy consumers advanced energy settlements with EnergyNet systems and methods of the present invention.

FIG. 45 and FIG. 46 each provides a screen shot diagram illustrating consumer engagement GUI insights dashboard with data analytics automatically provided for individual (person or corporate entity) energy consumers having advanced energy settlements with EnergyNet systems and methods of the present invention.

FIG. 48 is a screenshot GUI diagram illustrating grid elements within a grid element library as in FIG. 47.

FIG. 63 is a screenshot for notification information from an added utility account.

FIG. 64 is a screenshot for bill information from an added utility account.

FIG. 65 is a screenshot for Add Your Device via EnergyNet.

DETAILED DESCRIPTION

Figure 1:
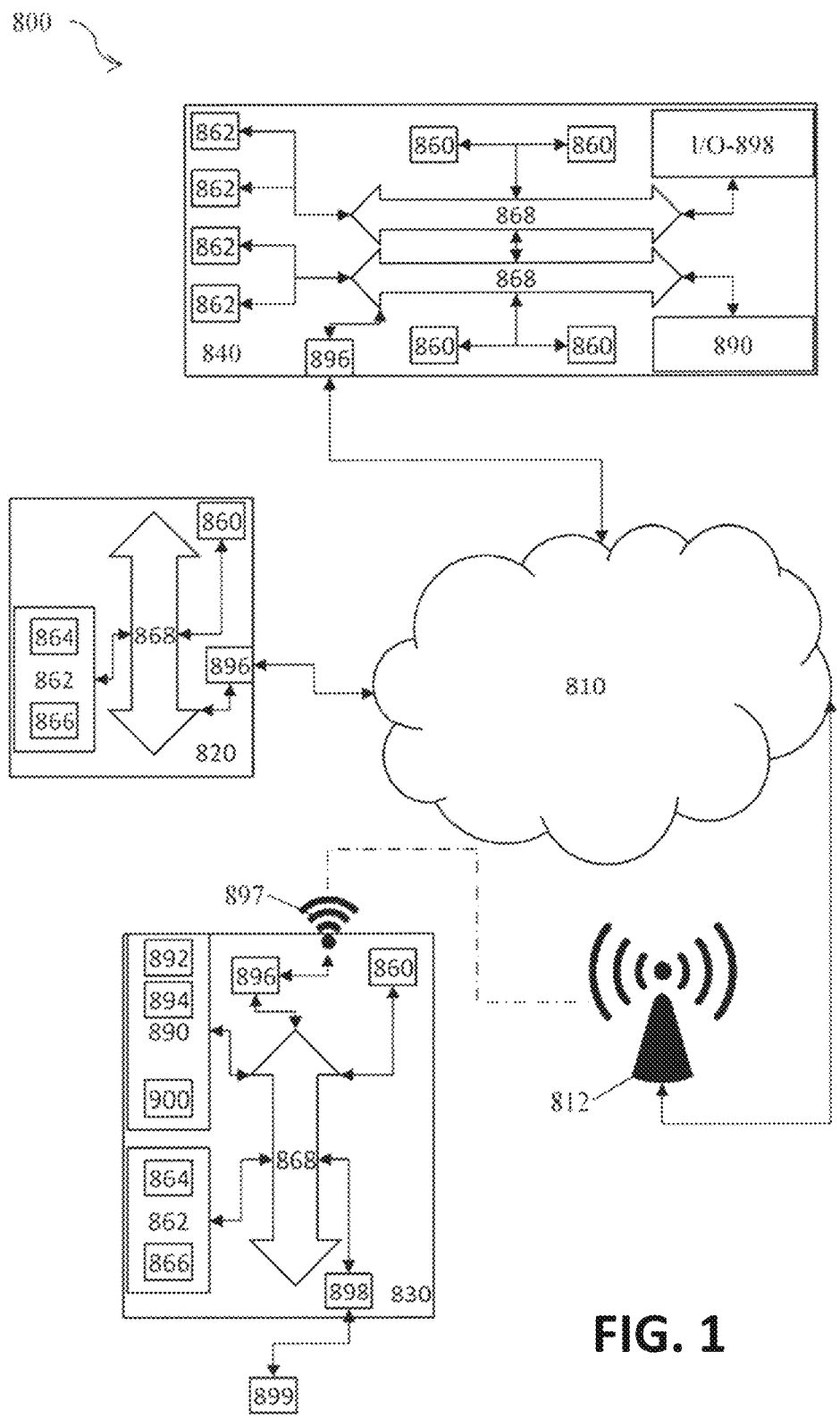
FIG. 1 illustrates a schematic diagram of an embodiment showing a configuration for a cloud-based computing system for user interface with the systems of the present invention.

Referring now to the drawings in general, the illustrations are for the purpose of describing preferred embodiment(s) of the invention at this time, and are not intended to limit the invention thereto. Any and all text associated with the figures as illustrated is hereby incorporated by reference in this detailed description.

The present invention provides systems and methods for customer engagement, data analysis, messaging, advanced energy settlements, command and control and management of electric power supply, demand, and/or curtailment including graphic user interface for consumers, including consumer profiles and alternative pricing programs and/or settlement programs for business and residential applications, including but not limited to graphic user interfaces for interactive control and command of grid elements, design, specification, construction, management and financial settlement for data centers and/or microgrids, business and residential power consumption, control, management, messaging and settlements, mobile applications, web sites, marketing offers, optimal pricing for comparable energy plans, digital contracts between different parties over the advanced energy settlement platform, retail electric provider and direct consumer alternatives, network of power architecture, EnergyNet applications, software development kit, application web-based storefronts, and combinations thereof. Apparatus embodiments are also provided in accordance with the systems and methods described herein.

Furthermore, novel methods of the present invention provided for consumer guidance and controls are coupled with graphic user interfaces for mobile applications, websites, and computer displays that provide improved information and controls for consumers for electric power consumption and management of financial settlement therefor.

In the description of the present invention, it will be understood that all EnergyNet embodiments and AES systems and methods descriptions include and incorporate by this reference without regard to individual, specific recitation for each example described, real-time and/or near-real-time data, including revenue grade metrology used for AES financial settlements. Additionally and similarly, real-time communication, messaging, and data packet transfer is provided over at least one network associated with the systems and methods of the present invention.

This detailed description of the present invention includes energy financial settlements and messaging and/or data packet transfer or transmission, including the following issued patents and/or copending applications by common inventor and/or assignee Causam Energy, Inc.: U.S. Pat. Nos. 8,849,715, 8,583,520, 8,595,094, 8,719,125, 8,706,583, 8,706,584, 2014/0180884, U.S. Pat. Nos. 8,775,283, 8,768,799, 2014/0279326, WO2014/066087, 2014/0039699, 2014/0277788, 2014/0039701, U.S. Pat. Nos. 8,588,991, 8,761,952, 2014/0277786, 2014-0277787, WO2014/022596, 2014/0039699, U.S. Pat. Nos. 8,849,715, 8,983,669, 14/885525, each of which is incorporated by reference in its entirety herein.

The present invention includes a multiplicity of interactive graphic user interface (GUI) for all aspects of AES and/or EnergyNet embodiments. By way of example and not limitation, as illustrated in the figures, at least one GUI is provided for electric power consumption for business or commercial facilities, including information and/or controls wherein the GUI is provided for mobile applications, websites, terminal and/or computer displays, and combinations thereof. For mobile applications, one embodiment includes a mobile communication computer device, such as a smartphone, tablet computer, or other mobile smart interactive communications device (personal/wearable or portable), having an application including software operable on a processor coupled with memory, wherein the mobile communication computer device is constructed and configured for network-based communication within a distributed software as a service (SaaS) with a network as illustrated in FIG. 1.

FIG. 1 is a schematic diagram of an embodiment of the invention illustrating a computer system, generally described as 800, having a network 810 and a plurality of computing devices 820, 830, 840. In one embodiment of the invention, the system 800 includes a cloud-based network 810 for distributed communication via a wireless communication antenna 812 and processing by a plurality of mobile communication computing devices 830. In another embodiment of the invention, the system 800 is a virtualized computing system capable of executing any or all aspects of software and/or application components presented herein on the computing devices 820, 830, 840. In certain aspects, the computer system 800 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of digital computers 820, 840, 850 and mobile devices 830, such as a server, blade server, mainframe, mobile phone, a personal digital assistant (PDA), a smart phone, a desktop computer, a netbook computer, a tablet computer, a workstation, a laptop, and other similar computing devices. The components shown here, their connections and relationships, and their functions, are meant to be exemplary only, and are not meant to limit implementations of the invention described and/or claimed in this document In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one bus 868. The input/output controller 898 may receive and process input from, or provide output to, a number of other devices 899, including, but not limited to, alphanumeric input devices, mice, electronic styluses, display units, touch screens, signal generation devices (e.g., speakers) or printers.

By way of example, and not limitation, the processor 860 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a plurality of operating systems (e.g., Linux, .NET, Java, C, Python), a controller, a state machine, gated or transistor logic, discrete hardware components, or any other suitable entity or combinations thereof that can perform calculations, process instructions for execution, and/or other manipulations of information.

In another implementation, shown as 840 in FIG. 1, multiple processors 860 and/or multiple buses 868 may be used, as appropriate, along with multiple memories 862 of multiple types (e.g., a combination of a DSP and a microprocessor, a plurality of microprocessors, one or more microprocessors in conjunction with a DSP core).

Also, multiple computing devices may be connected, with each device providing portions of the necessary operations (e.g., a server bank, a group of blade servers, or a multi-processor system). Alternatively, some steps or methods may be performed by circuitry that is specific to a given function.

According to various embodiments, the computer system 800 may operate in a networked environment using logical connections to local and/or remote computing devices 820, 830, 840, 850 through a network 810. A computing device 830 may connect to a network 810 through a network interface unit 896 connected to the bus 868. Computing devices may communicate communication media through wired networks, direct-wired connections or wirelessly such as acoustic, RF or infrared through an antenna 897 in communication with the network antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications or other data embodying any one or more of the methodologies or functions described herein. The computer readable medium may include the memory 862, the processor 860, and/or the storage media 890 and may be a single medium or multiple media (e.g., a centralized or distributed computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory or other solid state memory technology, disks or discs (e.g., digital versatile disks (DVD), HD-DVD, BLU-RAY, compact disc (CD), CD-ROM, floppy disc) or other optical storage, magnetic cassettes, magnetic tape, magnetic disk storage or other magnetic storage devices, or any other medium that can be used to store the computer readable instructions and which can be accessed by the computer system 800.

It is also contemplated that the computer system 800 may not include all of the components shown in FIG. 1 may include other components that are not explicitly shown in FIG. 1 or may utilize an architecture completely different than that shown in FIG. 1. The various illustrative logical blocks, modules, elements, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

In one embodiment, the application (e.g., smartphone app) automatically provides information via the GUI associated with the app to indicate to the user (consumer) information about electric pricing plan alternatives, including but not limited to their location, the price for electric power supply on any per unit (data center, microgrid, building (commercial or residential), facility, device, grid element, and combinations thereof) for a duration and/or at a predetermined time, and combinations thereof. Especially, the GUI storefront on the application offers devices and/or services for more electric pricing plan alternatives. Also, preferably the app GUI provides additional information including marketing and advertising information about any merchants, products, and/or services associated with or related to their profile(s), power usage, activities within the system, and combinations thereof. Also preferably, the app GUI provides an interactive interface allowing inputs to be received for generating at least one account and corresponding profile, advanced energy settlements selections, etc. In one embodiment of the present invention, the received inputs are associated with a consumer or user profile that is stored on the smartphone and/or in a database associated with a server computer and/or cloud-based computing system with at least one server computer and at least one database having remote inputs and outputs via the data and communications network, preferably via secure access and/or secure messaging for authorized users associated with the at least one account. Data centers are interconnected to form a secure SaaS, localized interdependently operated subsystems are connected for autonomous operations if disconnected from the SaaS or cloud-based system. Components must be virtualized through VMware, open source equivalent, etc. even if they are going into the same logical node and running through same EMS or microgrid EMS or microgrid power management solution (MPMS). If a microgrid is 100 kW or of regulated size, then it is subject to performance and liability regulations from FERC, NERC, ISO, governing entity, etc. Cloud-based system must be separated at or above that level.

In a virtualized or cloud-based computing system and methods of the present invention, the following components are provided as illustrated by way of example and not limitation to those described in FIG. 1. Components of a cloud-based computing system and network for distributed communication therewith by mobile communication devices include but are not limited to a system including a server computer with a processing unit. The server is constructed, configured and coupled to enable communication over a network. The server provides for user interconnection with the server over the network using a remote computer device or a personal computer (PC) or smartphone, tablet computer, etc. positioned remotely from the server. Furthermore, the system is operable for a multiplicity of remote personal computers or terminals for example, in a client/server architecture, as shown. Alternatively, a user may interconnect through the network using a user device such as a personal digital assistant (PDA), mobile communication device, such as by way of example and not limitation, a mobile phone, a cell phone, smart phone, tablet computer, laptop computer, netbook, a terminal, in car computer, or any other computing device suitable for network connection. Also, alternative architectures may be used instead of the client/server architecture. For example, a computer communications network, or other suitable architecture may be used. The network may be the Internet, an intranet, or any other network suitable for searching, obtaining, and/or using information and/or communications. The system of the present invention further includes an operating system installed and running on the server, enabling server to communicate through network 250 with the remote, distributed user devices. The operating system may be any operating system known in the art that is suitable for network communication and is operable to execute application languages.

Figure 2:
FIG. 2 illustrates method steps for providing advanced energy settlements (AES) according to one embodiment of the present invention.

FIG. 2 illustrates method steps for providing advanced energy settlements (AES) according to one embodiment of the present invention. A settlement AES process is outlined in six distinct steps as follows: Revenue grade settlement block data, transformed from limited grid elements associated with an application GUI, is used to underpin the settlement process for the billing period e.g. daily, weekly, monthly or predict and pay; Settlement block data is mapped to the appropriate distributed or fixed energy power purchase agreement in effect at that point in time; The cost of each settlement block inclusive of TOU, demand, taxes, access fees and energy charges is calculated; a customer balance is summated from all the settlement blocks that apply within the period is and automatically collected from the customer; Distributed energy charges billed in the cycle are aggregated by generator and settled through the clearing house for activities by the distributed generators and/or at least one customer; Fixed energy charges billed in the cycle are aggregated and settled with the energy retailer or REP for the delivery of power by the Transmission/Distribution Service Provider (TDSP). In one embodiment, the cost of each settlement block also includes line losses, TDSP charges, tariffs, market rules, governing body that regulates, etc. Also, a customer can create a rule or a tariff, or a specialty tariff, and use the ADK, profile, and automated controls for its implementation.

Figure 9:
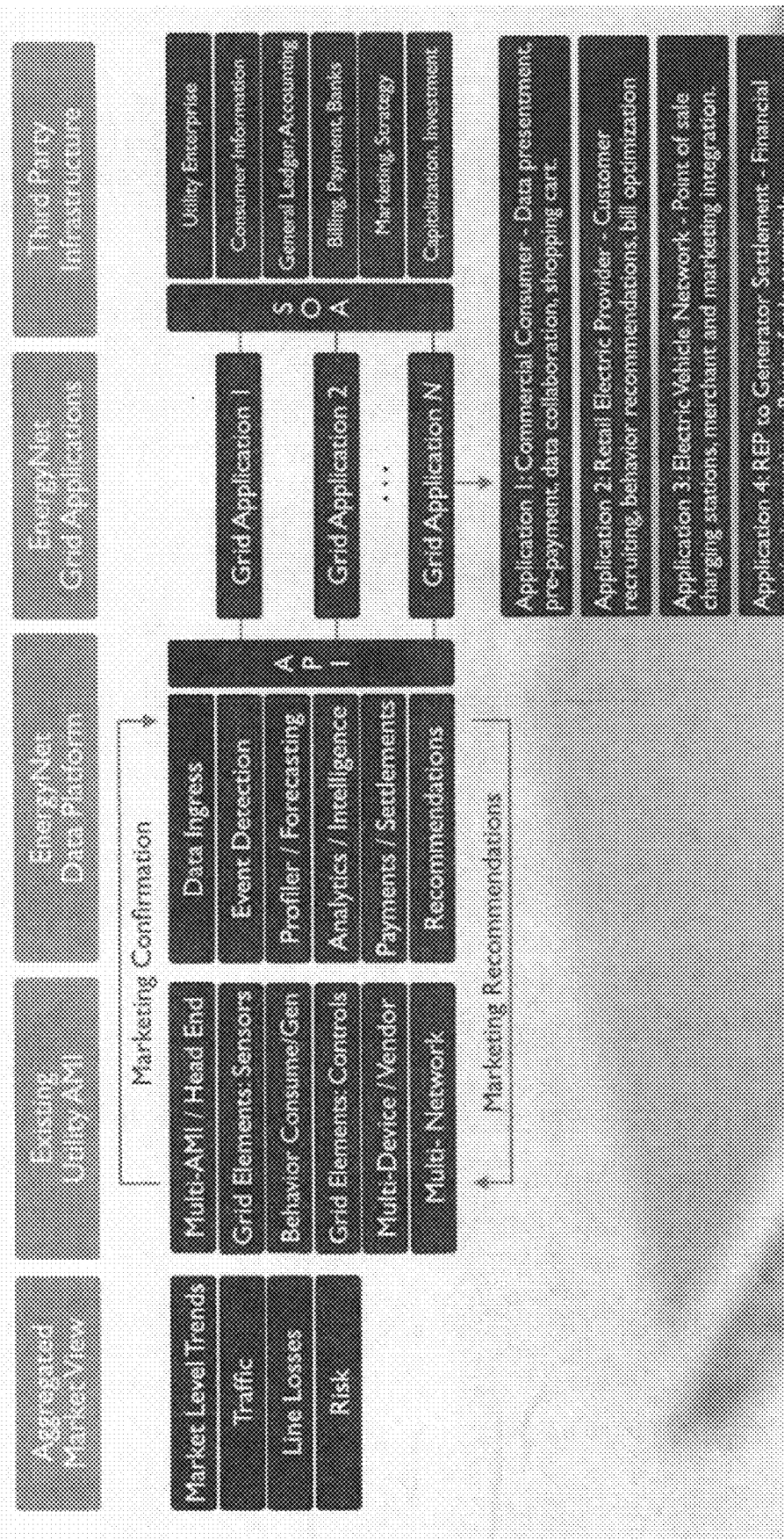
FIG. 9 is a schematic diagram illustrating a grid application model of the systems and methods of the present invention.

The EnergyNet data platform used with AES preferably provides and/or is operable for real time revenue grade data ingress; store and organise packet level information that can be used for forecasting, data mining, revenue extraction, event detection, sophisticated energy management and enterprise integration purposes; aggregate and store revenue data into revenue grade settlement blocks (or Power Trading Blocks (PTBs)); connect microgrid and spot market buyers and sellers; provide a fully automated and high latency industry leading settlement process underpinned by a distributed settlement rules engine capable of settling with both distributed and fixed generator market participants; provide an automated payment exchange which supports all advanced billing models (shared data plan, daily plan and predict & pay); payments should be managed as single energy bills for customers with EnergyNet responsible for settlement payments between multiple distributed energy generators and the customers existing energy retailer; provide a real time energy purchasing solution that matches the customers real energy consumption against energy currently available within the microgrid or spot market; capture and transform market data that can provide intelligent analytics by generators for trending, forecasting, planning and maximising revenue/investment opportunities; capture and transform energy data that can provide intelligent analytics for customers energy management, power modelling at geodetic locations, forecasting, procurement, profiling, bill optimisation and recommendation purposes; and integrate with the existing distributed energy market exchange to allow EnergyNet buyers and sellers to connect and agree prices on distributed generation. The intelligent analytics is based on revenue grade metrology; profile with attributes, e.g., generator, solar, storage, DR, or commodity, interested in buying selling trading within the parameters of the profile; it is also based upon what the device profile indicates the device is capable of, the data from the market and the data from the metrology, and the data from the profile intersect. All the data are sorted, analyzed, and then action is taken. if the profile and the market program match, then the system provides to the customer a list of recommendations that may include a power model, a purchase of at least one grid element, a plan (commodity plan), an incentive. The customer receives the recommendations, the counterparty (REP, market participant, grid element supplier, etc.), and matches them. If action is taken within the platform, then power grid resource is created. Like a decision tree from customer data compared with market data. The matching includes matching profiles against market data, matching DR against market data, or purchasing services, commodity plans, grid elements, etc. As illustrated in FIG. 9, EnergyNet grid applications ensure that the EnergyNet framework is operable to support 1:n grid applications. Third party infrastructure may provide SOA integration with utility and/or market participant enterprise systems; provide SOA integration with general ledger and accounting systems; and/or provide SOA integration with the financial, banking and clearing infrastructure, as needed.

Figure 3:
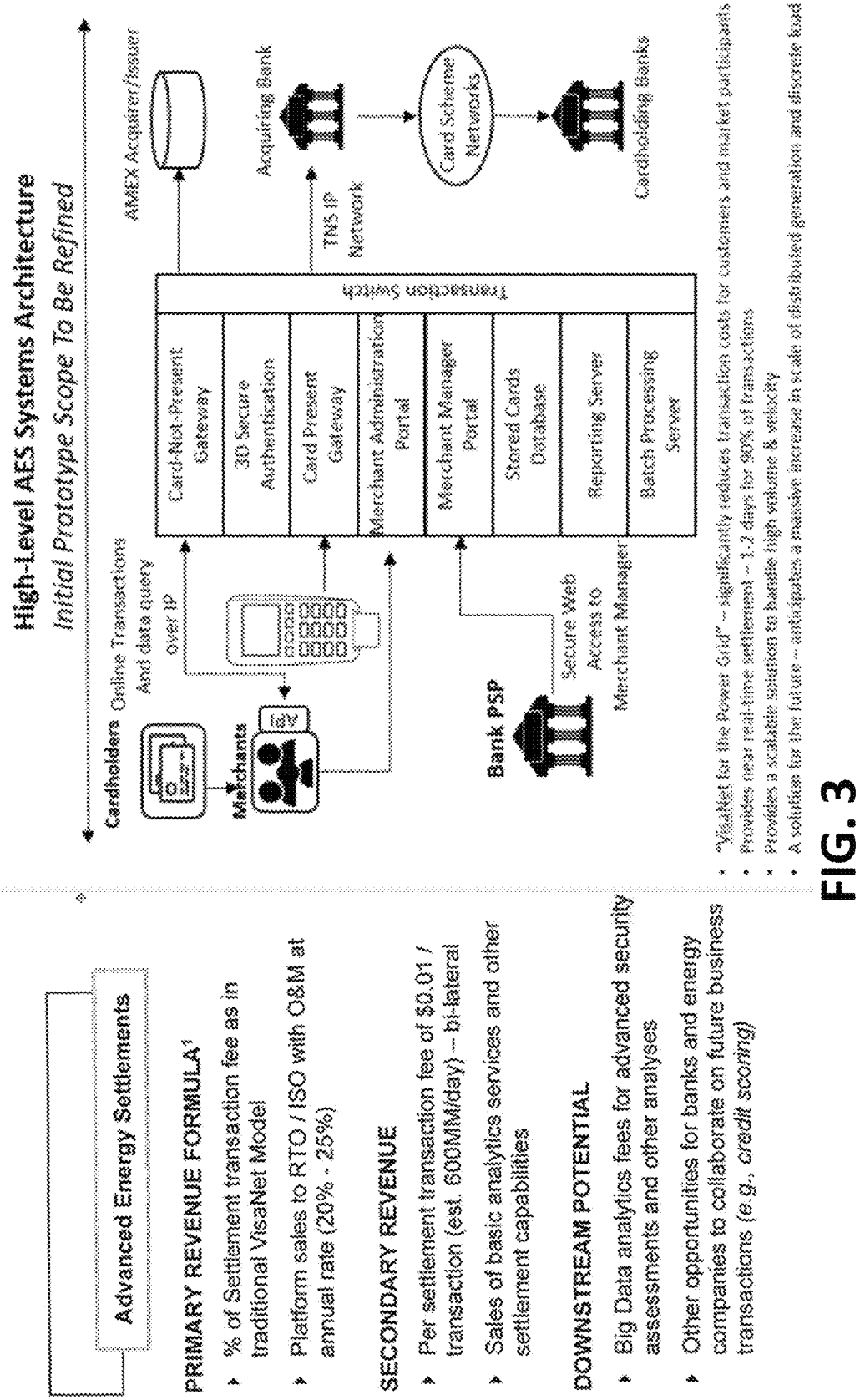
FIG. 3 shows a schematic diagram illustrating a high-level AES system architecture according to the present invention.
Figure 10:
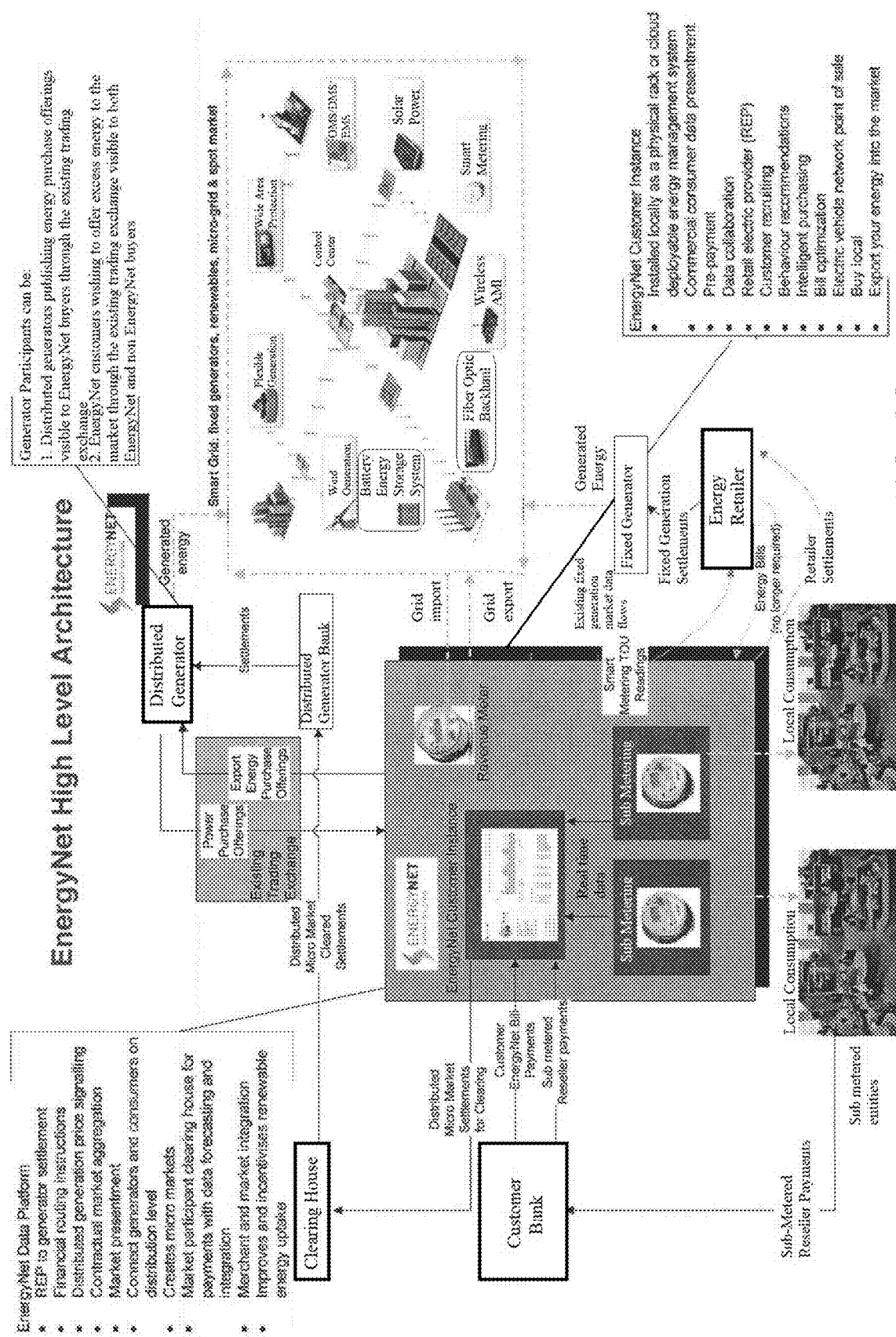
FIG. 10 shows a schematic diagram illustrating a high-level system architecture for an EnergyNet embodiment according to the present invention.

FIG. 3 shows a schematic diagram illustrating a high-level AES system architecture according to the present invention. The principal actors and data flows are depicted in FIG. 3 and FIG. 10 are as follows for EnergyNet embodiments: Customers receive near real time market connection data and price signals giving visibility to generation as it becomes available in the market. This data is used by EnergyNet to facilitate intelligent energy purchasing and settlement between all market participants; Distributed generation availability in the form of power purchase offerings is received from Distributed Generators ensuring that intelligent energy purchasing decisions can be automated or recommended within a real time market. Customers with a generation capacity can also act as generators through EnergyNet if they have an exportable capacity; Payments received from the Customer Bank represent consolidated single payments to EnergyNet for energy supplied from their existing Energy Retailer or from Distributed Generators; Settlements are apportioned across revenue grade TOU meter readings over a billing period and internal usage is measured through real time sub metering technology at 1 second intervals and/or near-real-time or real-time. Sub-metered entities are considered as follows: EnergyNet supports the billing of sub metered occupants allowing the EnergyNet customer to re-sell or cross charge energy using the sub metered meter readings. The EnergyNet customer instance will allow these energy costs to be recovered against the enterprises total energy consumption. Distributed generation suppliers are included as follows: Market participants publish power purchase offerings to EnergyNet customers. This data is used by EnergyNet to facilitate intelligent energy purchasing. Excess energy capacity can also be offered to the market by customers using EnergyNet. The distributed generator/generation supplier participants receive settlements from the Distributed Generator Bank or financial settlement entity (non-bank entity); distributed generator receives cleared settlements for all energy consumed within the billing timelines specified in the distributed power purchase agreements of EnergyNet customers. A clearinghouse receives all uncleared distributed energy settlements made through EnergyNet's, point of sale devices or advanced billing methods before passing the cleared settlements to the Generator Bank. Customer Payments received from the Customer Bank represent consolidated single payments for energy purchased on the both the distributed and fixed generation market. EnergyNet performs all settlement activities for all participants behind a single bill; EnergyNet can also manage the payments for energy re-sold or cross charged by the customer. In one embodiment, EnergyNet provides a master settlement account for a customer and issues a single bill including all settlement activities with different participants during a billing cycle. This single bill can be viewed and analysed against the imported energy bill. The distributed generator bank receives aggregated and cleared settlements from the clearinghouse for distributed energy that was consumed within each power purchase agreement held by EnergyNet customers. An energy retailer or REP is included as follows in one EnergyNet embodiment: Customers can still consume energy supplied by fixed generators outside the spot energy or micro market and the portion of a customer's consumption that resides within their fixed generation power purchase agreement will be settled with the retailer. The settlement algorithms resolve this using settlement blocks, all power purchase agreements in place and revenue grade meter reads. Purchasing within the spot market requires prices to be negotiated and agreed in seconds and these activities require integration with existing market trading systems. A growing customer base would allow EnergyNet to provide a complete trading market between users in the future. The purchasing rules engine criteria allows generators respond to customer preferences and offer a variety of different tariffs as wells as alter their own behavior e.g. if they are a customer/generator can they shift their highest usage off peak and export excess energy at peak periods when demand and prices are higher.

Also, in one embodiment, the customer payment for a billing period between multiple distributed generators and the customer's existing energy retailer is tracked in a single financial account (financial institution holding account) wherein the settlement platform or clearinghouse tracks and clears each customer record of the market by a plurality of customer identifications. After clearing, then the payment is made from the master settlement account.

Counter party is buying or selling; money flows into a component of energy net/clearing house, which is the settlement and clearing engine platform. By device or by customer there is a transaction identification (ID) that is assigned to each transaction; transaction can be time-based, event-based, market-rules-based, governing-body-of-the-grid-based, etc. Money is received or transmitted (Rx or Tx). Distributed asset selling into market or covering for another supplier who is short, selling direct into the market or through a REP is also provided; a time of flow of money is determined by the digital contract; dynamic distributed database by logical node is provided; transaction IDs is provided, depending upon who originates the transaction; matched and secure and anonymized by customer ID methods described herein; after the ID is validated then money flows from financial institution holding account. Money flows based upon digital contract terms; at the clearinghouse or at the database. Transaction into a transaction (Tx) ID based upon customer info & banking info per customer account from which payment is derived. Holding account by Tx ID is tracked through the settlement platform. When revenue grade information is needed for clearing is received and processed and confirmed, then funds are received. A float may be created by clearing transactions according to the digital contracts (for example, 1 day, 2 days, 1 hour, weekly, monthly, 6 months, 1 year, etc., depending on contract terms).

Figure 4:
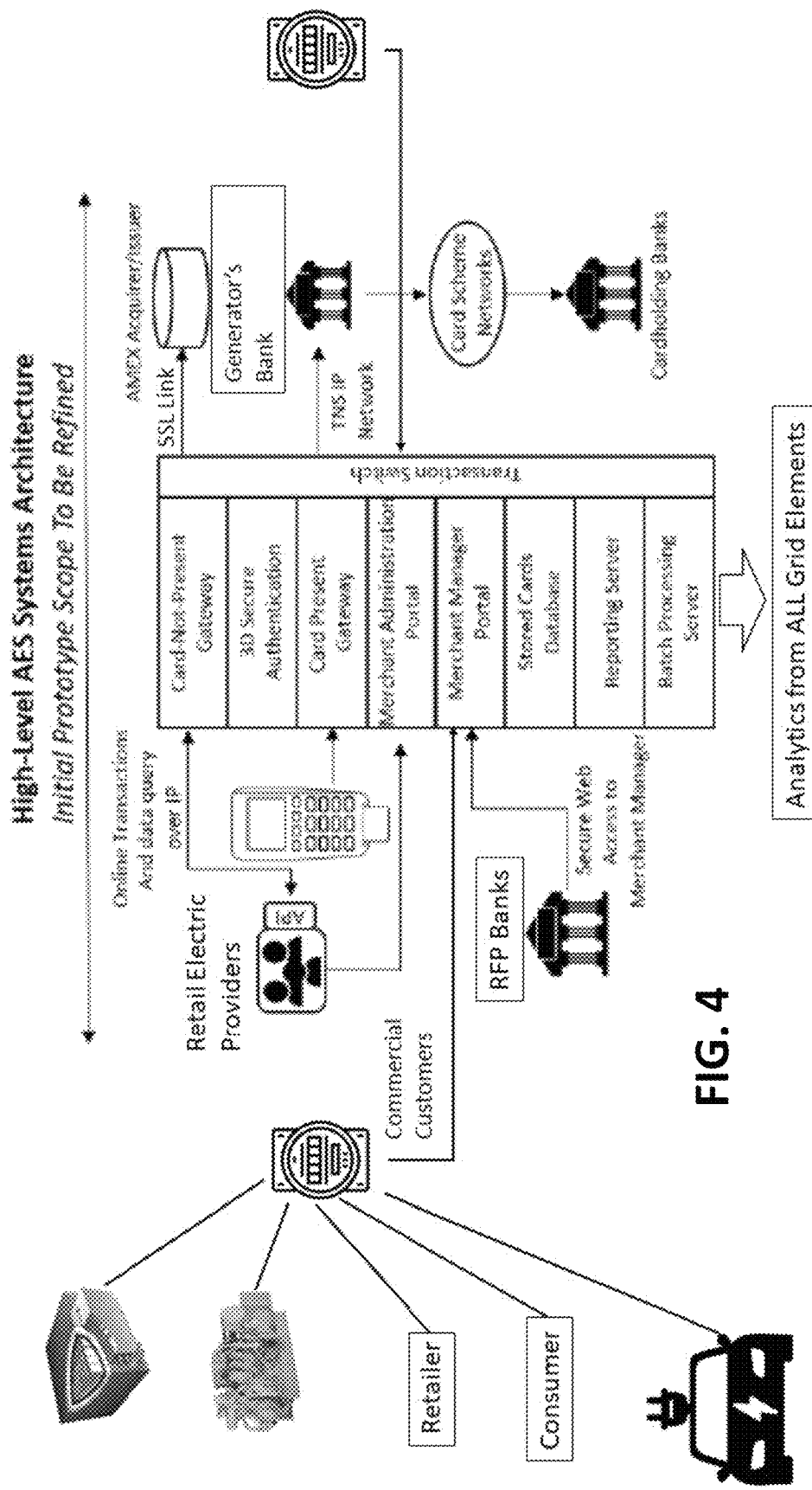
FIG. 4 is a schematic diagram further illustrating financial systems and methods for advanced energy settlements within a network of power for electrical power systems.

FIG. 3 illustrates high level architecture for financial systems and methods for advanced energy settlements within a network of power for electrical power systems, including grids, microgrids, and grid elements active within them for performing a function or for participation within the electric power grid or microgrid for power consumed (load), curtailment or demand response, power supply, power storage, control, measurement, and combinations thereof. Correspondingly, FIG. 4 is a schematic diagram further illustrating financial systems and methods for advanced energy settlements within a network of power for electrical power systems.

Figure 5:
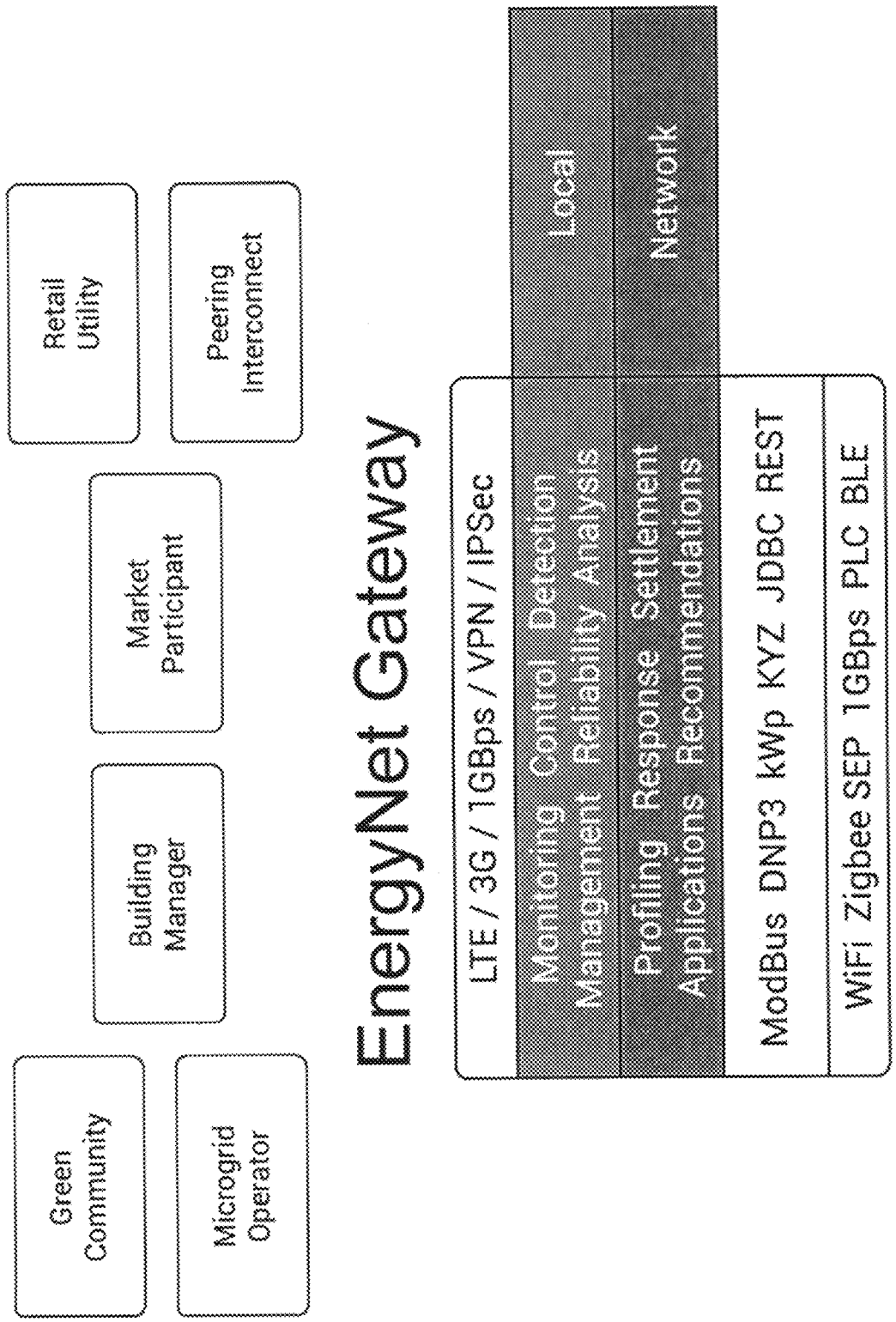
FIG. 5 is a schematic diagram illustrating an exemplary EnergyNet gateway according to the present invention.

FIG. 5 is a schematic diagram illustrating an exemplary EnergyNet gateway according to the present invention. The EnergyNet gateway in the present invention connects different participants having different network protocols to the advanced energy settlement platform. The different participants comprises green communities, microgrid operators, building managers, market participants, and retail utilities. The EnergyNet gateway is also used for peering interconnections. Different communication protocols/standards supported by the EnergyNet gateway include but not limited to LTE, 3G, 1 GBps, VPN, IPSec, ModBus, DNP3, kWp, KYZ, JDBC, REST, WiFi, Zigbee, SEP, 1 GBps, PLC, BLE, 6LOWPAN. At local level, the EnergyNet gateway is operable for monitoring, control detection, management, and reliability analysis. At network level, the EnergyNet gateway is operable for profiling response settlement and applications recommendations.

Figure 6:
FIG. 6 is a schematic diagram illustrating a partial selection of exemplary grid elements according to the present invention.

FIG. 6 is a schematic diagram illustrating a partial selection of exemplary grid elements according to the present invention. Grid elements examples include but not limited to grid elements that function or perform and/or participate within the electric power grid for providing generation, storage, switchgear, transformers, measurement, control, distribution, and revenue or settlement. The grid elements can be power transfer switches, wind meters, utility meters, battery discharge controllers, tenant sub meters, solar meters, power distribution units (PDUs), appliance switches, EV charging stations, distributed energy resources (DERs), transfer switches, EV batteries, inverters, controllable loads, weather stations, and HAVC environments.

Figure 7:
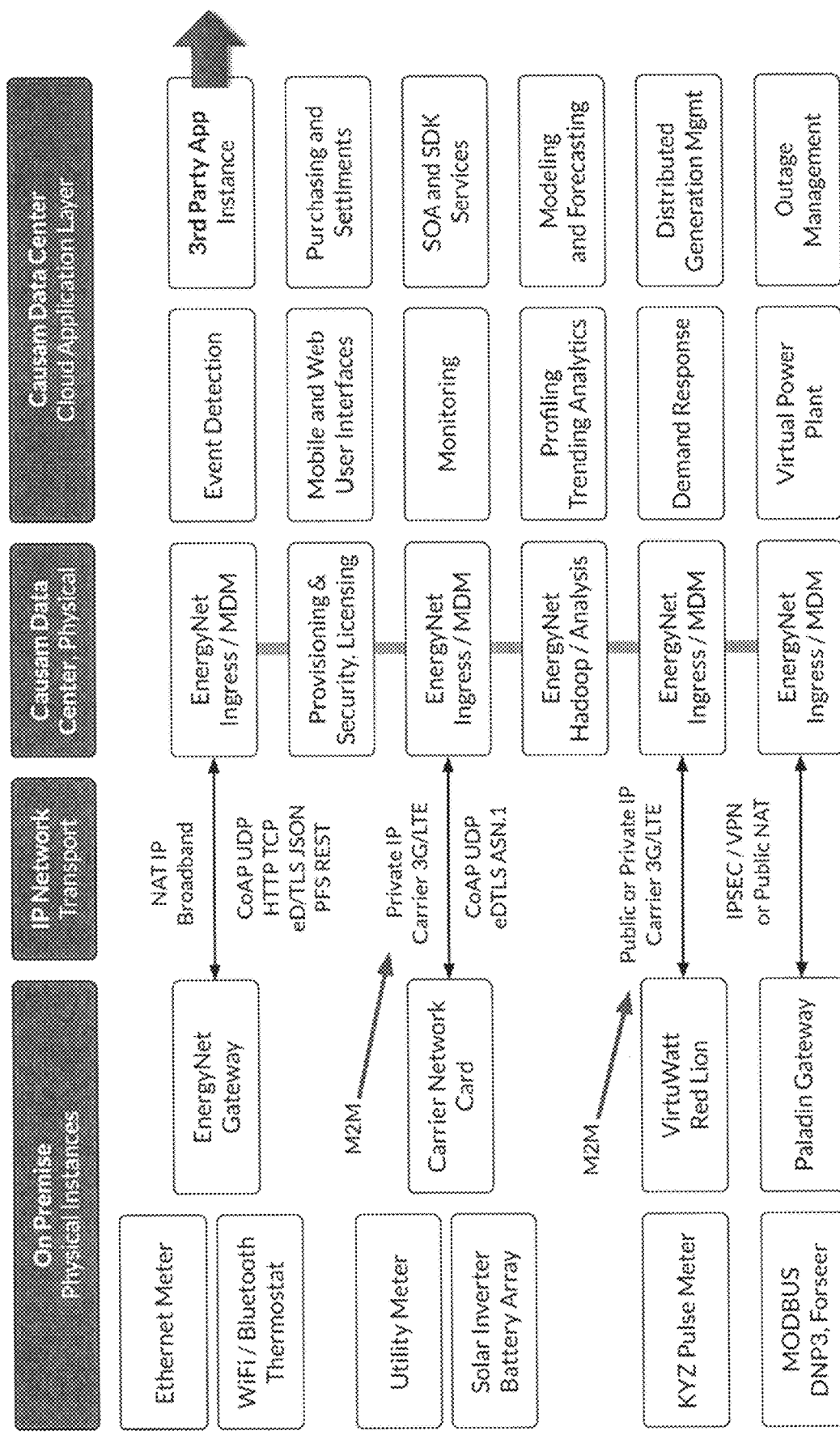
FIG. 7 is a schematic diagram illustrating components of the systems and methods of the present invention.

FIG. 7 is a schematic diagram illustrating components of the systems and methods of the present invention.

Figure 8:
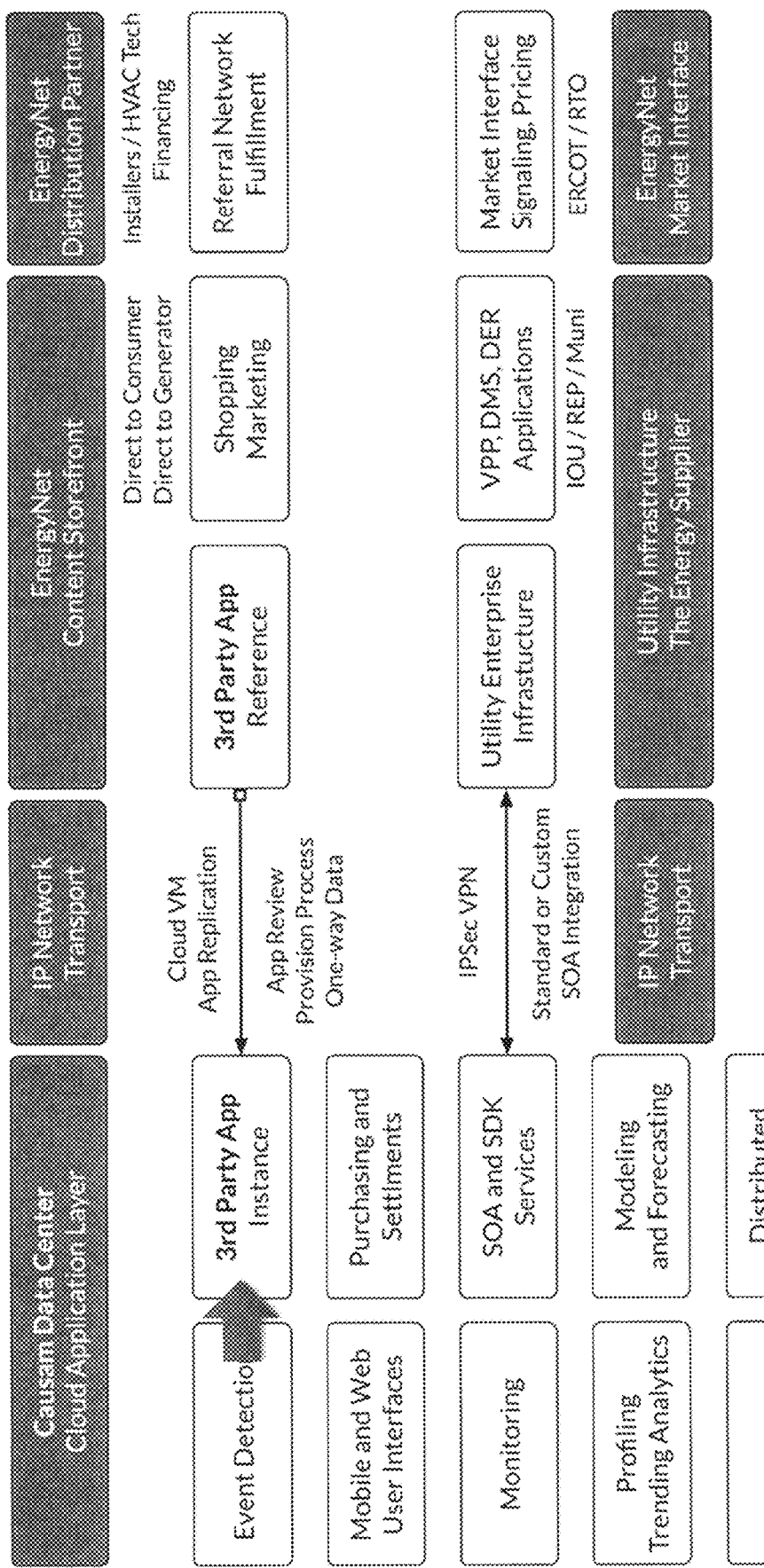
FIG. 8 is a schematic diagram illustrating components of the systems and methods of the present invention.

FIG. 8 is a schematic diagram illustrating components of the systems and methods of the present invention.

FIG. 7 and FIG. 8 provide an extended diagram that includes two parts of a schematic diagram illustrating an EnergyNet network of power and communications between grid elements and the system components of the present invention. A network of power software stack includes reactive and asynchronous end to end; highly distributed queuing; cloud-, enterprise- and on premise-applications; flexible deployment and scale, high velocity data ingress, and massive data correlation and analytics.

The systems of the present invention includes on premise physical instances, IP network, a Causam data center, EnergyNet Content Storefront, EnergyNet Distribution Partner, EnergyNet Market Interface, and Utility Infrastructure at the Energy Supplier. The on premise physical instances such as EnergyNet gateway, carrier network card, VirtuWatt Red Lion, Paladin gateway are present at Ethernet meters, WiFi/Bluetooth thermostats, utility meters, solar inverter battery array, KYZ Pulse meters, MODBUS DNP3 Foreseer, any other data acquisition or historical framework, application or architecture, for IP network connection. The Causam data center has a physical layer includes EnergyNet Ingress for meter data management (MDM), provisioning, security and licensing, and EnergyNet Hadoop for analysis. The Causam data center further includes a cloud application layer providing event detection, third party App instance, mobile and web user interface, purchasing and settlements, monitoring, Service-Oriented Architecture (SOA) and Software Development Kit (SDK) services, profiling trending analytics, modeling and forecasting, demand response, distributed generation management, virtual power plant (VPP), and outage management. The EnergyNet Content Storefront provides third party App reference, which has one-way communication to the third party App instance in the Causam data center for cloud Virtual Machine (VM), App replication, App review, and provision process. The EnergyNet Content Storefront also provides shopping and marketing directed to consumer and generator. The EnergyNet Distribution Partner includes installers, HVAC technicians, and financing institutions, which are referrals for network fulfilment. The EnergyNet Market Interface connects with regulation agencies, for example ERCOT and other RTOs, for signaling and pricing. The Energy Supplier can be IOU, REP, and/or Municipal power agencies. The Utility Infrastructure at the Energy Supplier provides applications, such as VPP, Distribution Management System (DMS), and DER applications, and Utility Enterprise Infrastructure. The Utility Enterprise Infrastructure communicates with the SOA and SDK services at the Causam data center via IPSec and/or VPN for standard or customer SOA integration.

FIG. 9 is a schematic diagram illustrating a grid application model of the systems and methods of the present invention. FIG. 9 includes a schematic diagram illustrating advanced energy settlements EnergyNet grid application model including components and data flows.

The EnergyNet Grid Application Model includes aggregated market view, existing utility AMI, EnergyNet Data Platform, EnergyNet Grid Applications, and Third Party Infrastructure. The Aggregated market View provides information such as market level trends, traffic, line losses, and risk. The Existing Utility AMI includes multi-AMI for head end systems, grid elements for sensing, grid elements for controlling, multi-devices/vendors, and multi-network. The EnergyNet Data Platform provides API for data ingress, event detection, profiling and forecasting, analytics and intelligence, payments and settlements, recommendations. The multi-AMI for head end systems in the existing utility AMI provides marketing confirmation to data ingress on the EnergyNet Data Platform. The recommendations provided by the EnergyNet Data Platform are marketing recommendations provided to multi-network in the existing Utility AMI. EnergyNet Grid Applications include multiple grid applications. For example, grid application 1 is for data presentment, pre-payment, data collaborations, shopping carts for commercial consumers, grid application 2 is for customer recruiting, behavior recommendations, bill optimization for retail electric provider; grid application 3 is for point of sale, charging stations, merchant and marketing integration for electric vehicle network; grid application 4 is for financial routing instructions, point of sale terminals for REP to generator settlement, etc. Third Party Infrastructure includes SOA for utility enterprise, consumer information, general ledger, accounting, billing, payment, banks, marketing, strategy, capitalization and investment.

Figure 11:
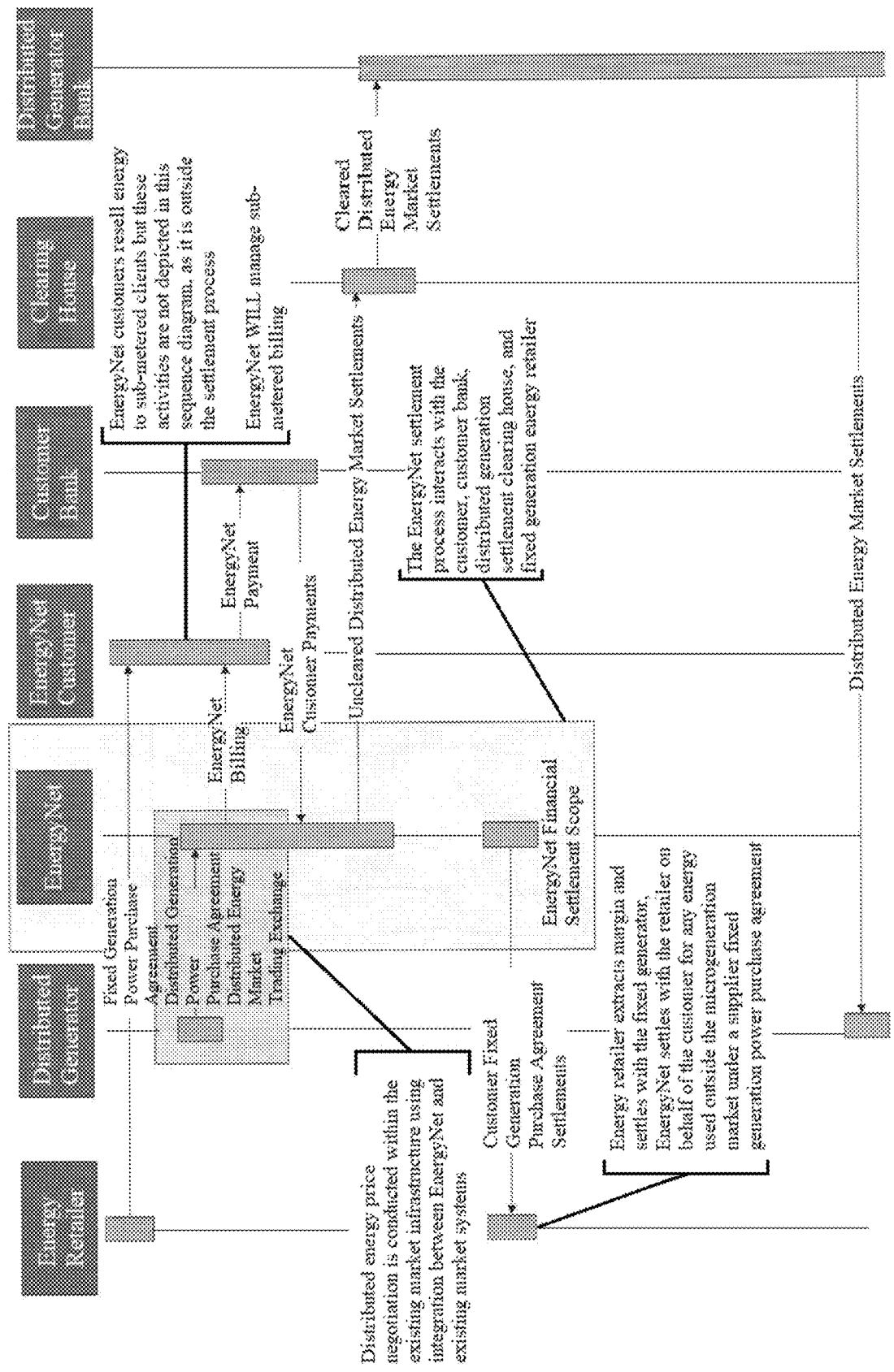
FIG. 11 is a schematic and flow diagram illustrating AES sequencing.

FIG. 10 shows a schematic diagram illustrating a high-level system architecture for an EnergyNet embodiment according to the present invention. This high-level system architecture includes a customer deployable distributed EnergyNet Customer Instance providing customers with a complete energy management, purchasing and settlement solution within the microgrid and spot generation market for AES. FIG. 11 is a schematic and flow diagram illustrating AES sequencing; there are four key elements within the EnergyNet enterprise financial settlement product: data ingress, market participation, payments collection and advanced energy settlements. Intelligent purchasing decisions require advanced smart metering and EnergyNet uses high speed IP metering technology to build a complete and real time energy consumption profile aggregated from multiple sub-metering points. All consumption data within the enterprise forms settlement blocks which are used to drive the billing and settlement process. All metering data is aggregated to provide a real time settlement block and total enterprise consumption view with drill down. This data forms the basis for billing, settlement, forecasting, market view and other analytical transformations. Note that EnergyNet can also utilise less dynamic data from legacy meters and head end systems where a customer investment in conventional sub metering has already been made. Profiling is an important element for customers to forecast future usage and committing to purchase offerings. Time of Use (TOU) and/or demand profiles created from base data are an important tool for customers and generators alike; industry standard profiling techniques can be used to create profiles. Generators can use profiles to price their products and plan their generation activities. Customers can use them to ensure they commit to the power purchase offerings that are best aligned with their anticipated usage. Profiling is an important element for customers to forecast future usage and committing to purchase offerings. TOU or demand profiles created from base data are an essential tool for customers and generators alike. Industry standard profiling techniques can be used to create profiles. Generators can use profiles to price their products and plan their generation activities. Customers can use them to ensure they commit to the power purchase offerings that are best aligned with their anticipated usage.

Buyers and sellers of electric power are connected within the microgrid or spot market associated with AES of the present invention. Buyers can expose their generated capacity to customers in near real time and customers can make intelligent purchasing decisions based upon actionable real time data. The Advanced Energy Settlement (AES) process performs all billing, payment and settlement activities with financial and clearing participants. A configurable market purchasing rules engine ranks and selects energy from the market based on customer preferences such as cost, payment preference, locality, how green the energy, market supply, consumption etc. and may recommend purchasing from one or more suppliers. The suitability of the offering also depends on additional factors such as any minimum and maximum usage constraints which requires decisions to be made based upon forecasts derived using historical data and profiling stored within EnergyNet.

Figure 12:
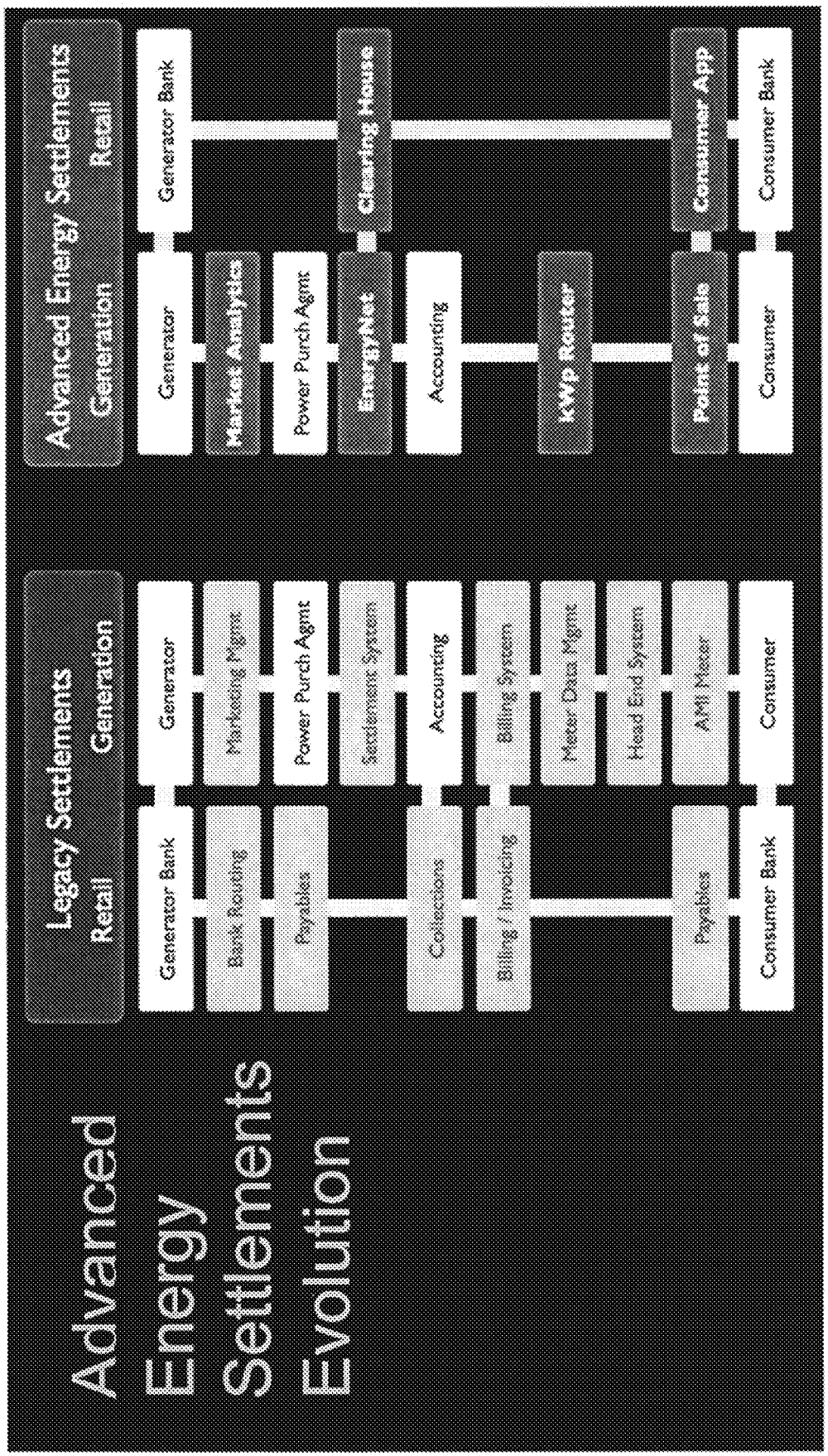
FIG. 12 is a schematic diagram illustrating AES evolution for the systems and methods of the present invention.

FIG. 12 is a schematic diagram illustrating AES evolution for the systems and methods of the present invention.

FIG. 12 includes a schematic diagram illustrating advanced energy settlements evolution including legacy settlements for retail and generation, which advantageously provide for interaction and/or integration with existing legacy electric power grid market participant and/or utility financial settlement for retail and/or residential customers.

Comparing to legacy settlements, the advanced energy settlements in the present invention has an EnergyNet Platform communicates with a clearing house, which does the settlements between the generator bank and the consumer bank besides simpler communications and less participants.

Certain Apps are provides for different participants in the advanced energy settlement systems. These Apps are operable for command and control, advanced settlement, monitoring and alarming, etc. via real time communication.

Figure 13:
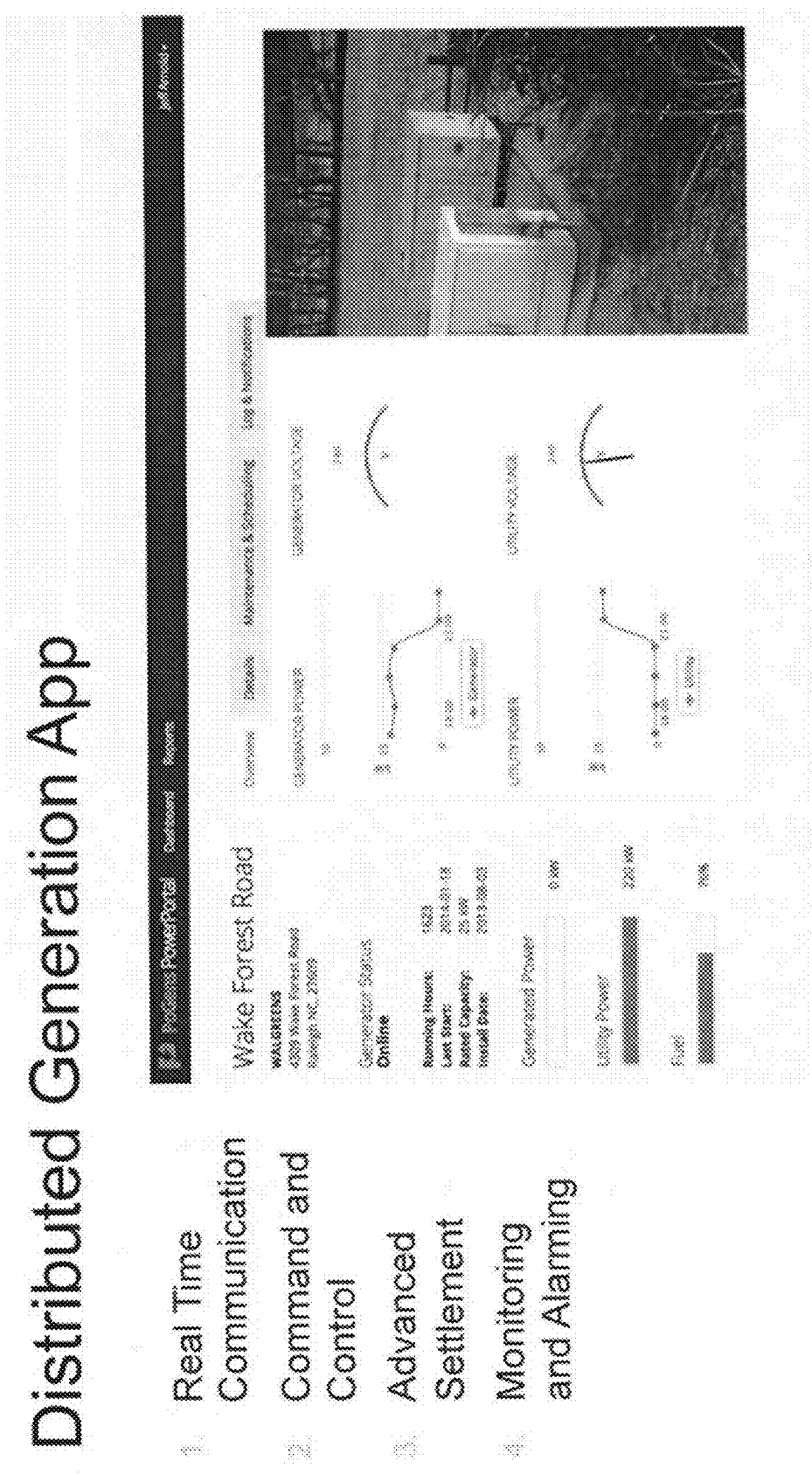
FIG. 13 illustrates a graphic user interface screen shot for an embodiment of the present invention showing a distributed generation App.

FIG. 13 illustrates a graphic user interface screen shot for an embodiment of the present invention showing a distributed generation App. FIG. 13 includes a screenshot diagram illustrating distributed generation control with real-time communication, command and control, advanced energy settlement, and monitoring and alarming functions within a web-based portal associated with select grid elements, in this example diagram, the grid elements are generation units at a predetermined location.

The Distribution Generation App provides an overview of a distributed generator including a basic profile, curves for generator power and utility power, scales for generator voltage and utility voltage. The distribution generation App also provides details for the generator, maintenance and scheduling, log and notifications.

Figure 14:
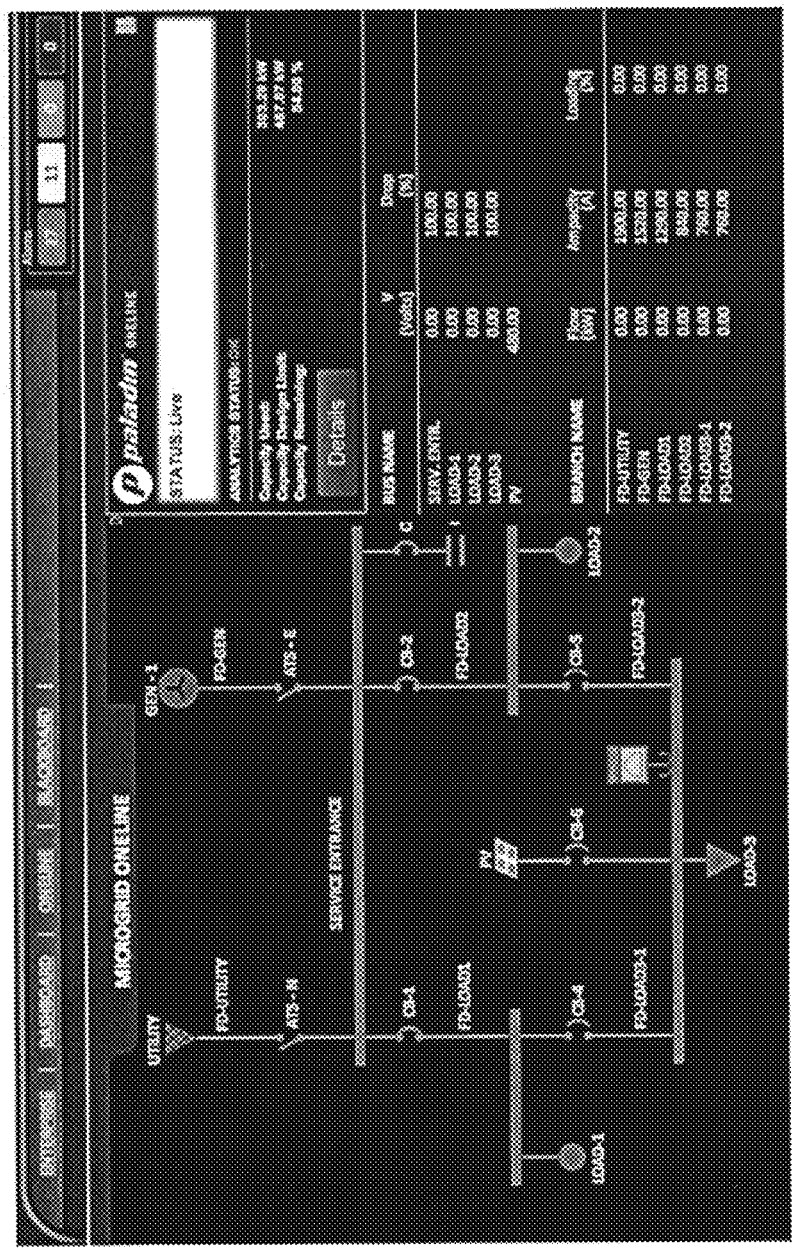
FIG. 14 illustrates a graphic user interface screen shot for one embodiment of the present invention showing a microgrid control App applicable to data centers and/or microgrids.

FIG. 14 illustrates a graphic user interface screen shot for one embodiment of the present invention showing a microgrid control App applicable to data centers and/or microgrids. FIG. 14 includes a screenshot diagram illustrating microgrid operation with real-time communication, command and control, advanced energy settlement, and monitoring and alarming functions within a web-based portal associated with select grid elements.

A one-line microgrid diagram is displayed with bus voltage information and branch power flow information.

Figure 15:
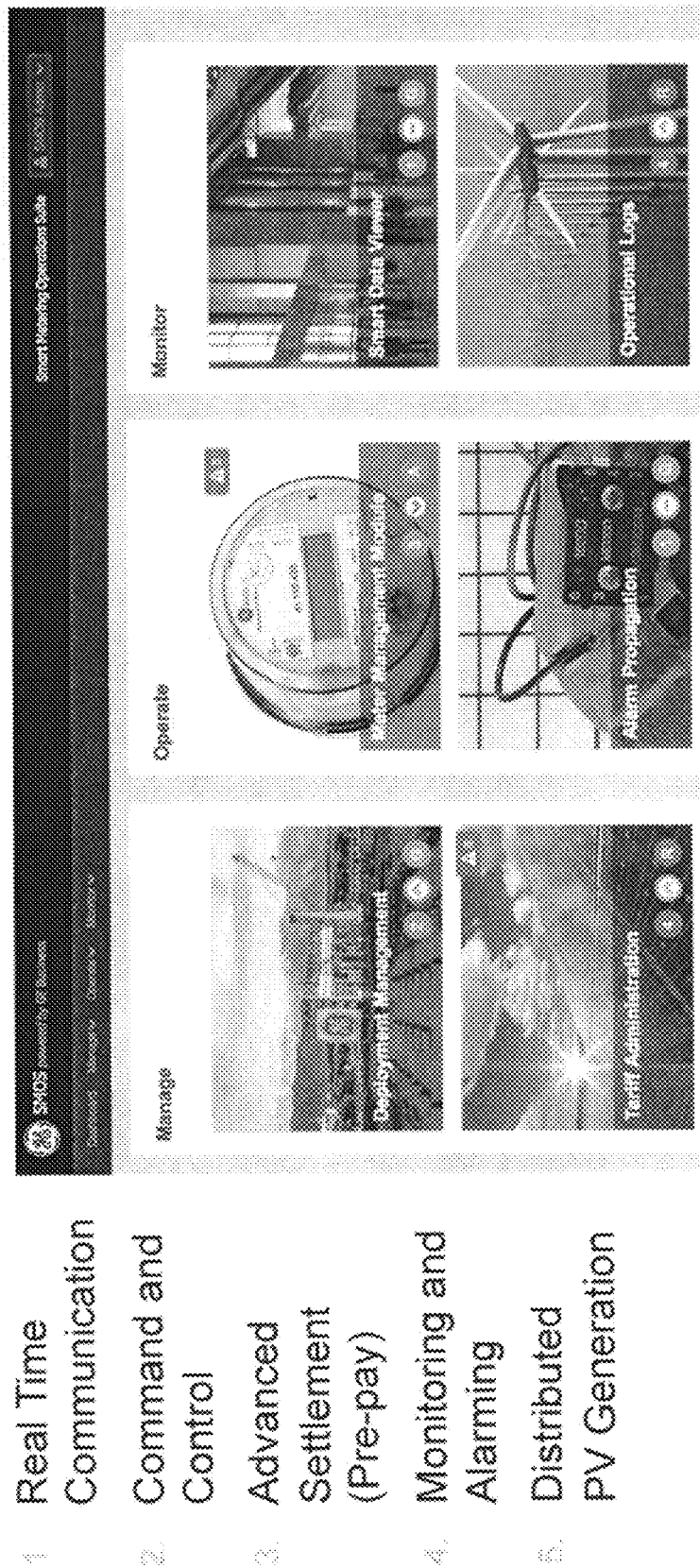
FIG. 15 illustrates a graphic user interface screen shot for an embodiment of the present invention showing an AMI Head End App.

FIG. 15 illustrates a graphic user interface screen shot for an embodiment of the present invention showing a AMI Head End App. FIG. 15 includes a screenshot diagram illustrating real-time utility metering with real-time communication, command and control, advanced energy settlement (including pre-pay), monitoring and alarming, and distributed photovoltaic (PV) generation, with options or functions including but not limited to deployment management, tariff administration, meter management, alarm propagation, smart data viewer, and operational logs within a web-based portal associated with select grid elements, which is used by distributed remote users for managing, operating, and monitoring with real-time utility metering.

The AMI Head End App is operable for deployment management and tariff administration. The AMI Head End App is operable to operate meter management module and alarm propagation. The AMI Head End App provides smart data viewer and operational logs for monitoring distributed PV generation and/or wind farm.

Figure 16:
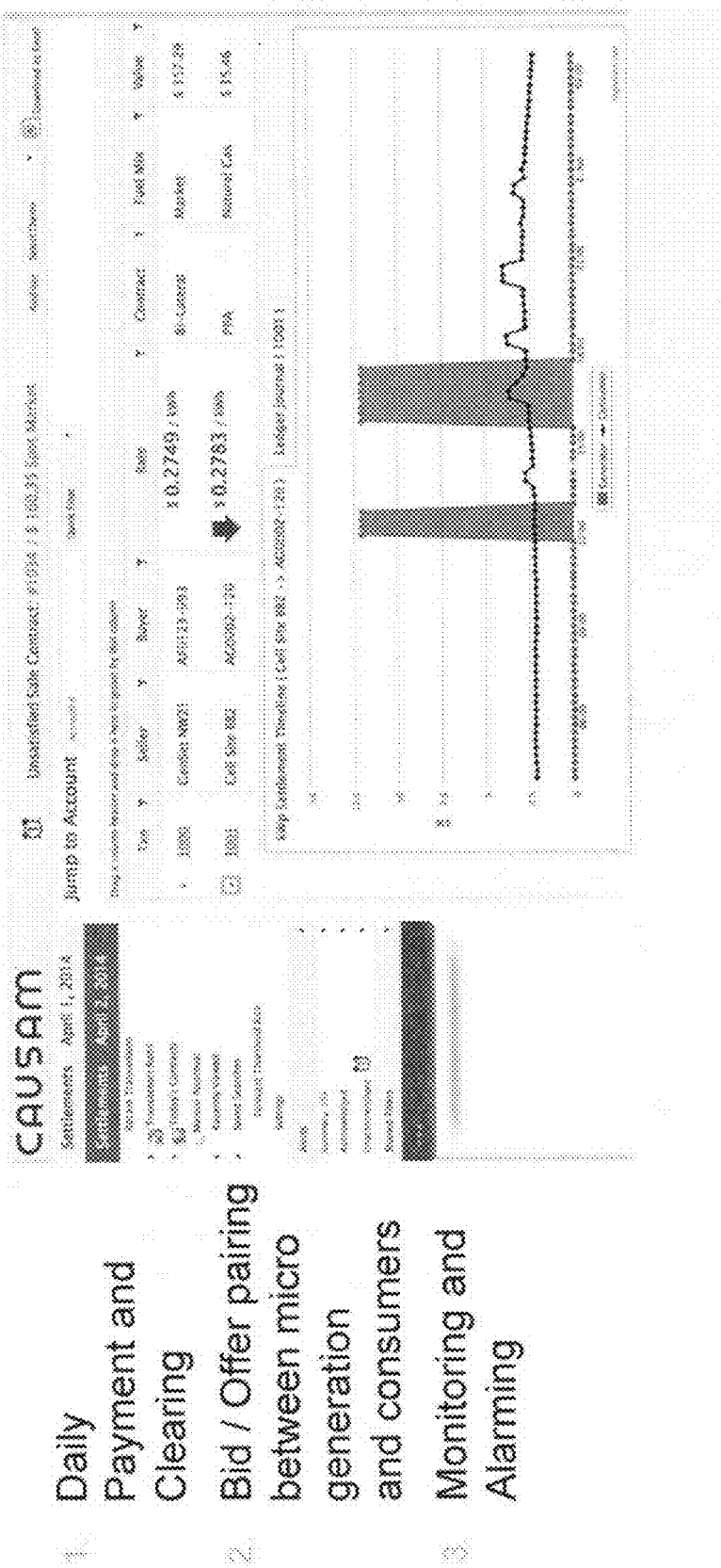
FIG. 16 illustrates a graphic user interface screen shot for an embodiment of the present invention showing an AES App.

FIG. 16 illustrates a graphic user interface screen shot for an embodiment of the present invention showing an AES App. Several instruments can be utilized for developing the datacenter layout.

FIG. 17 illustrates a graphic user interface screen shot for an embodiment of the present invention showing an EnergyNet application development kit.

In one embodiment a GUI is provided for user login for advanced energy settlements application development kit (ADK) for access to functionality within the EnergyNet system, including browser construction and layout (or provide code), connectivity with all real-time communication, connectivity with all command and control, connectivity with all payments and settlements, and connectivity with third party service oriented architecture (SOA) services and enterprises. Market participants, independent power producer, or any end user who can become market participant at the point where they interface with the grid can use ADK to complete a program/app that can be used within the market. By way of example and not limitation, FIG. 18 includes a screen shot diagram illustrating one ADK application for data centers. Also, FIG. 19 includes a screen shot diagram illustrating one ADK application with editing options. Additionally, FIG. 20 includes a screen shot diagram illustrating another ADK application for data centers with alternative visualization within the EnergyNet App Dashboard GUI.

Figure 18:
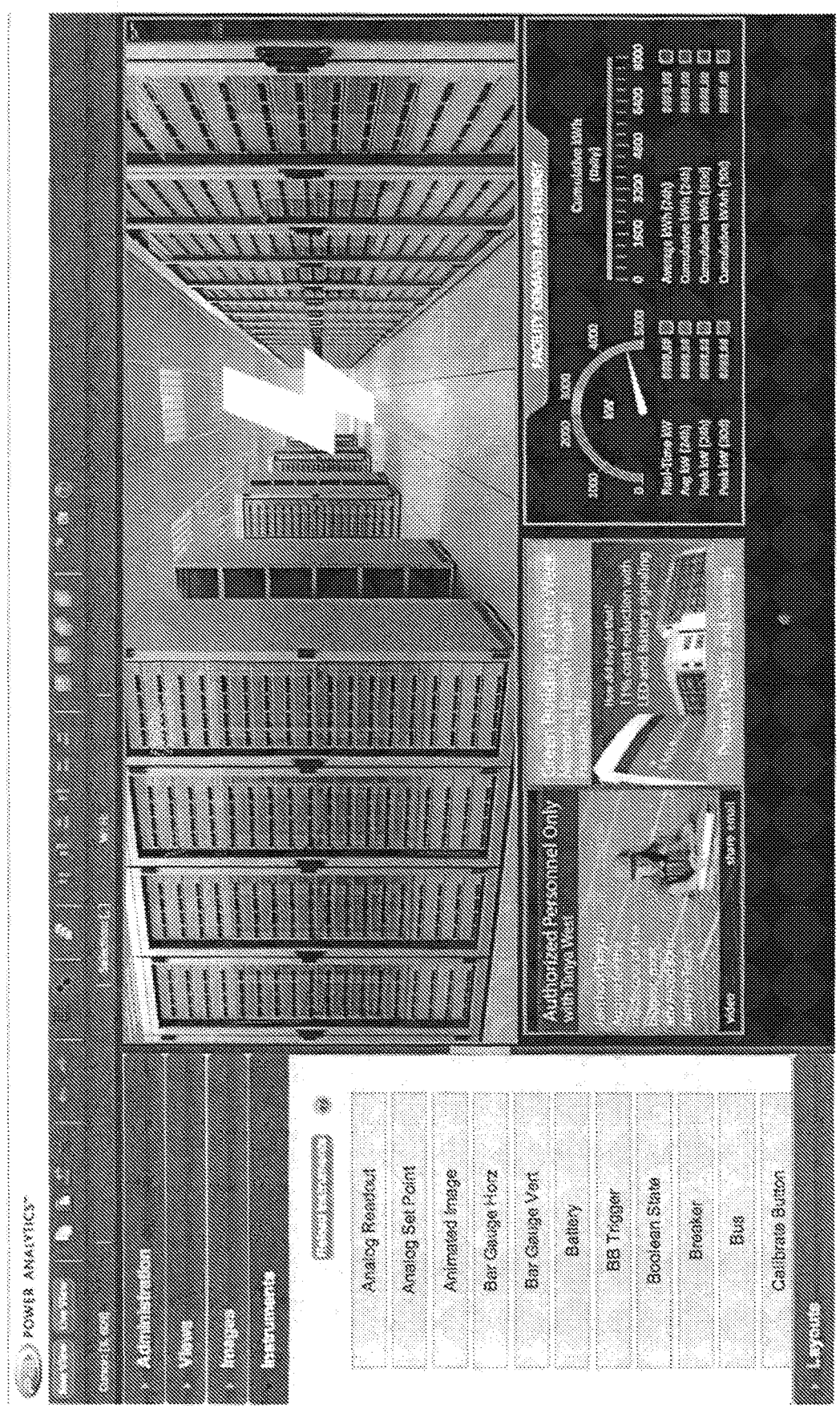
FIG. 18 illustrates another GUI screen shot for the embodiment of FIG. 17 showing a datacenter example case.

FIG. 18 illustrates another GUI screen shot for the embodiment of FIG. 17 showing a datacenter example case.

Figure 19:
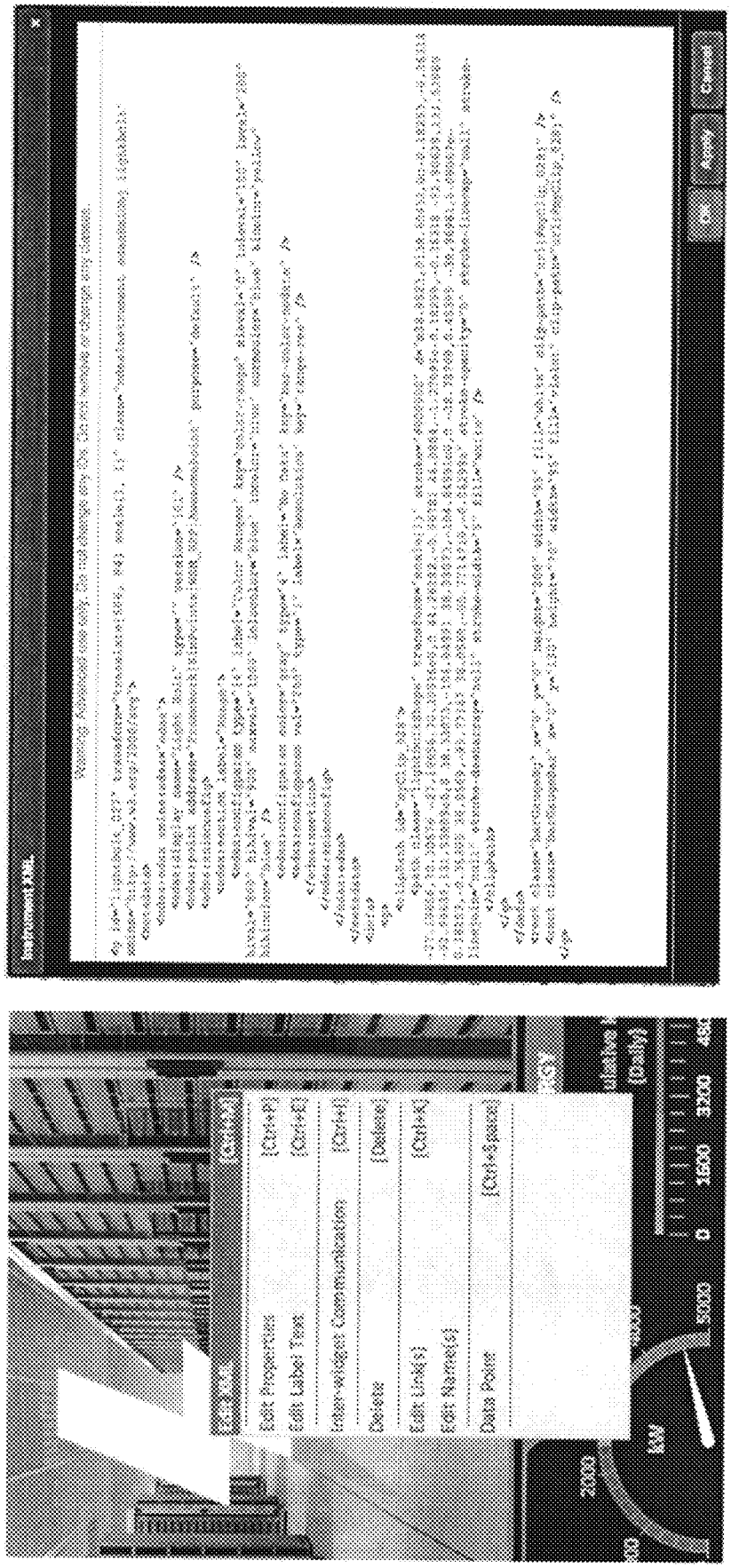
FIG. 19 illustrates another GUI screen shot for the embodiment of FIG. 17 showing a datacenter example case with XML editing.

FIG. 19 illustrates another GUI screen shot for the embodiment of FIG. 17 showing a datacenter example case with XML editing.

Figure 20:
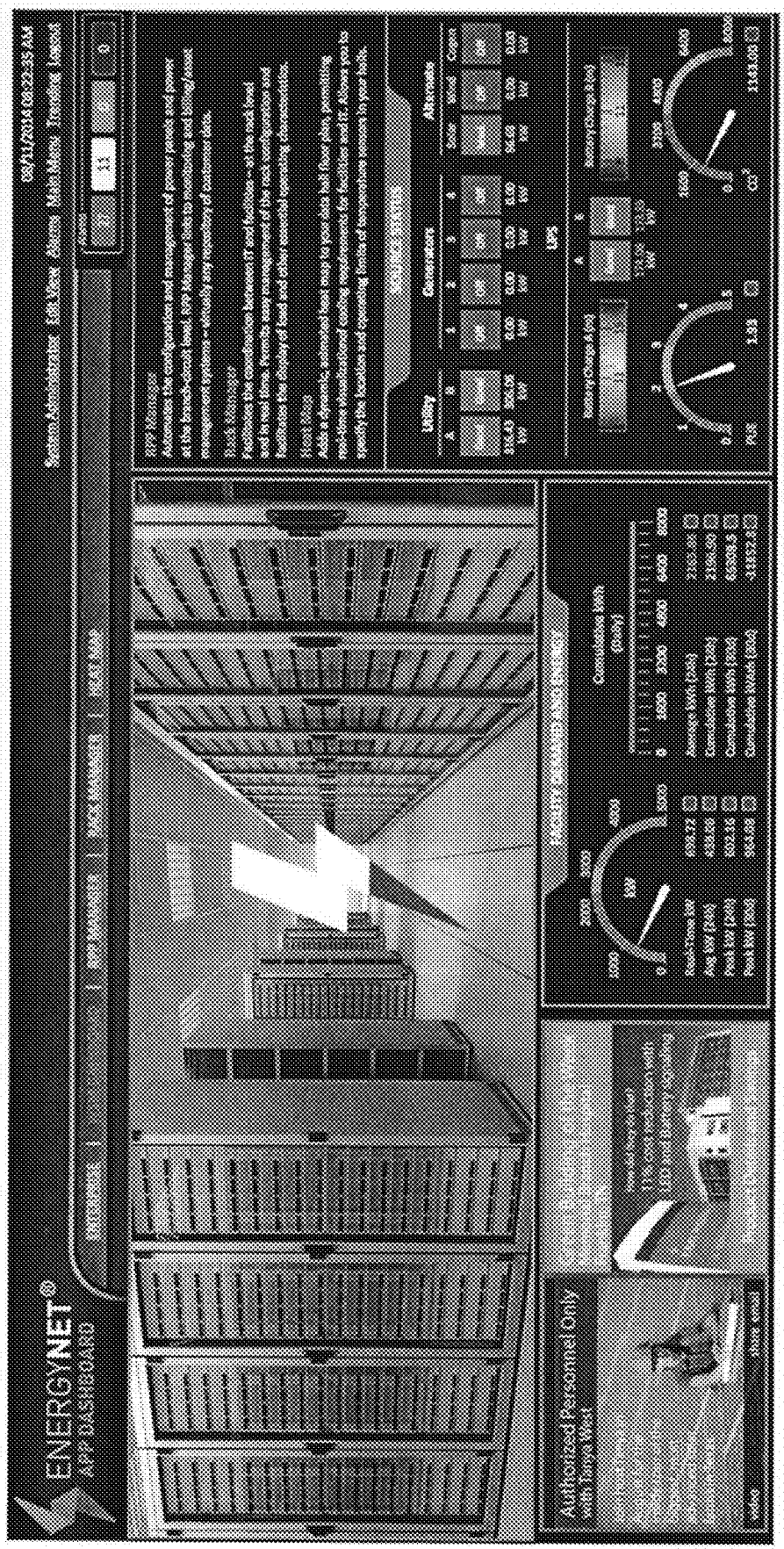
FIG. 20 illustrates another GUI screen shot for the embodiment of FIG. 17 showing a datacenter example case with EnergyNet App dashboard view.

FIG. 20 illustrates another GUI screen shot for the embodiment of FIG. 17 showing a datacenter example case with EnergyNet App dashboard view.

Figure 21:
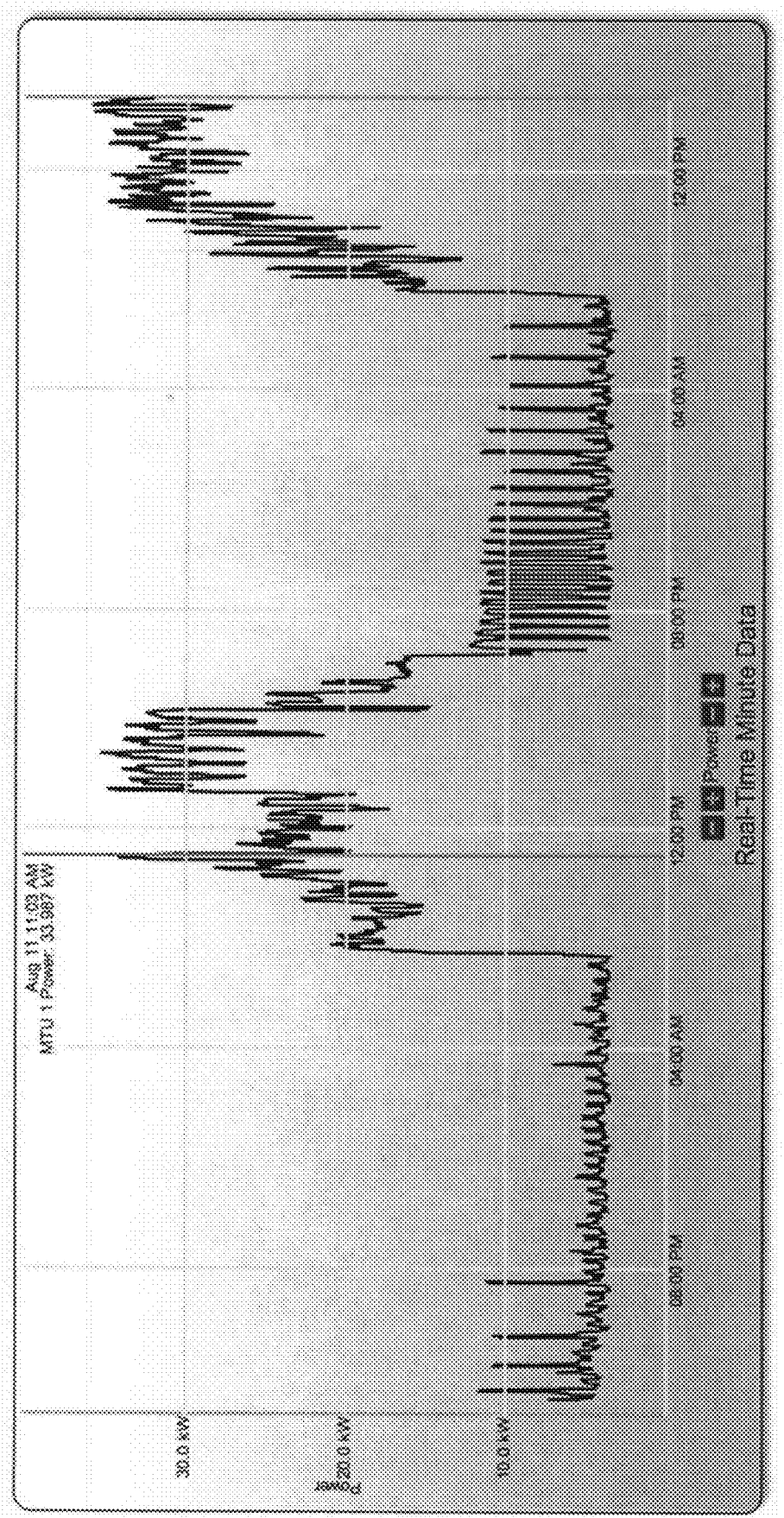
FIG. 21 illustrates another GUI screen shot for the embodiment of FIG. 17 showing an EnergyNet App view for real-time minute data.

FIG. 21 illustrates another GUI screen shot for the embodiment of FIG. 17 showing an EnergyNet App view for real-time minute data.

Figure 22:
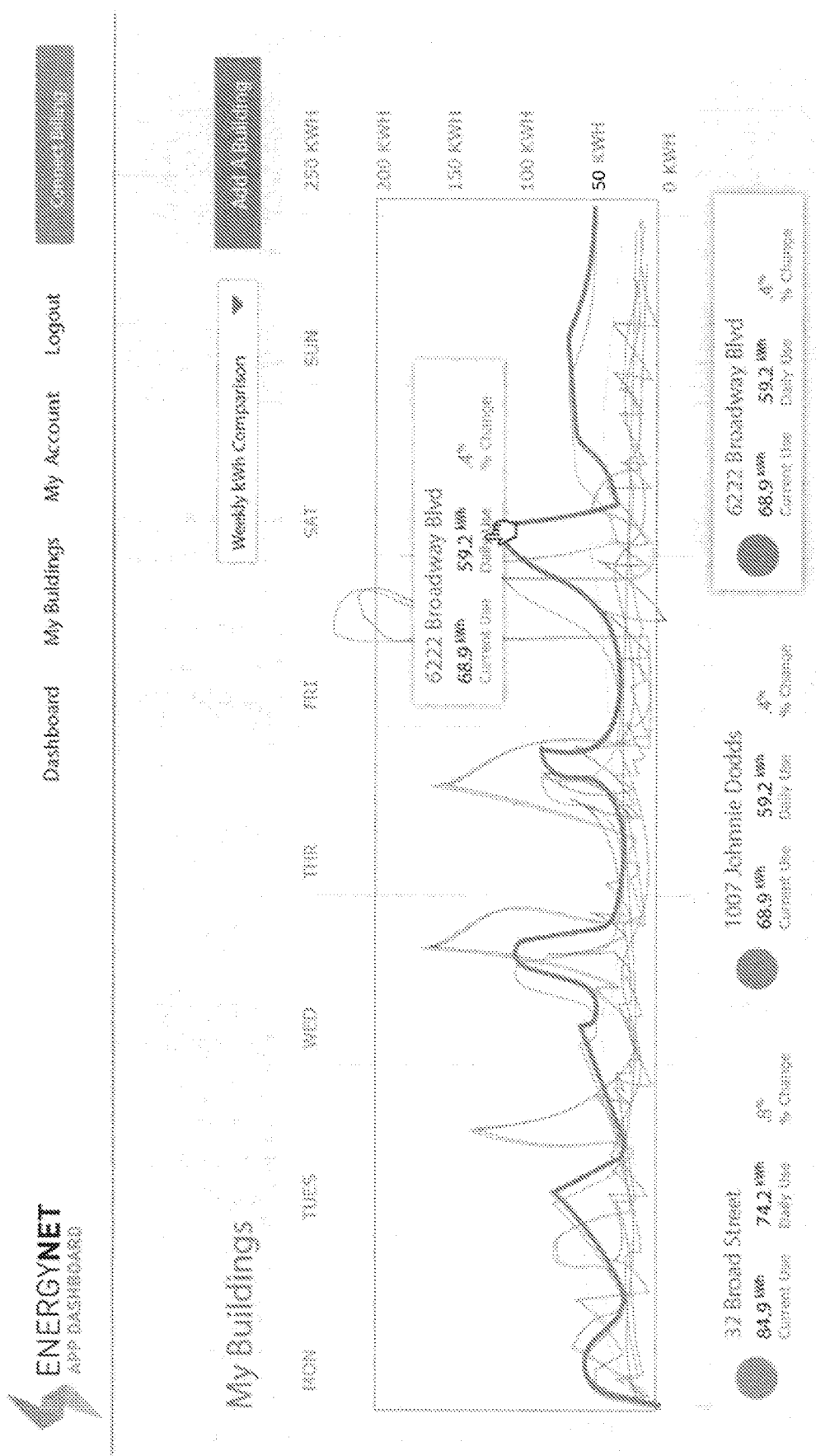
FIG. 22 illustrates another GUI screen shot showing EnergyNet App dashboard view for commercial building or facilities data over time, including historical, real-time, and projected future data for each of at least one commercial building.

FIG. 22 illustrates another GUI screen shot showing EnergyNet App dashboard view for commercial building or facilities data over time, including historical, real-time, and projected future data for each of at least one commercial building.

Figure 23:
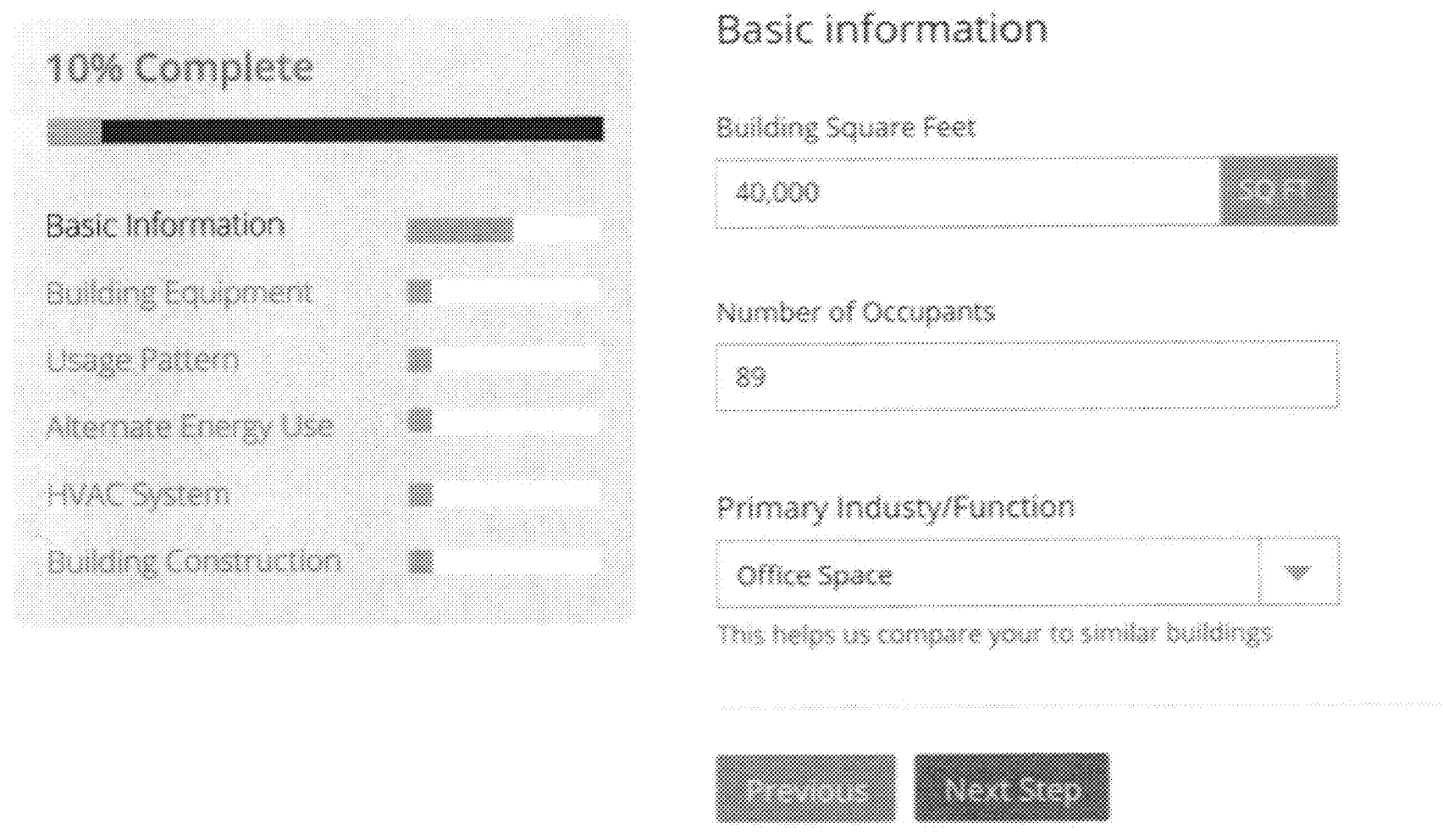

FIG. 23 illustrates another GUI screen shot showing EnergyNet App dashboard view for commercial building or facilities data associated with FIG. 22 for developing a profile for a building or facility.

Figure 24:
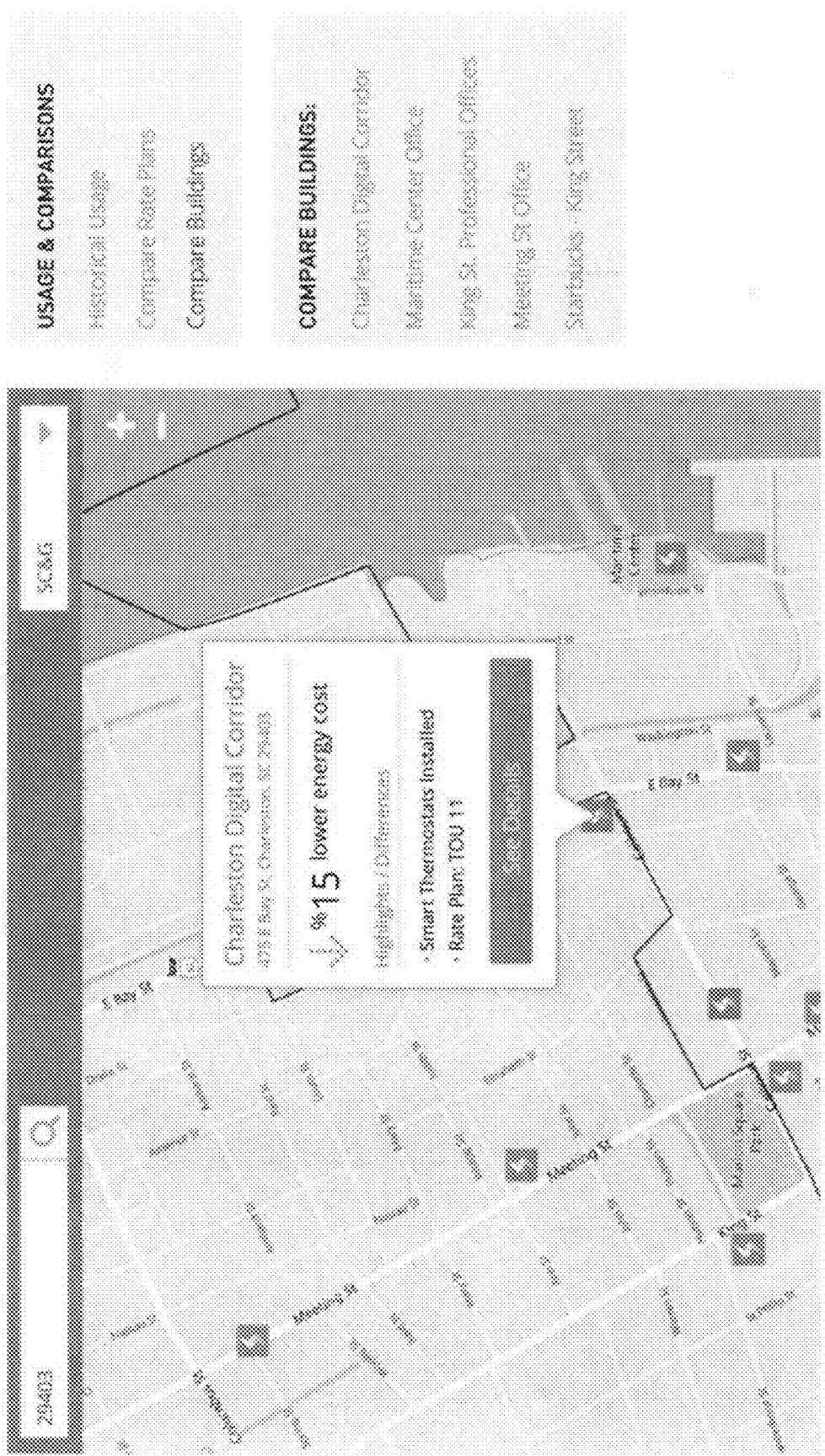
FIG. 24 illustrates another GUI screen shot showing EnergyNet App dashboard view for commercial building or facilities data associated with FIG. 22 for comparing buildings within a predetermined geographic area.

FIG. 24 illustrates another GUI screen shot showing EnergyNet App dashboard view for commercial building or facilities data associated with FIG. 22 for comparing buildings within a predetermined geographic area.

Figure 25:
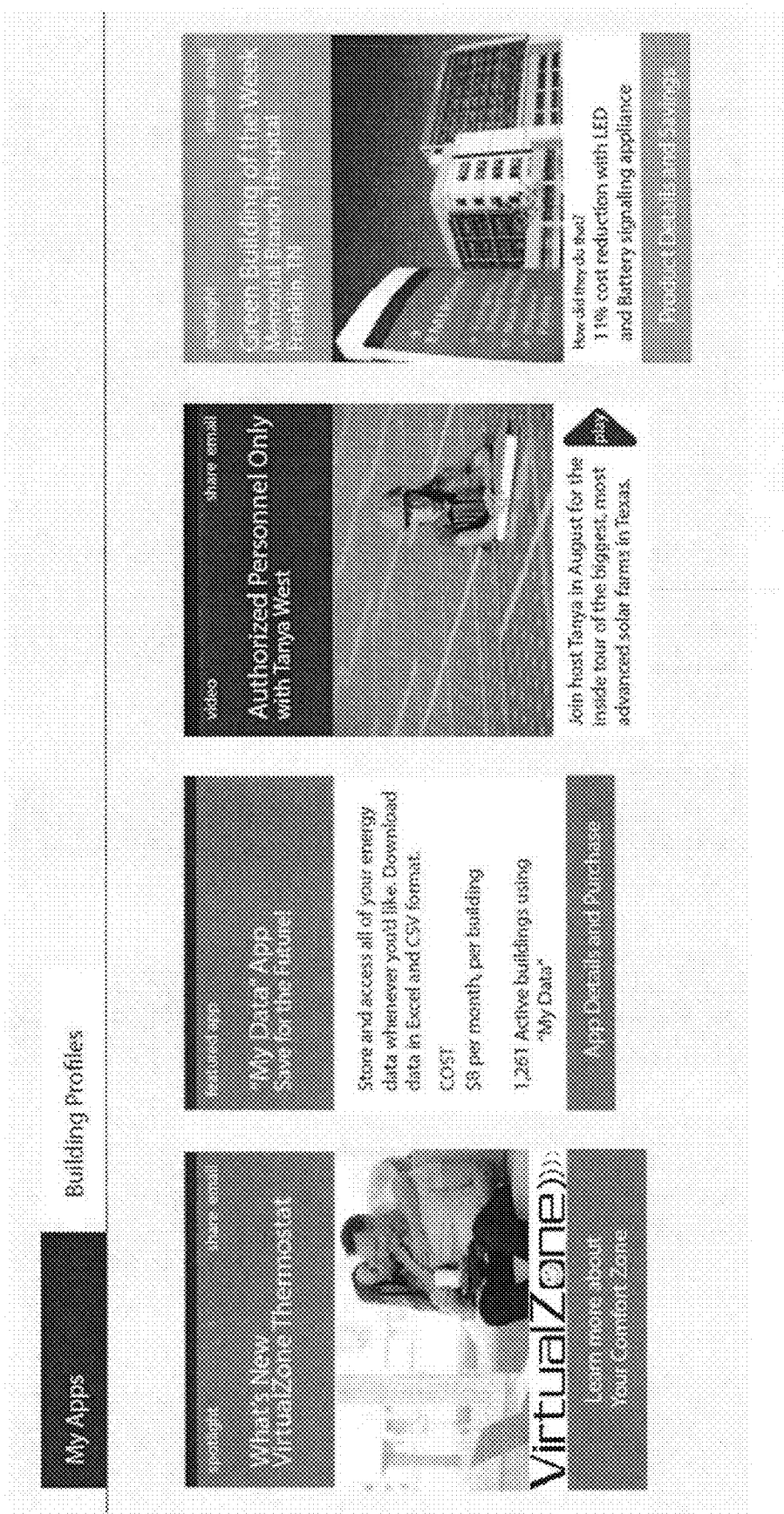
FIG. 25 illustrates another GUI screen shot showing EnergyNet App dashboard view for commercial building or facilities data associated with FIG. 22 for showing Apps associated with the profile and/or account in addition to a tab for building profiles.

FIG. 25 illustrates another GUI screen shot showing EnergyNet App dashboard view for commercial building or facilities data associated with FIG. 22 for showing Apps associated with the profile and/or account in addition to a tab for building profiles.

Figure 26:
FIG. 26 illustrates another GUI screen shot showing EnergyNet App dashboard view for automatically generated recommendations for the user and/or account associated with FIG. 22, including Apps and services offerings.

FIG. 26 illustrates another GUI screen shot showing EnergyNet App dashboard view for automatically generated recommendations for the user and/or account associated with FIG. 22, including Apps and services offerings.

Figure 27:
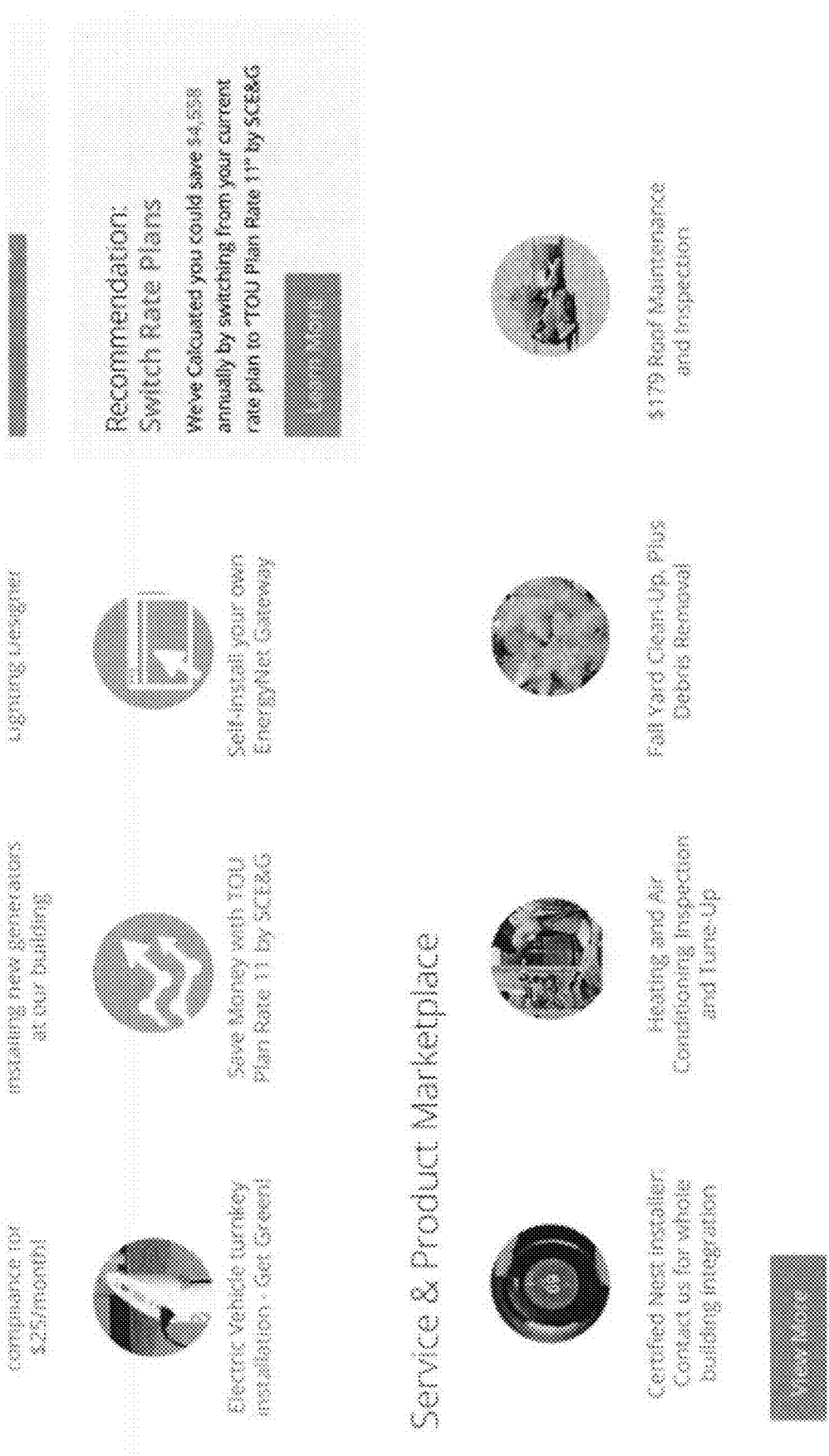
FIG. 27 illustrates another GUI screen shot showing EnergyNet App dashboard view for automatically generated recommendations for the user and/or account associated with FIG. 22, in addition to those illustrated in FIG. 26.

FIG. 27 illustrates another GUI screen shot showing EnergyNet App dashboard view for automatically generated recommendations for the user and/or account associated with FIG. 22, in addition to those illustrated in FIG. 26.

FIG. 28 illustrates another GUI screen shot showing EnergyNet App dashboard view for at least one of the selected automatically generated recommendations for the user and/or account associated with FIG. 27, including automatically generated related offers.

Figure 29:
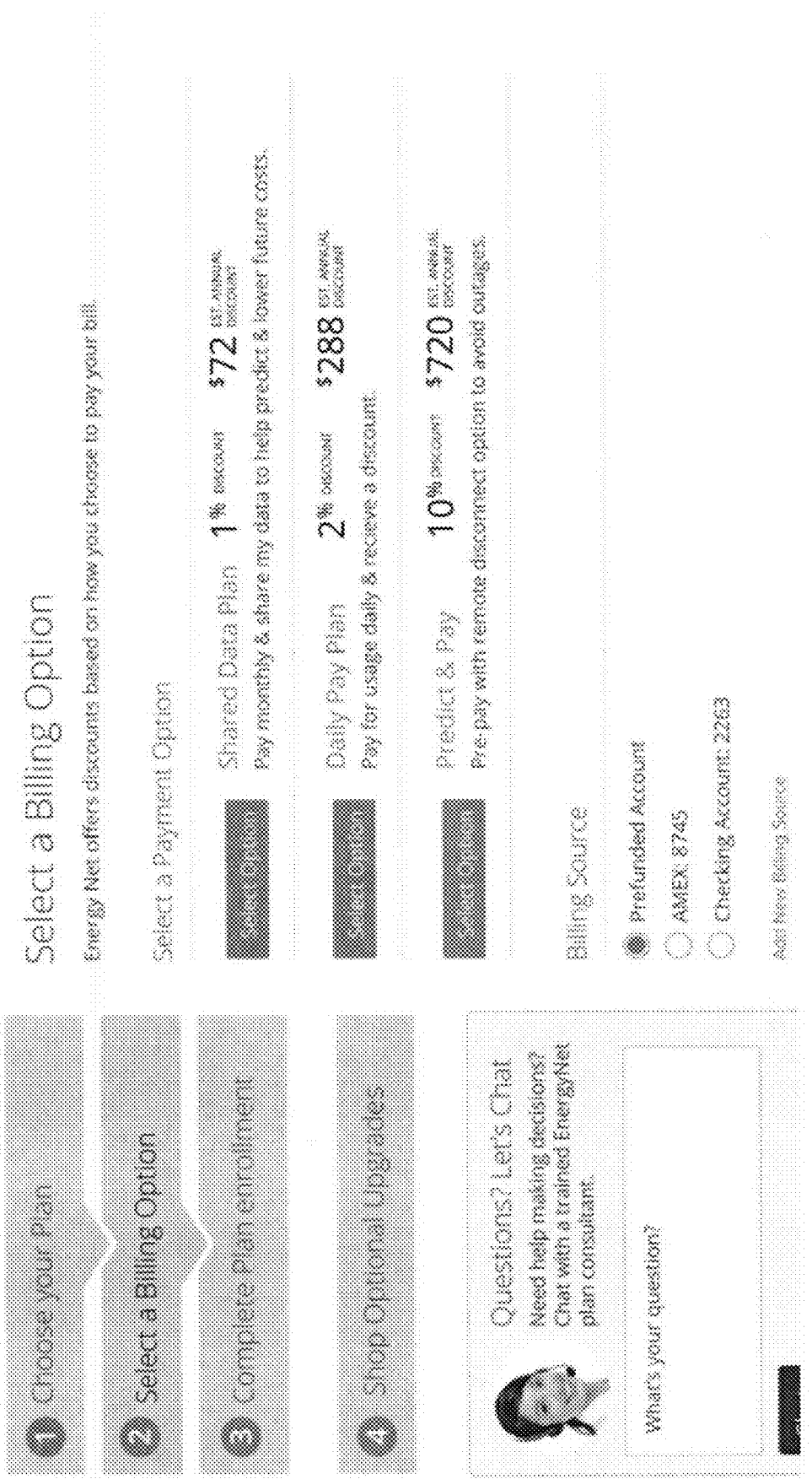
FIG. 29 illustrates a graphic user interface screen shot for an embodiment of the present invention showing a Select a Billing Option interactive GUI providing alternative payment options that are optimized to provide lowest rates for AES, including Billing Source for making electronic payments with credit card(s) and/or financial or bank accounts, including adding New Billing Source.

FIG. 29 illustrates a graphic user interface screen shot for an embodiment of the present invention showing a Select a Billing Option interactive GUI providing alternative payment options that are optimized to provide lowest rates for AES, including Billing Source for making electronic payments with credit card(s) and/or financial or bank accounts, including adding New Billing Source.

EnergyNet is a one-stop-shop and provides an automated payment exchange using advanced billing models which allow customers to pay for data in a variety of ways, for example a shared data plan coupled with a monthly payment plan, a daily payment plan, and/or pre-payment plan with a remote disconnect option enabled. Single payments simplify access to the distributed energy market and are automatically aggregated and settled between the distributed and fixed generators via energy retailers. Prompt payment reduces the cost of capital, bad debt and credit risk for market participants; it is a fundamental aspect of the AES. Payments are collected through integration with third party payment banking systems and can be managed by customers in the Energy Net Customer Portal GUI.

Figure 30:
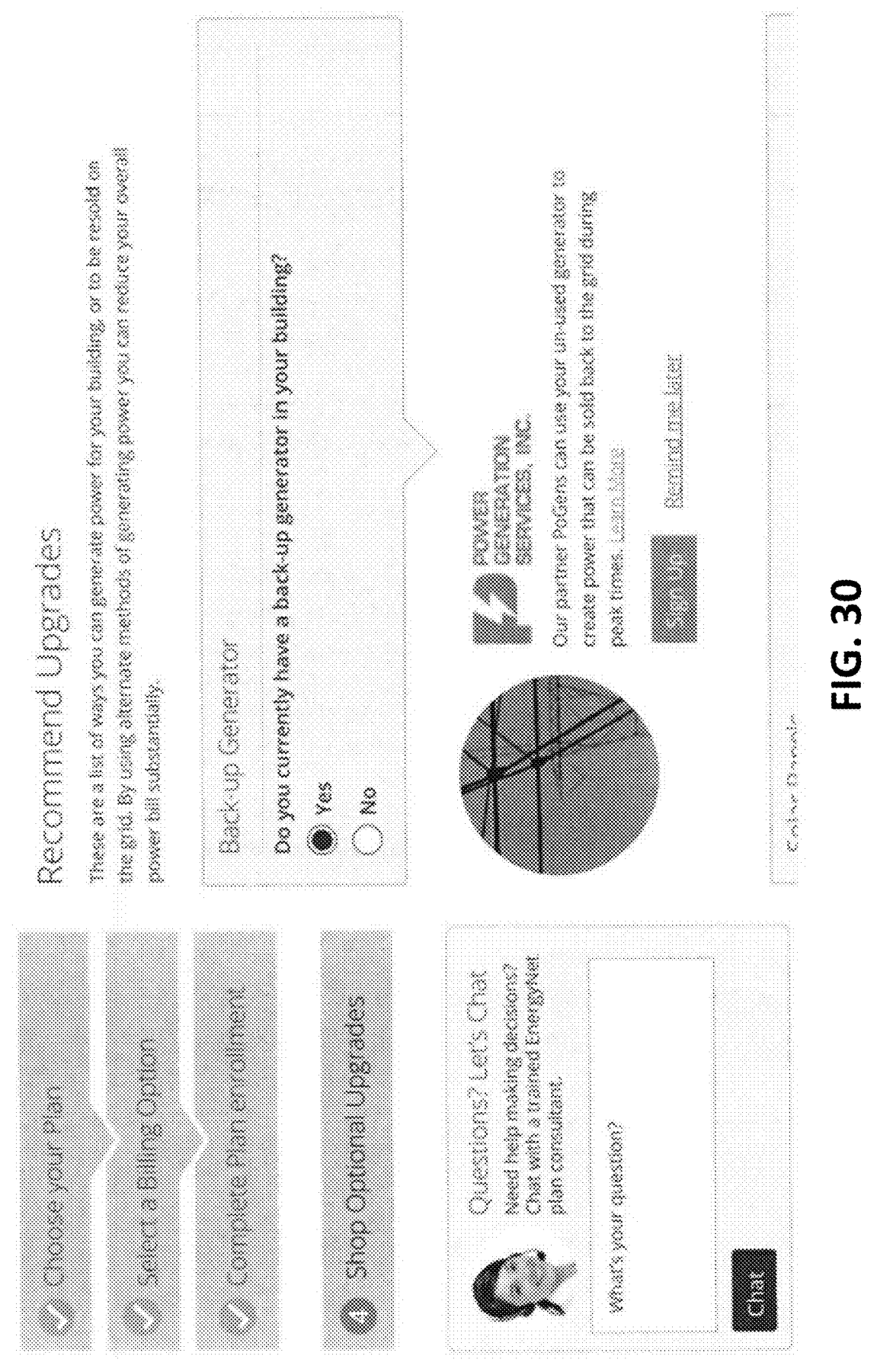

FIG. 30 illustrates another GUI screen shot showing EnergyNet App dashboard view for completing AES plan enrollment and showing Recommend Upgrades options for interactive selection.

Figure 31:
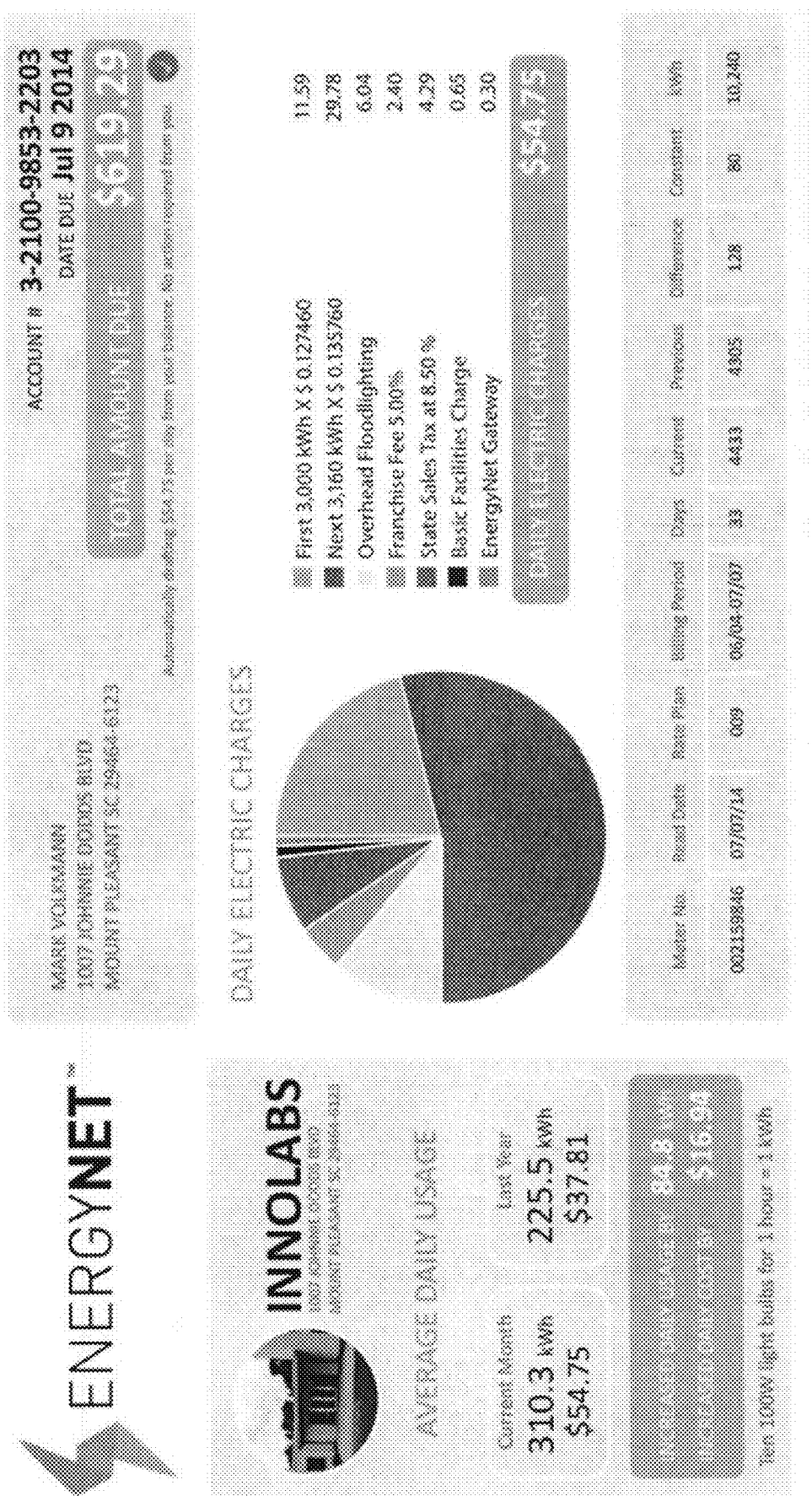
FIG. 31 illustrates another GUI screen shot showing EnergyNet App view for an AES financial summary for a building as illustrated in the prior figures associated with FIG. 22 for a commercial building.

FIG. 31 illustrates another GUI screen shot showing EnergyNet App view for an AES financial summary for a building as illustrated in the prior figures associated with FIG. 20 for a commercial building.

Figure 32:
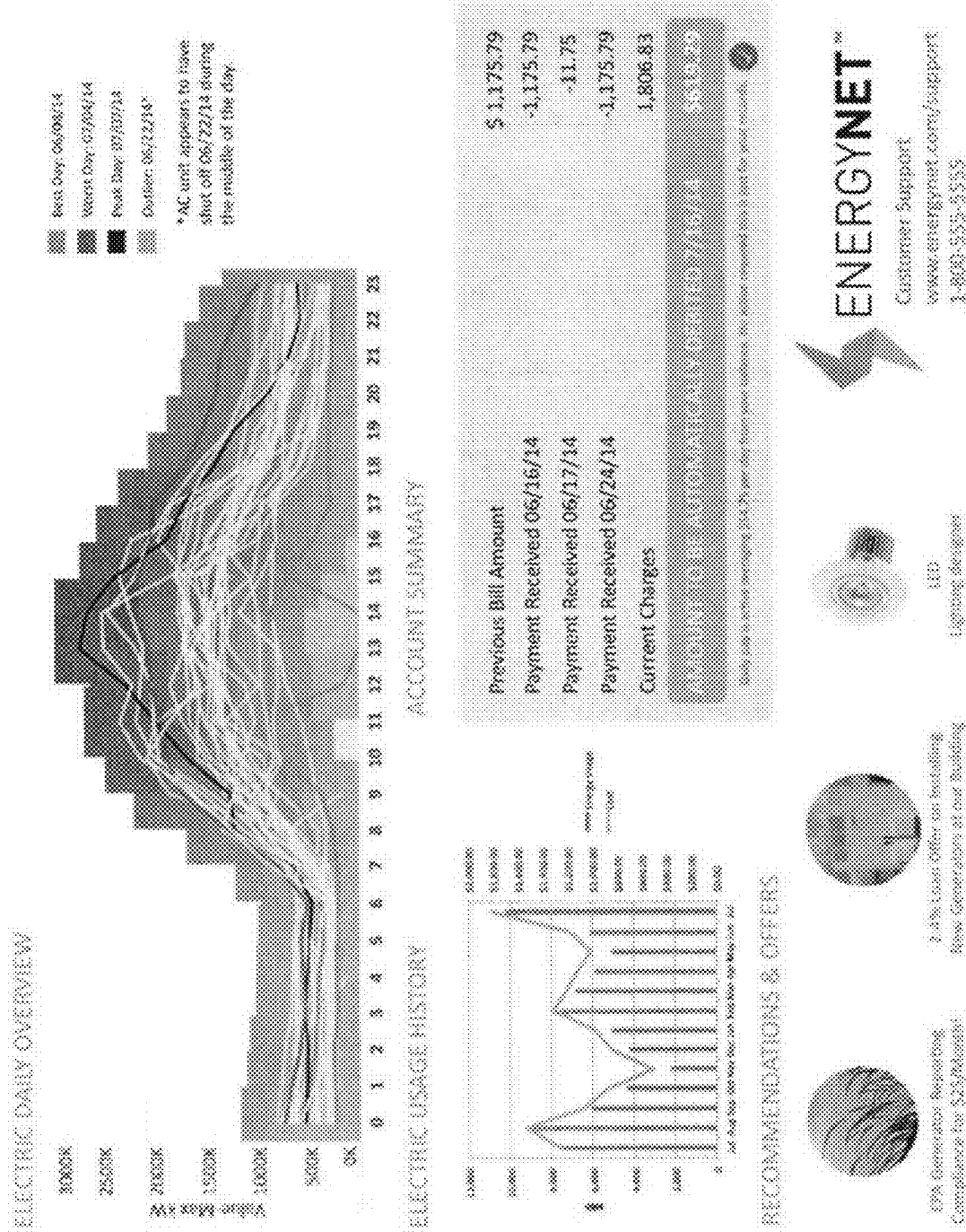
FIG. 32 illustrates another GUI screen shot showing EnergyNet App view for an AES financial summary with additional information relating to FIG. 31.

FIG. 32 illustrates another GUI screen shot showing EnergyNet App view for an AES financial summary with additional information relating to FIG. 31. This additional information includes electric daily overview, electric usage history, account summary, and recommendations and offers.

Figure 33:
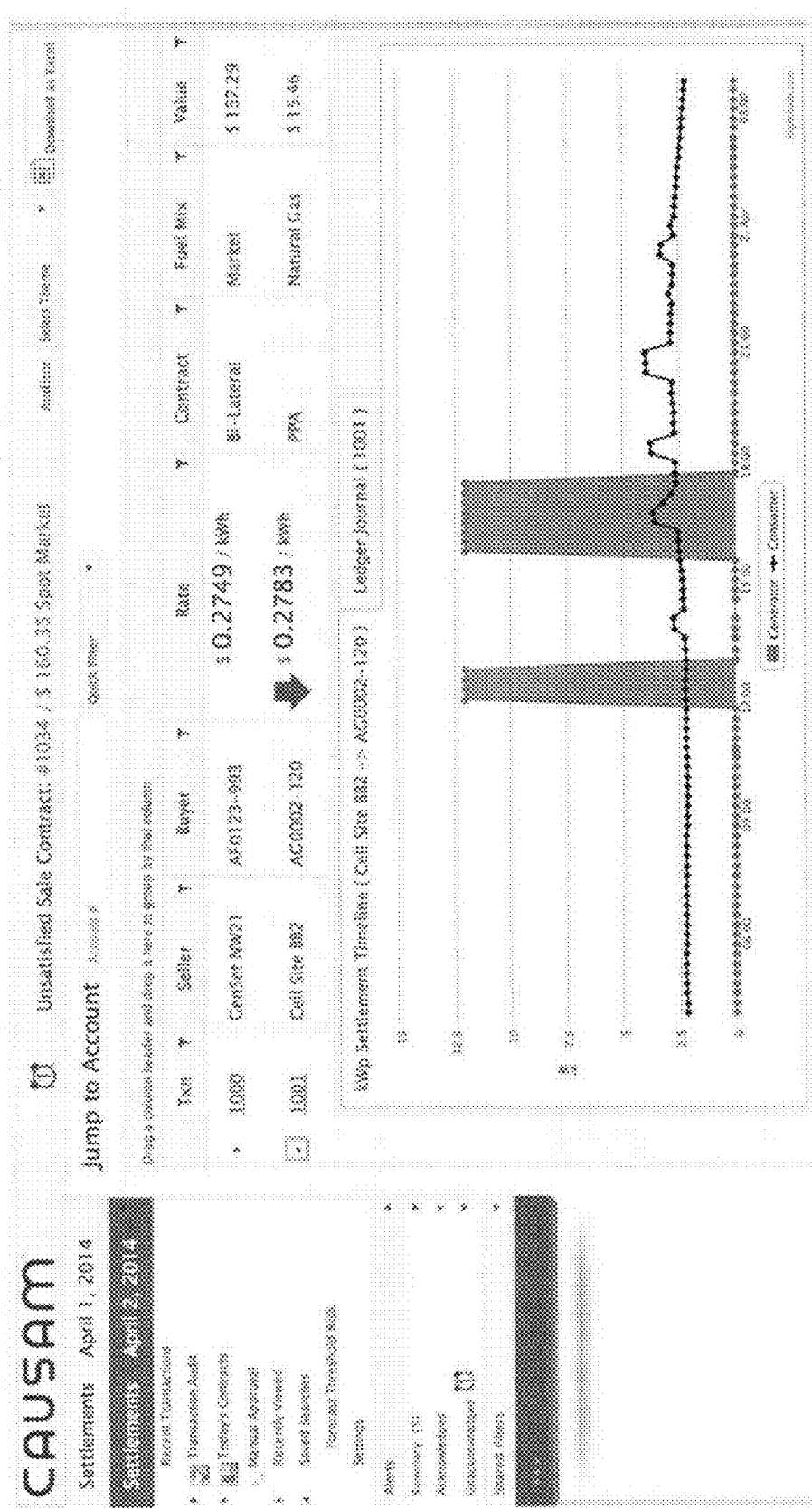
FIG. 33 illustrates another GUI screen shot showing EnergyNet App dashboard view for REPs for AES participation, including at least a partial ledger view.

FIG. 33 illustrates another GUI screen shot showing EnergyNet App dashboard view for REPS for AES participation, including at least a partial ledger view. Information, such as sellers, buyers, rates, contracts, fuel types, and value, is listed for each transaction. A kWp settlement timeline is also provided.

FIG. 31 provides a screen shot diagram illustrating billing and payments for advanced energy settlements with EnergyNet systems and methods of the present invention. Additionally, FIG. 32 provides a screen shot diagram illustrating billing and payments with EnergyNet systems and methods of the present invention. More particularly, electricity daily overview is illustrated with graphic visualization for best day, worst day, peak day, outlier, and combinations thereof, for a predetermined billing period within a plan for EnergyNet billing and payments. Also, FIG. 33 provides a screen shot diagram illustrating billing and payments for advanced energy settlements with EnergyNet systems and methods of the present invention, including daily payment and clearing, bid and offer pairing between micro-generation or other generation and consumers, and monitoring and alarming. Graphic visualization with a curve comparison of energy activity within a predetermined timeframe and the activation of micro-generation supply for sub-periods within the predetermined timeframe are shown, which improve the pricing under the EnergyNet advanced settlements with the systems and methods of the present invention.

Figure 34:
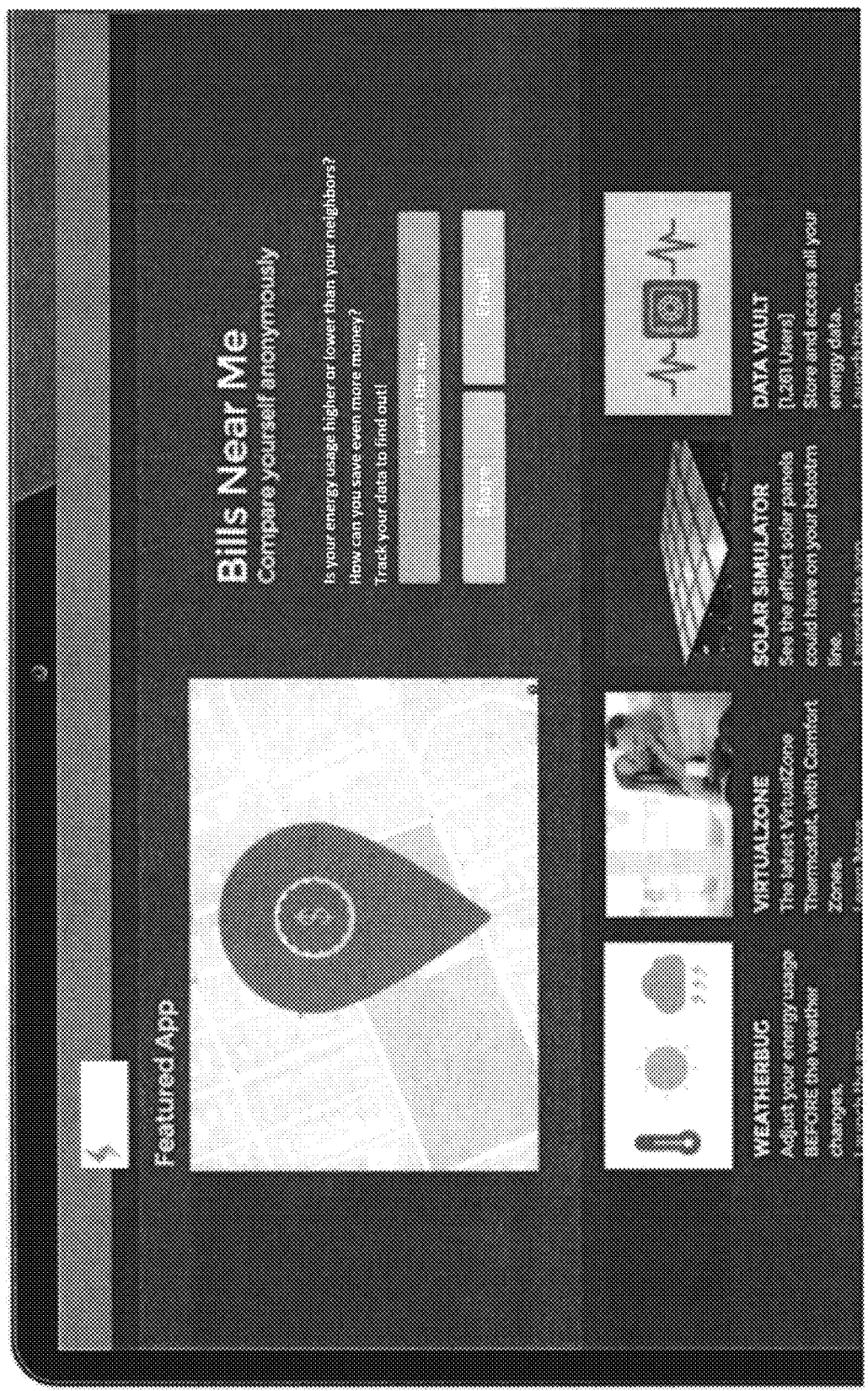
FIG. 34 illustrates another GUI screen shot showing EnergyNet App dashboard view for a featured App for anonymous comparison of electrical energy usage within a predetermined geographic area, as well as other Apps, for selection for an account and/or user.

FIG. 34 illustrates another GUI screen shot showing EnergyNet App dashboard view for a featured App for anonymous comparison of electrical energy usage within a predetermined geographic area, as well as other Apps, for selection for an account and/or user.

FIGS. 35-38 illustrate GUI screen shots for a mobile smartphone App for electric vehicle (EV) charging.

Figure 35:
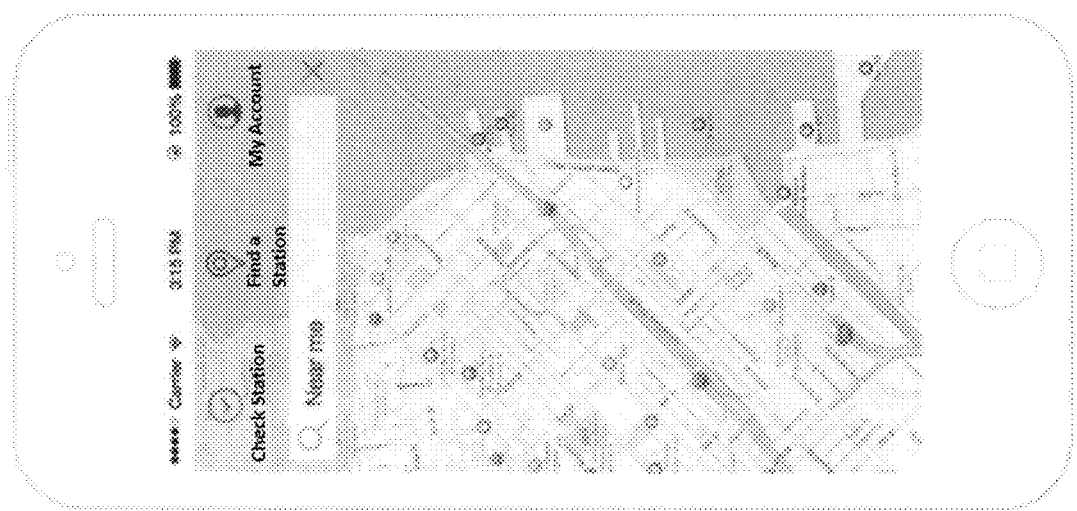
FIGS. 35-38 illustrate GUI screen shots for a mobile smartphone App for electric vehicle (EV) charging.

FIG. 35 relates to finding a station and includes a GPS-based map and current location of the EV App user. This App is operable to locate and reserve a station near you now, in advance or on your GPS itinerary, and provide target marketing based on user profile and priority. A "green" App is for people focusing on recharging. An "urban" App is for people focused on reserved parking. A "healthy" app is for people focused on shopping.

Figure 36:
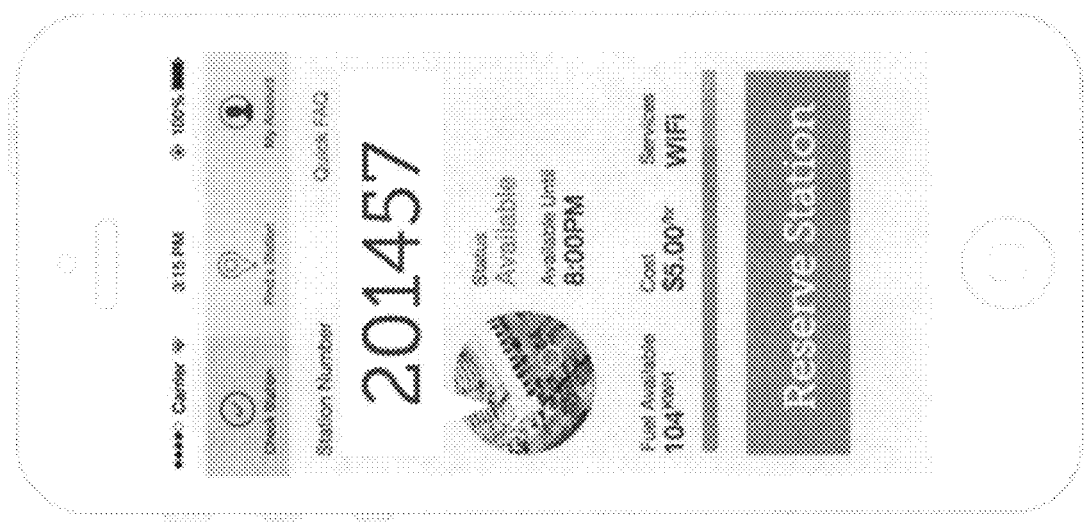

FIG. 36 relates to reserving a station and includes a blow-out section from a GPS-based map. Information such as availability, fees, recharge strength, amenities, and nearby services, is provides. Users may book reservation in advanced, or pre-purchase one time or with subscription.

Figure 37:

FIG. 37 relates to arriving at the station reserved in FIG. 36. Once arriving at the reserved station, a user simply parks his car, receives a push notification call to action, and purchases via smartphone device or in vehicle dash display. New users need to sign up by GPS location, QR, RFID, Video, or EV charger identification.

Figure 38:
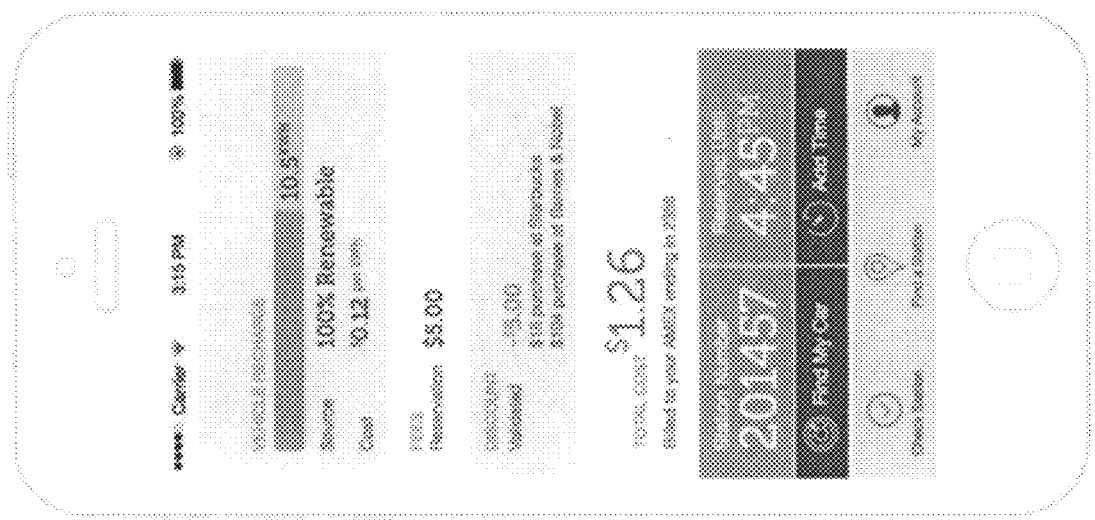

FIG. 38 relates to data associated with the parked and/or charging time for the EV and related reserved station of FIG. 36. Users can view vehicle recharging status and fees associated, browse offers, order food, and easily top-up or extend reservation. Discounts and parking validation is automatic by local retailers and marketers. Users can view their vehicles through video security monitoring while enjoying free WiFi videos and games.

Figure 39:
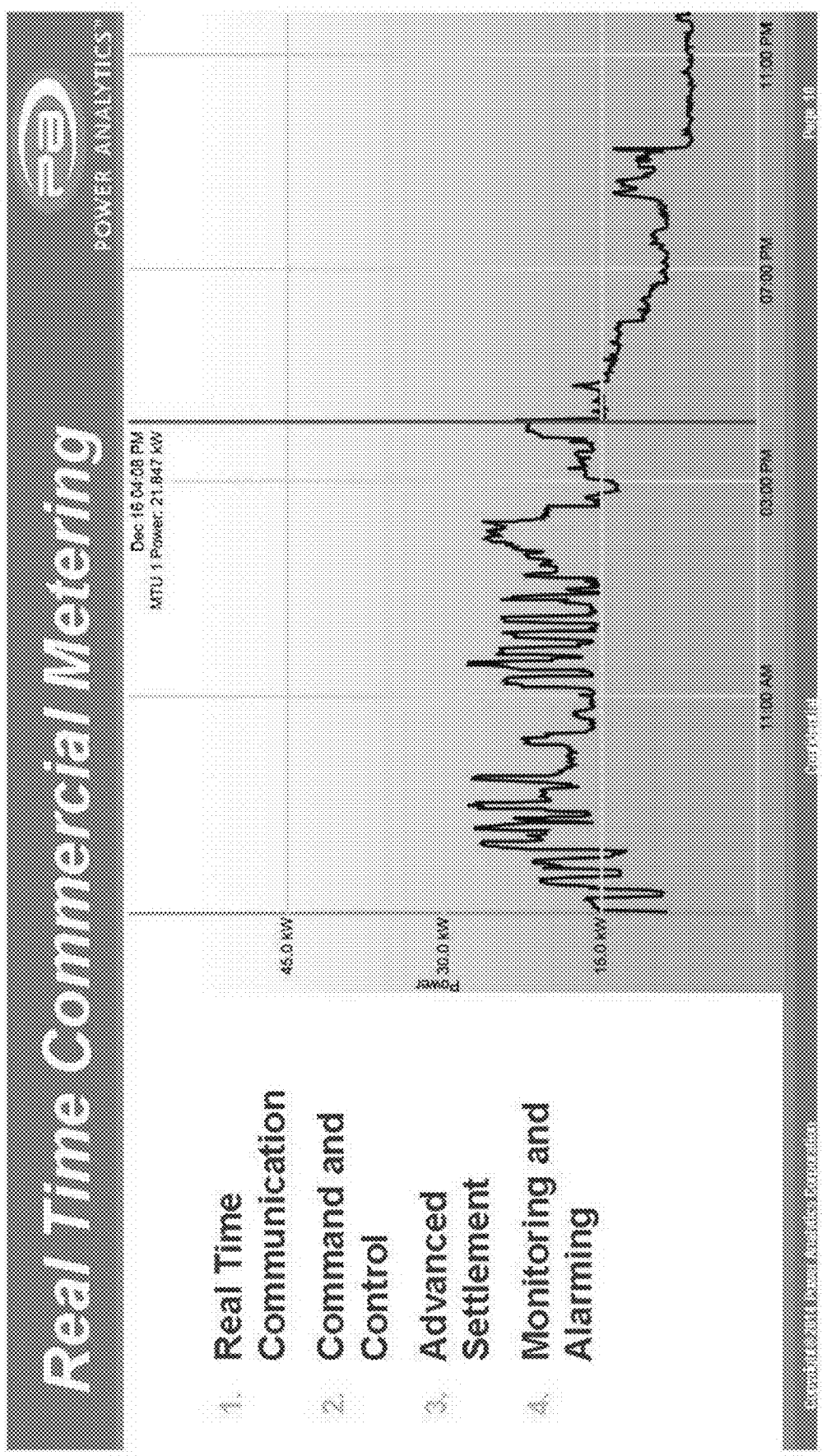
FIG. 39 provides a screen shot diagram illustrating real time commercial metering with real-time communication, command and control, advanced energy settlement, monitoring and alarming.

FIG. 39 provides a screen shot diagram illustrating real time commercial metering with real-time communication, command and control, advanced energy settlement, monitoring and alarming.

Figure 40:
FIG. 40 provides a screen shot diagram illustrating electric vehicles applications with real-time communication, customer profile, command and control, advanced energy settlement, monitoring and alarming including turnkey installation for charging stations with meters and a screen shot illustration depicted on a mobile smartphone device for reserving a station at a predetermined location for a predetermined time for charging EVs, including energy pricing and other details associated with that station.

FIG. 40 provides a screen shot diagram illustrating electric vehicles applications with real-time communication, customer profile, command and control, advanced energy settlement, monitoring and alarming including turnkey installation for charging stations with meters and a screen shot illustration depicted on a mobile smartphone device for reserving a station at a predetermined location for a predetermined time for charging EVs, including energy pricing and other details associated with that station.

Figure 41:
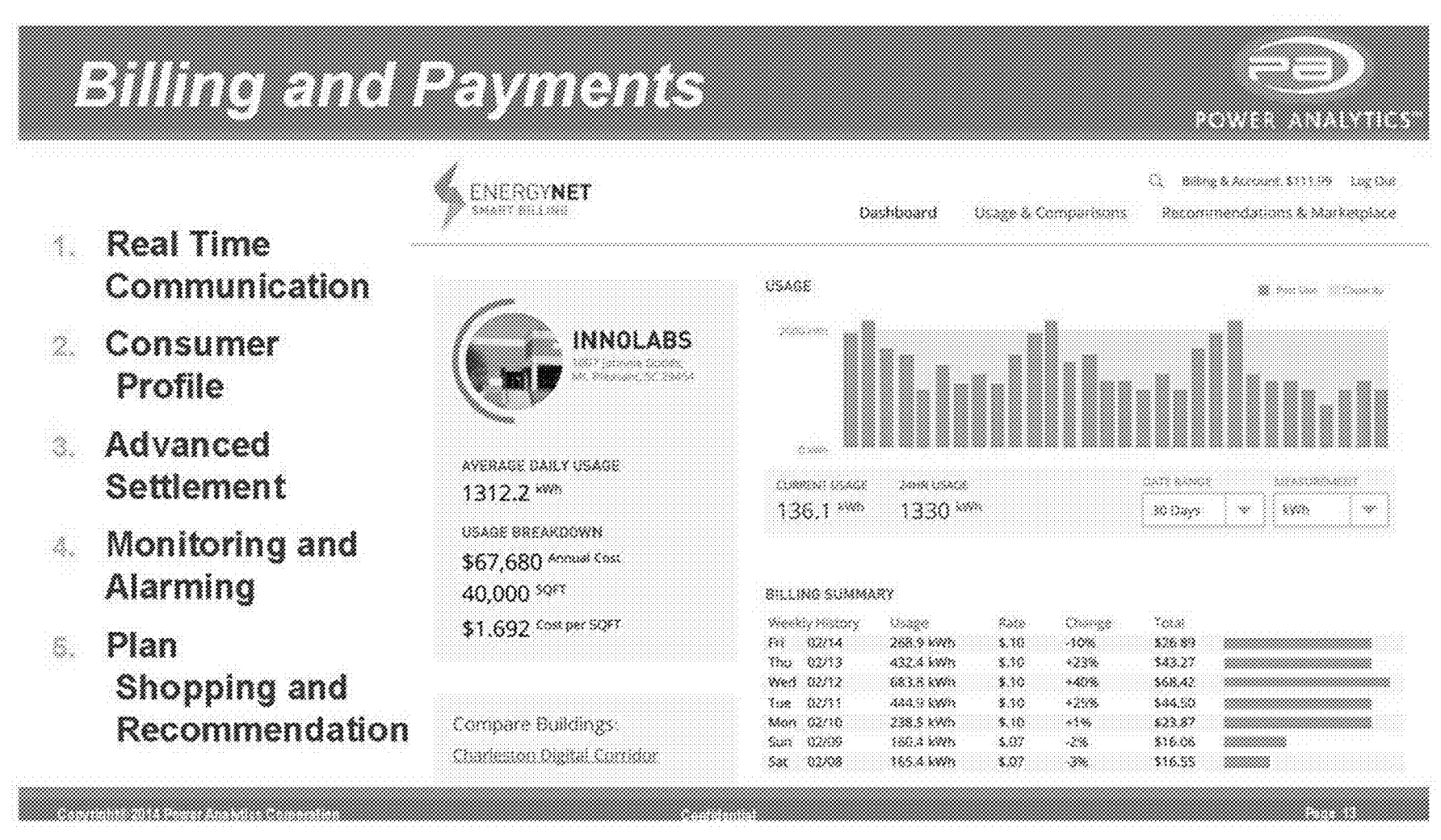
Figure 42:
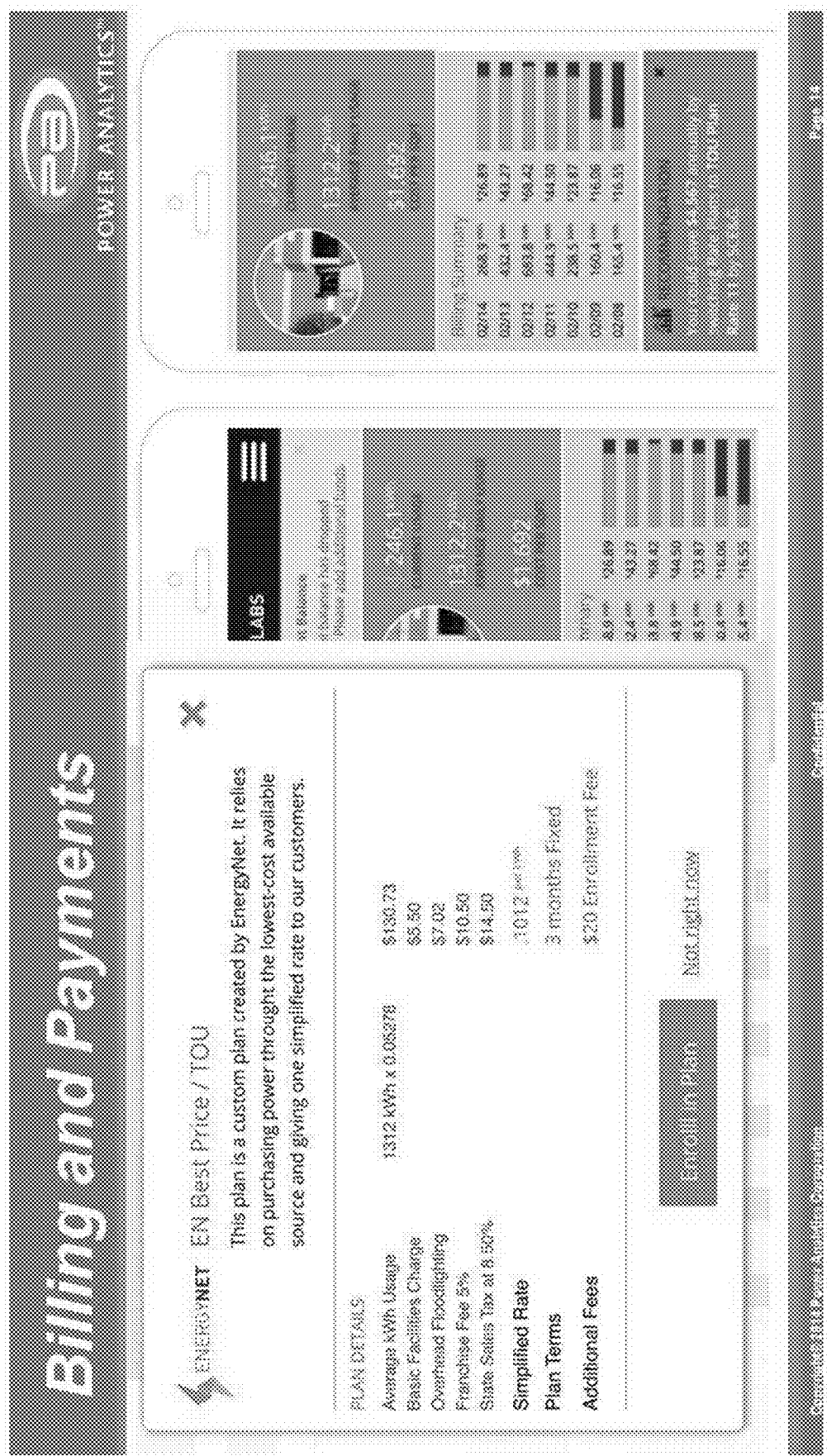
FIG. 42 provides a screen shot diagram illustrating billing and payments for advanced energy settlements.
Figure 43:
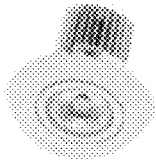
FIG. 43 provides a screen shot diagram illustrating consumer engagement with recommendations for individual (person or corporate entity) energy consumers advanced energy settlements with EnergyNet systems and methods of the present invention.

FIG. 41 provides a screen shot diagram illustrating billing and payments with real-time communication, customer profile, command and control, advanced energy settlement, monitoring and alarming, and market-based pricing for electricity supply from the market participants (plan shopping) and plan recommendation for predetermined facilities and locations, such as by way of example and not limitation, commercial office building location and its corresponding profile, including historical data and real-time data for electrical power consumption and pricing. Also, FIG. 42 provides a screen shot diagram illustrating billing and payments for advanced energy settlements with EnergyNet best price and corresponding terms of use, plan details, and enrollment link or automated enrollment upon user selection and acceptance of terms of use for a predetermined plan for a predetermined time period. Contractual agreements will control and govern the plans following the enrollment process. FIG. 43 provides a screen shot diagram illustrating consumer engagement with recommendations for individual (person or corporate entity) energy consumers advanced energy settlements with EnergyNet systems and methods of the present invention, including marketplace of services, advanced energy settlement, and profile and recommendations. FIG. 44 includes a screen shot GUI diagram illustrating consumer engagement with related offers (for example as illustrated in FIG. 43) for individual (person or corporate entity) energy consumers advanced energy settlements with EnergyNet systems and methods of the present invention, including marketplace of services, advanced energy settlement, and profile and recommendations.

Figure 45:
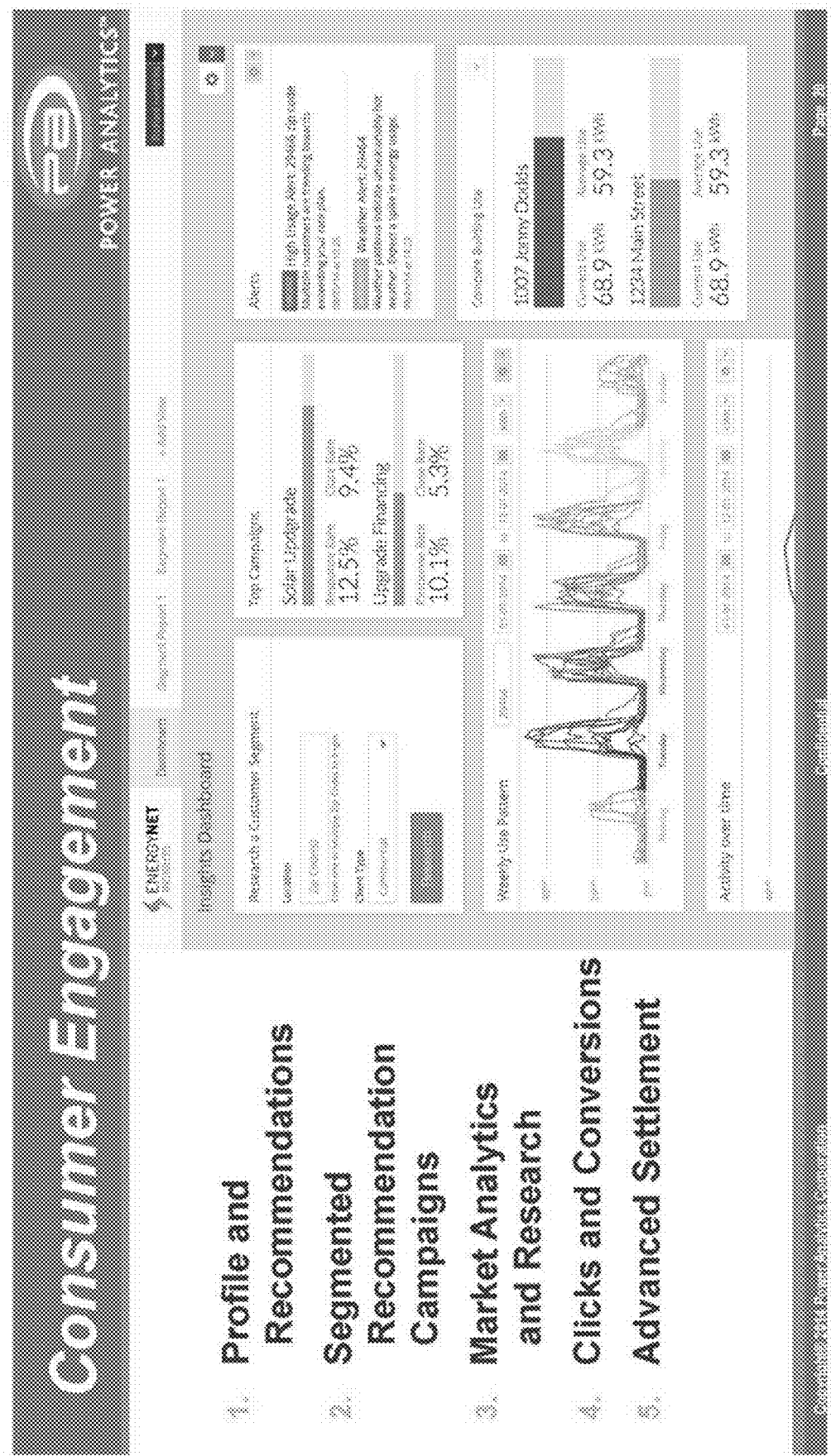

FIG. 45 and FIG. 46 each provides a screen shot diagram illustrating consumer engagement GUI insights dashboard with data analytics automatically provided for individual (person or corporate entity) energy consumers having advanced energy settlements with EnergyNet systems and methods of the present invention, including profile and recommendations, segmented recommendation campaigns, market analytics and research, clicks and conversions for new consumers, and advanced energy settlement.

Figure 47:
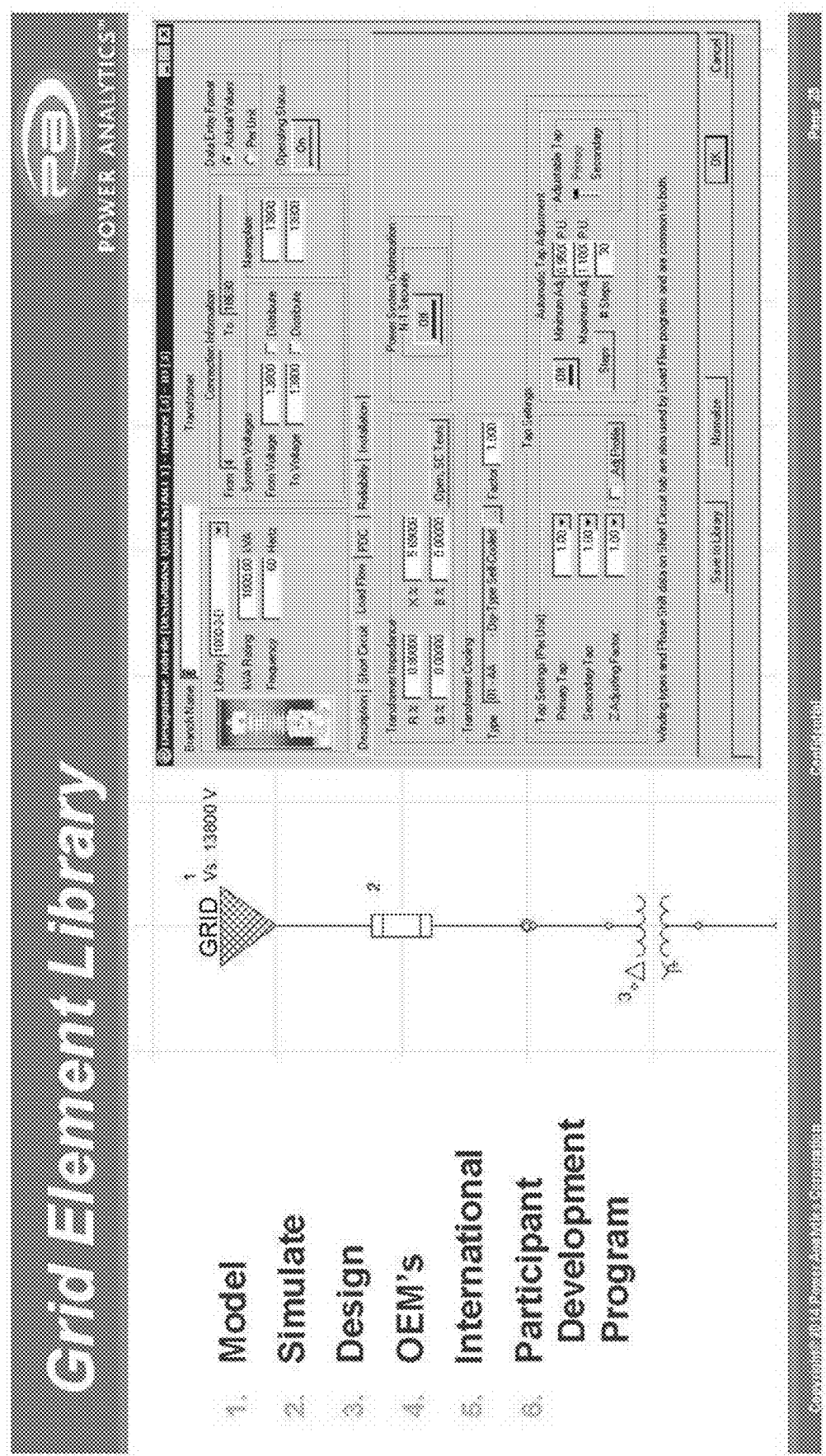
FIG. 47 includes a sample from a grid element library showing a schematic diagram illustrating grid elements and their corresponding specifications, and functionality of the present invention systems and methods for grid element modeling, simulation, design, OEMs or suppliers of the grid elements for commercial purchase or ordering, international equivalents and compatibility, and a participant development program using them.
Figure 48:
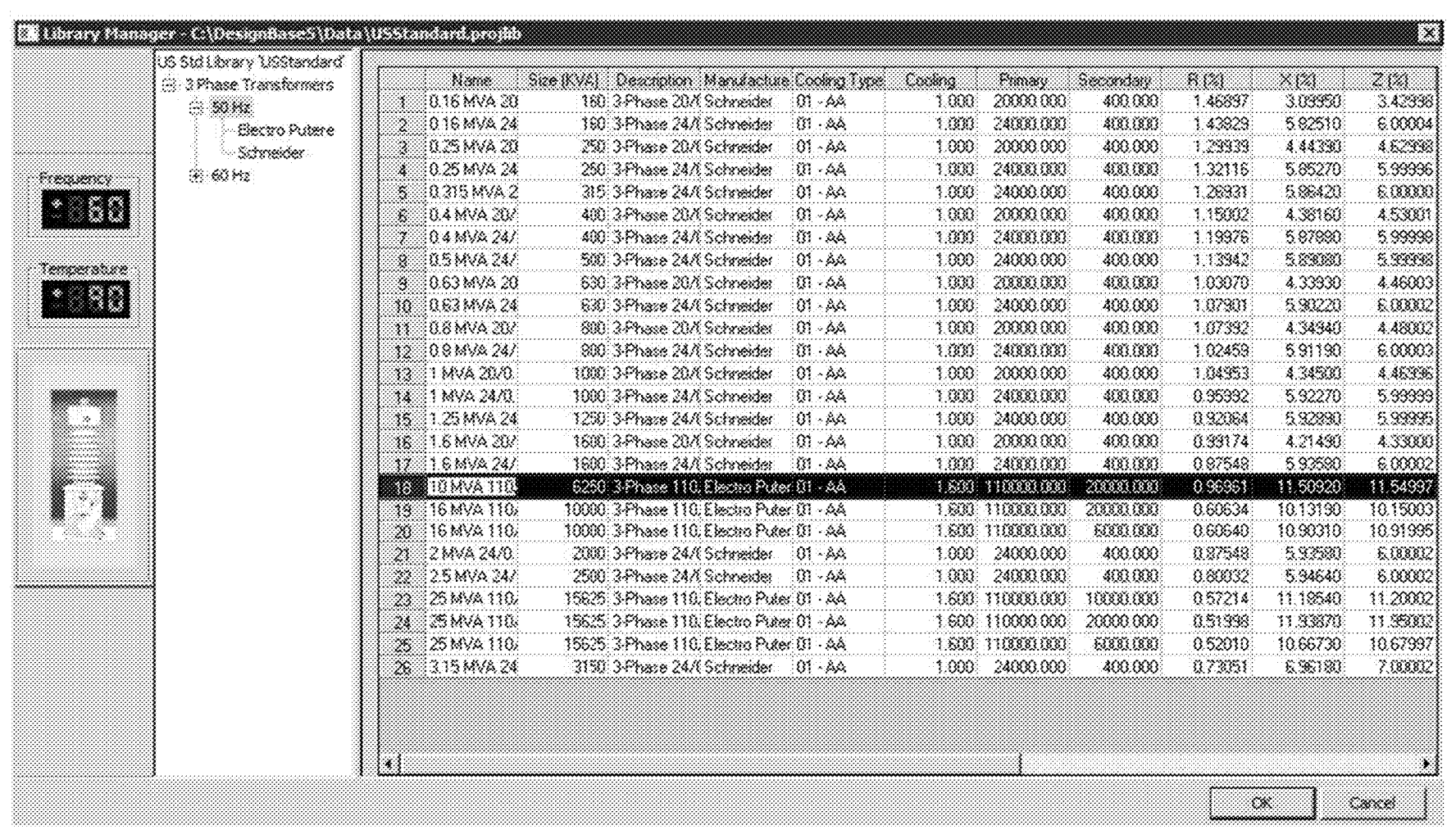

FIG. 47 includes a sample from a grid element library showing a schematic diagram illustrating grid elements and their corresponding specifications, and functionality of the present invention systems and methods for grid element modeling, simulation, design, OEMs or suppliers of the grid elements for commercial purchase or ordering, international equivalents and compatibility, and a participant development program using them. FIG. 48 shows a screenshot GUI diagram illustrating grid elements within a grid element library as in FIG. 47.

Figure 49:
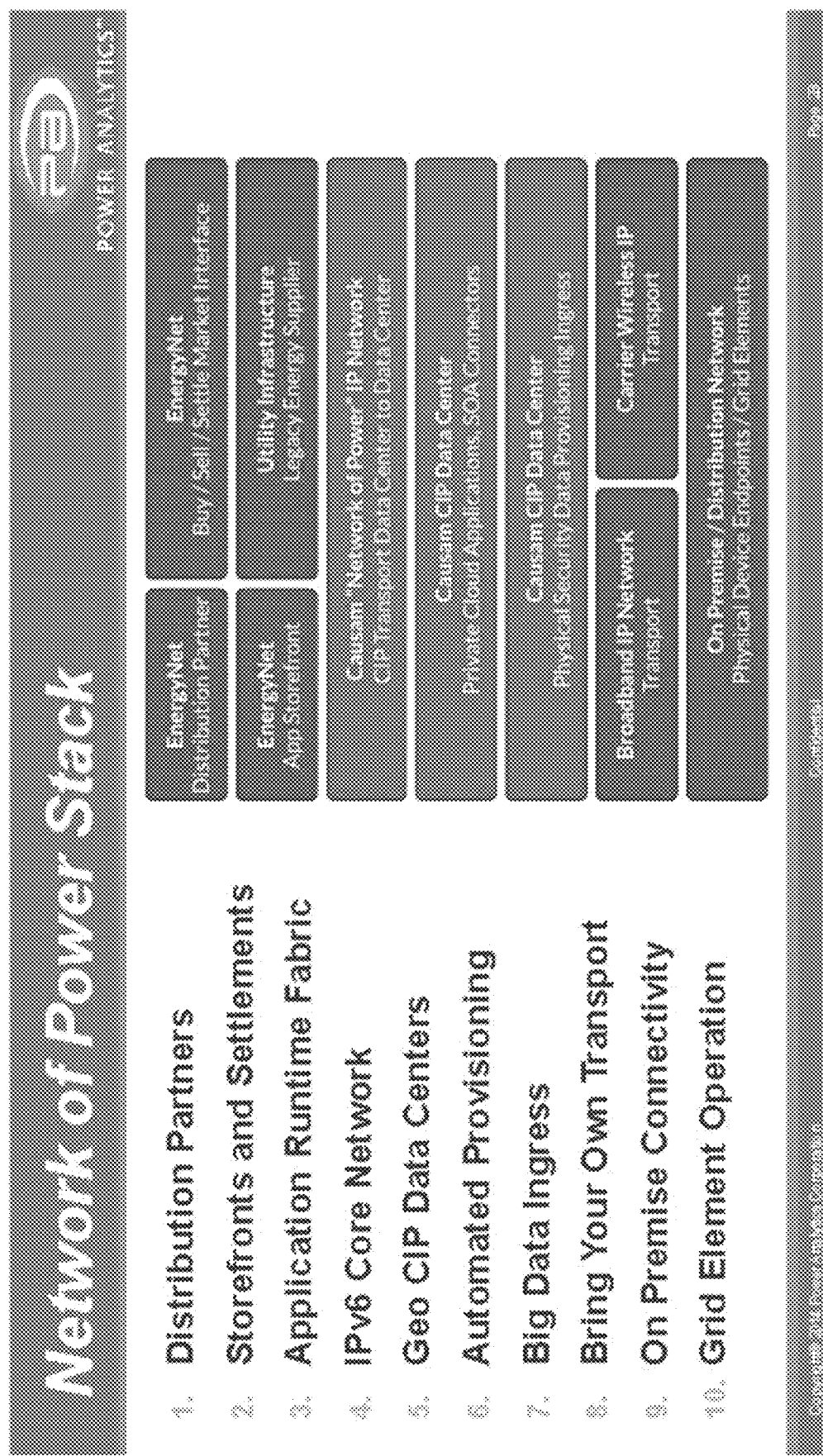
FIG. 49 includes a schematic diagram illustrating an EnergyNet network of power stack.
Figure 50:
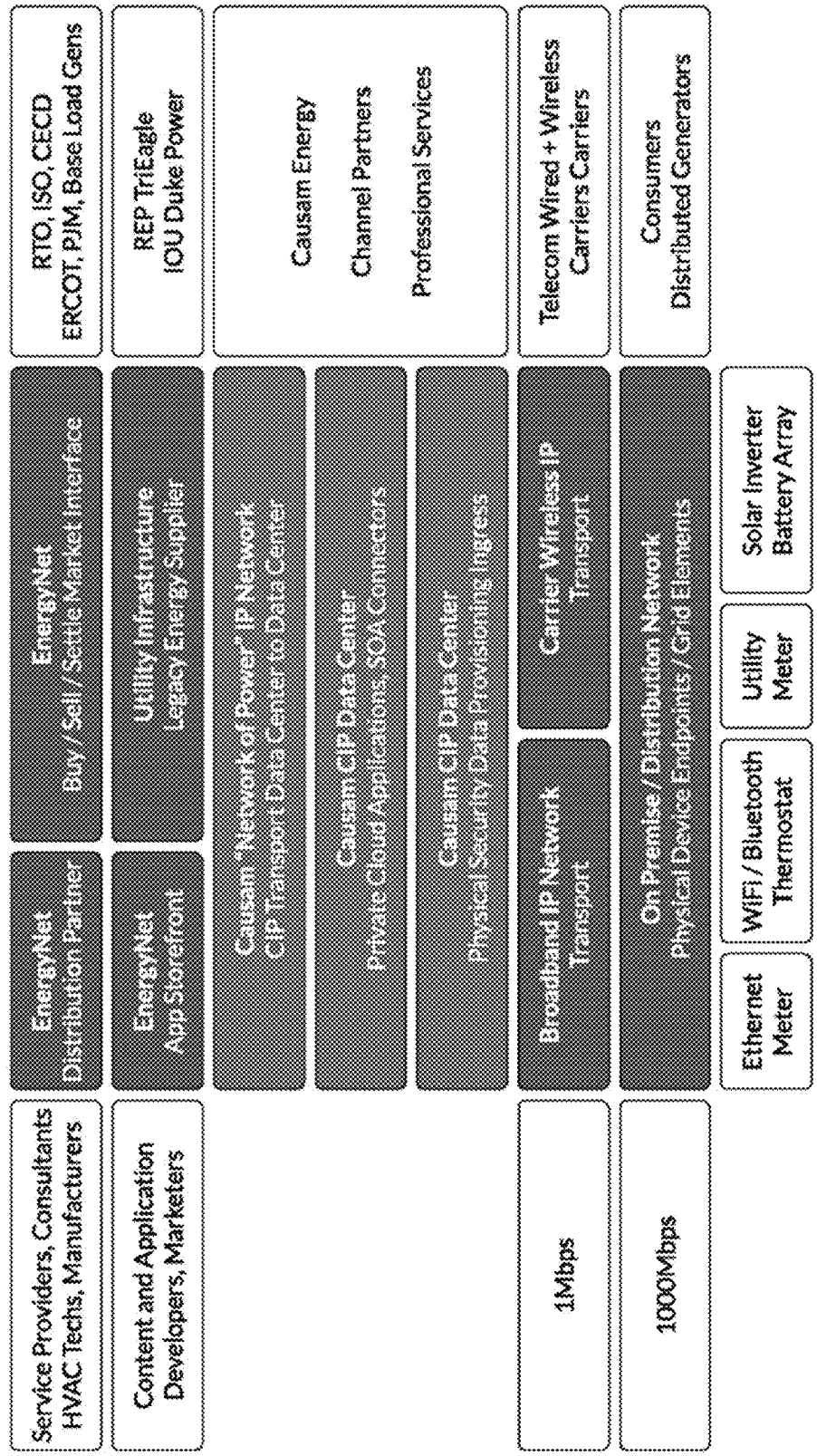
FIG. 50 includes a schematic diagram illustrating an EnergyNet network of power architecture (associated with FIG. 49).

FIG. 49 includes a schematic diagram illustrating an EnergyNet network of power stack including distribution partners, storefronts and settlements, application runtime fabric, IPv6 core network for data communications and messaging and/or data packet transfer, geo CIP data centers, automated provisioning, big data ingress, "bring your own transport", on premise connectivity, and grid element operation. FIG. 50 includes a schematic diagram illustrating an EnergyNet network of power architecture (associated with FIG. 49).

Figure 51:
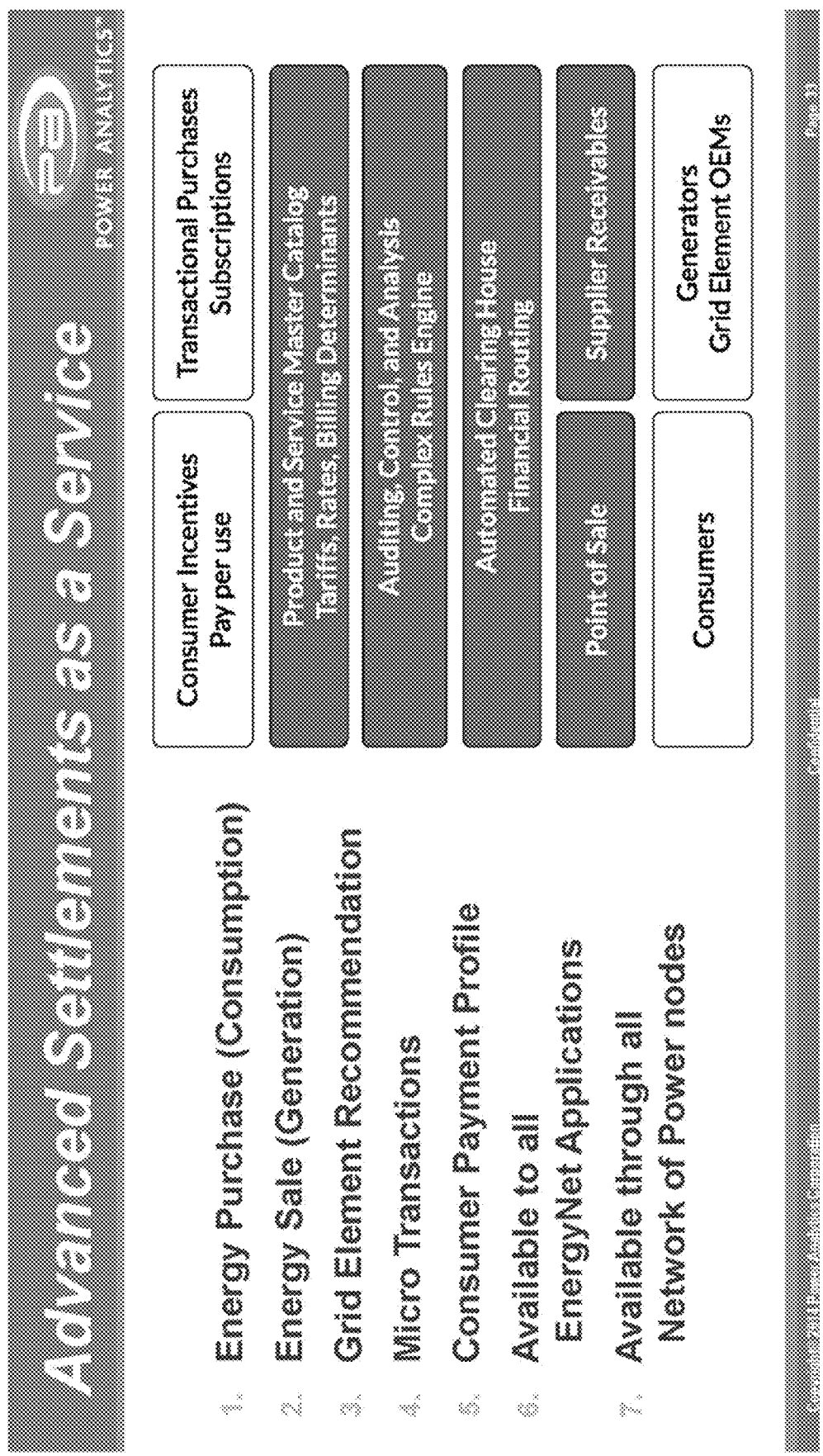
FIG. 51 includes a schematic diagram illustrating advanced energy settlements as a service application for EnergyNet network of power.

By way of example and not limitation, FIG. 51 includes a schematic diagram illustrating advanced energy settlements as a service application for EnergyNet network of power including energy purchase (consumption), energy sale (generation), grid element recommendation, microtransactions, consumer payment profile, "available to all" applications, and available through all network of power nodes within the systems and methods of the present invention.

Figure 52:
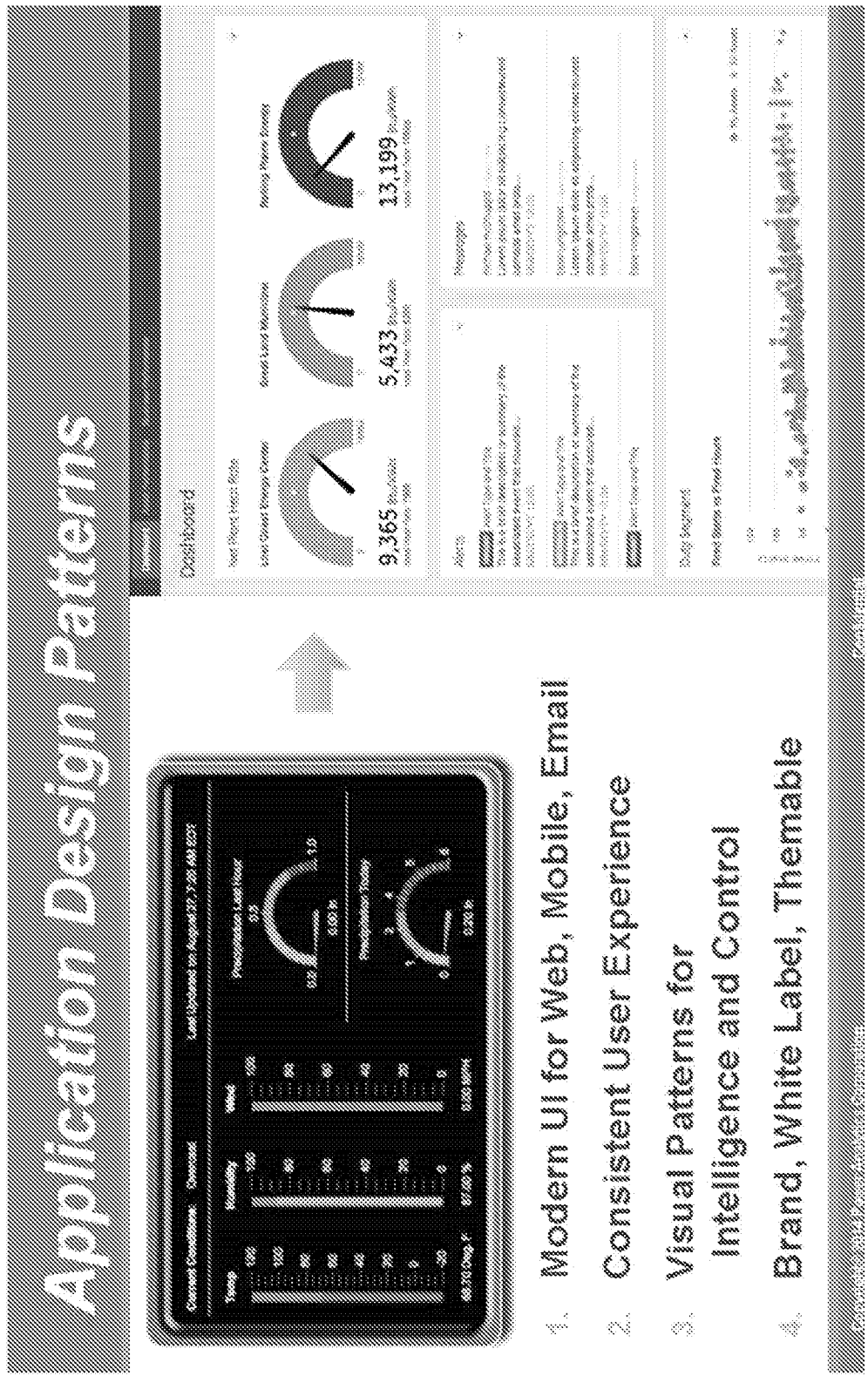
FIG. 52 includes a screen shot diagram illustrating Application Design Patterns and corresponding dashboard GUI.
Figure 53:
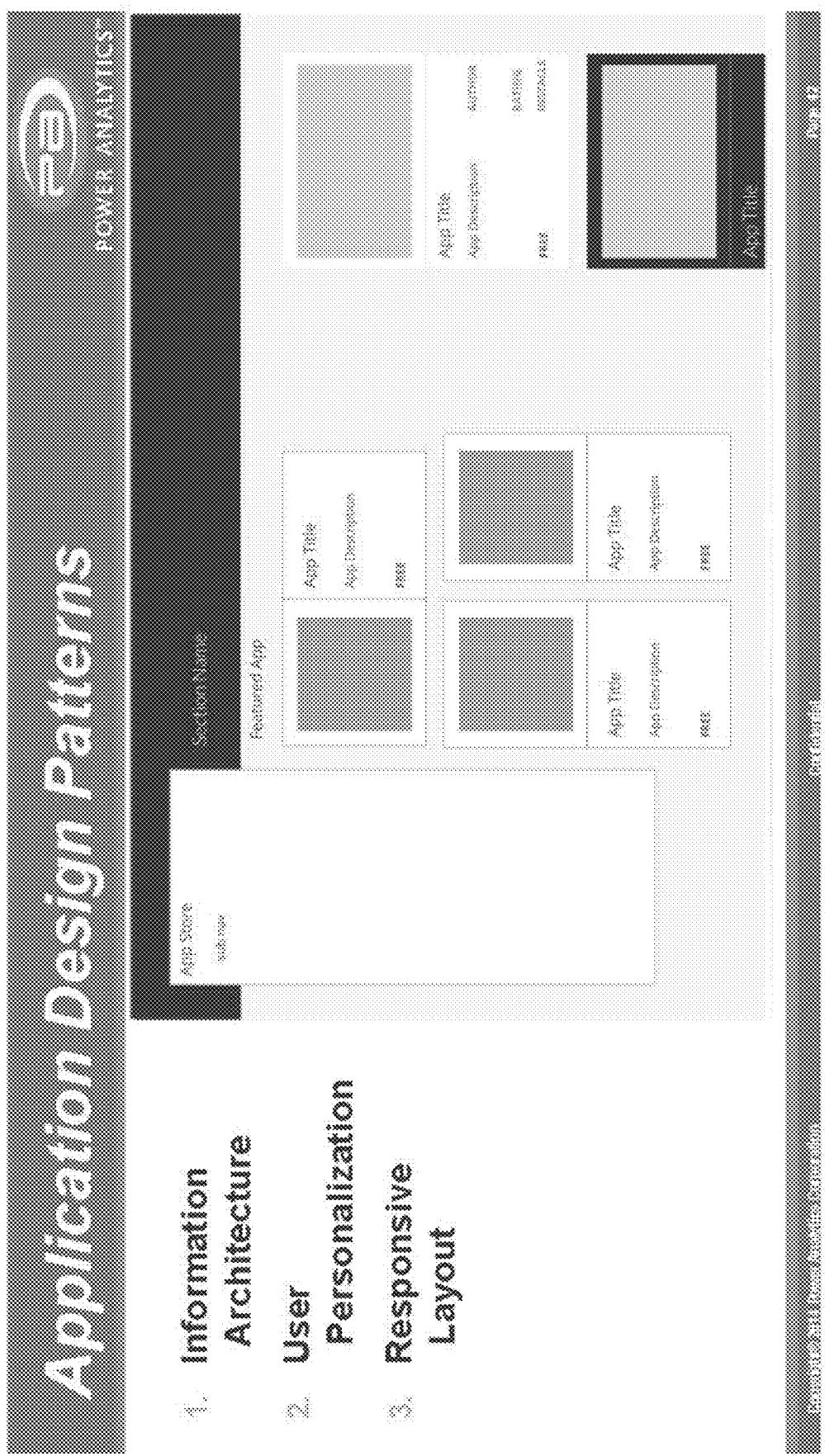
FIG. 53 includes a screen shot diagram illustrating Application Design Patterns and corresponding dashboard GUI.
Figure 54:
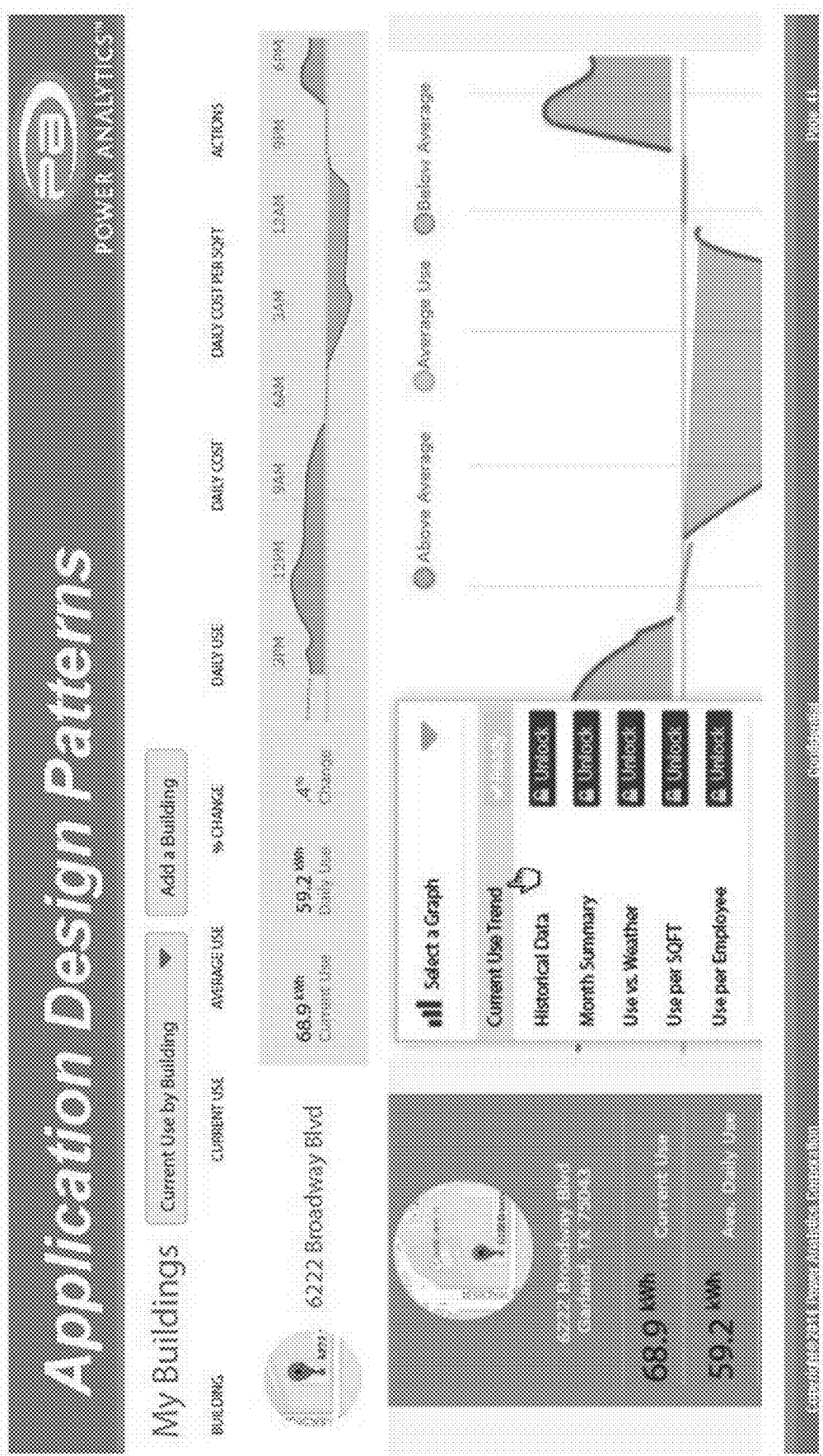
FIG. 54 includes a screen shot diagram illustrating Application Design Patterns and corresponding dashboard GUI showing one example of an App.
Figure 55:
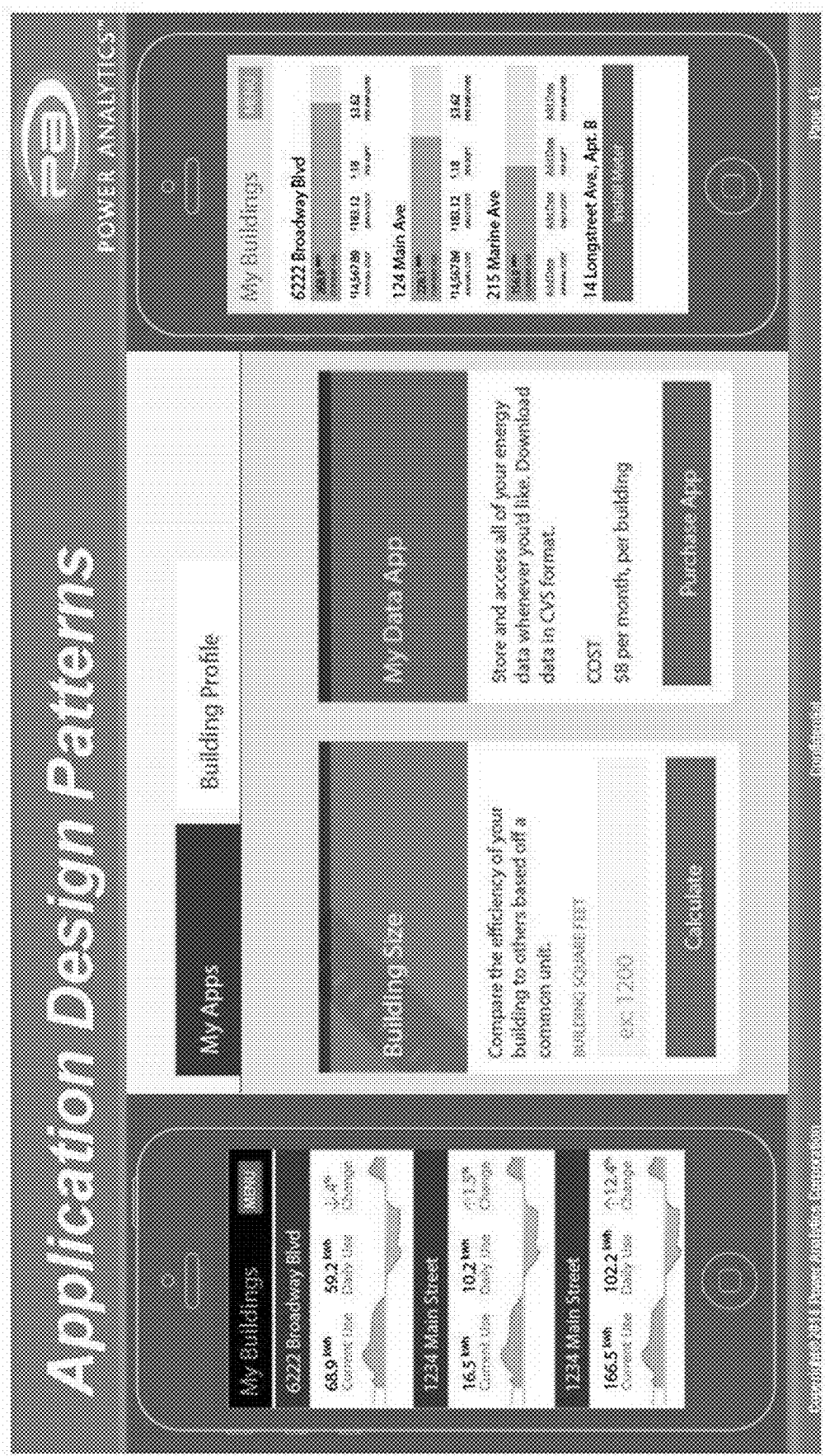
FIG. 55 includes a screen shot diagram illustrating Application Design Patterns and corresponding dashboard GUI showing one example of an App.

Correspondingly, FIG. 52 includes a screen shot diagram illustrating Application Design Patterns and corresponding dashboard GUI having a modern GUI for web, mobile and/or email that provides for consistent user experience within EnergyNet systems and methods, visual patterns for intelligence and controls, wherein the application design patterns within the ADK provide for branding, white labeling, and themable implementation of new Apps. FIG. 53 includes a screen shot diagram illustrating Application Design Patterns and corresponding dashboard GUI showing information architecture, user personalization, and responsive layout with App tiles within the App store offered virtually through the EnergyNet web-based network of power systems and methods. Also, FIG. 54 includes a screen shot diagram illustrating Application Design Patterns and corresponding dashboard GUI showing one example of an App for commercial buildings management within EnergyNet and dashboard options for graph selections that illustrate historical data, electrical power use v. weather, electrical power use per square foot, electrical power use per employee, and combinations for each location. FIG. 55 includes a screen shot diagram illustrating Application Design Patterns and corresponding dashboard GUI showing one example of an App for commercial buildings management within EnergyNet and dashboard options for graph selections and building profile.

Meter data aggregator enables an entity to become REP to collect metrology to take action and recommend changes. The automated system of the present invention includes an automated program (BOT) that is operable to allow an individual, a market participant, etc. to provide utility login or create a utility login, the BOT goes to individual portal, enters ID, obtains bill, reads the bill data. Any data scrape is preferably customer-initiated or customer-approved. Utility retail customers can authorize EnergyNet to run the automated program to query their utility data and billing portals on a regular basis.

Figure 56:
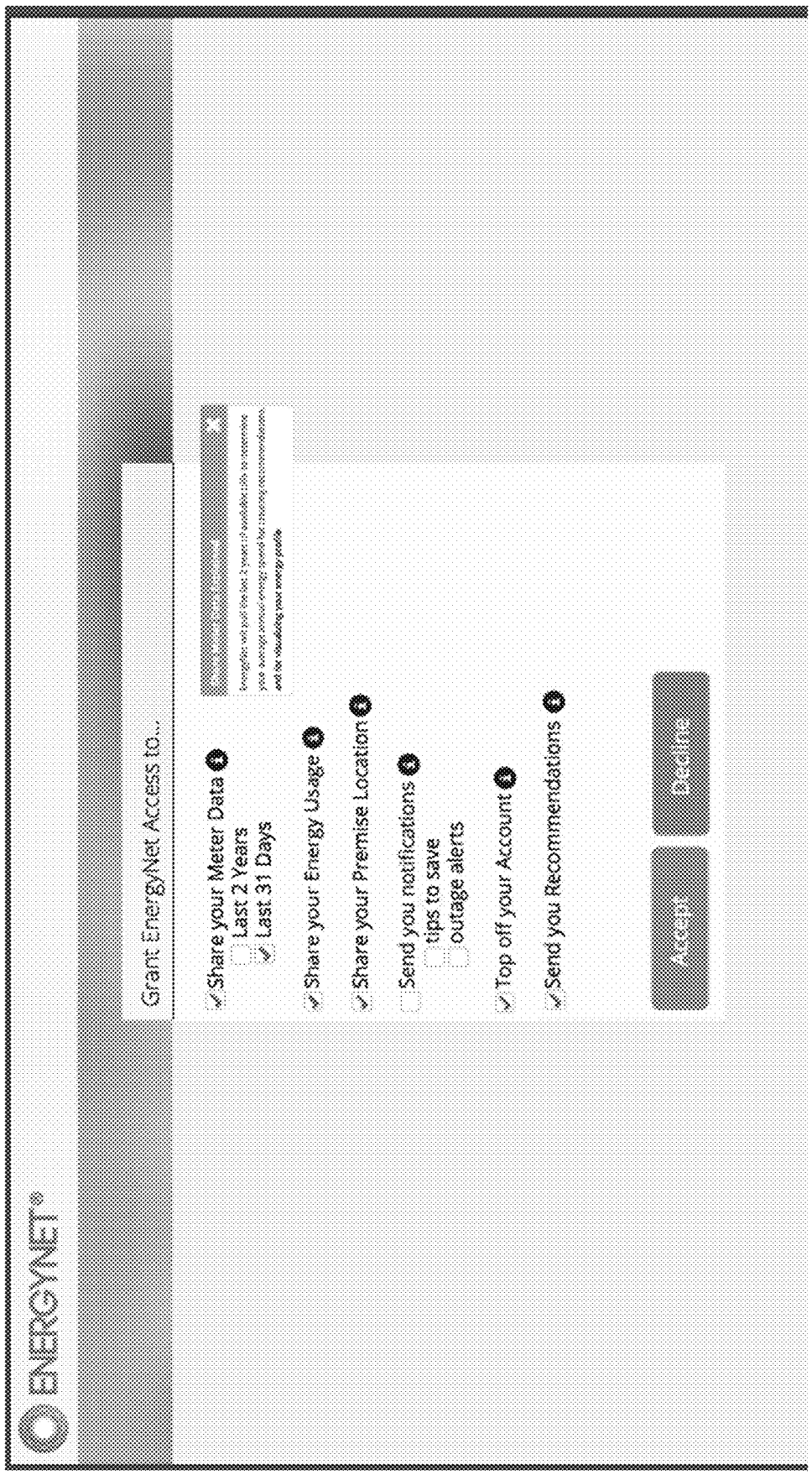
FIG. 56 is a screenshot for customer self-registration.

FIG. 56 is a screenshot for customer self-registration. A utility retail customer self-registers using web browser and authorizes EnergyNet to share meter data, energy usage, location information, notifications, financial automation, and digital recommendations and advice.

Figure 57:
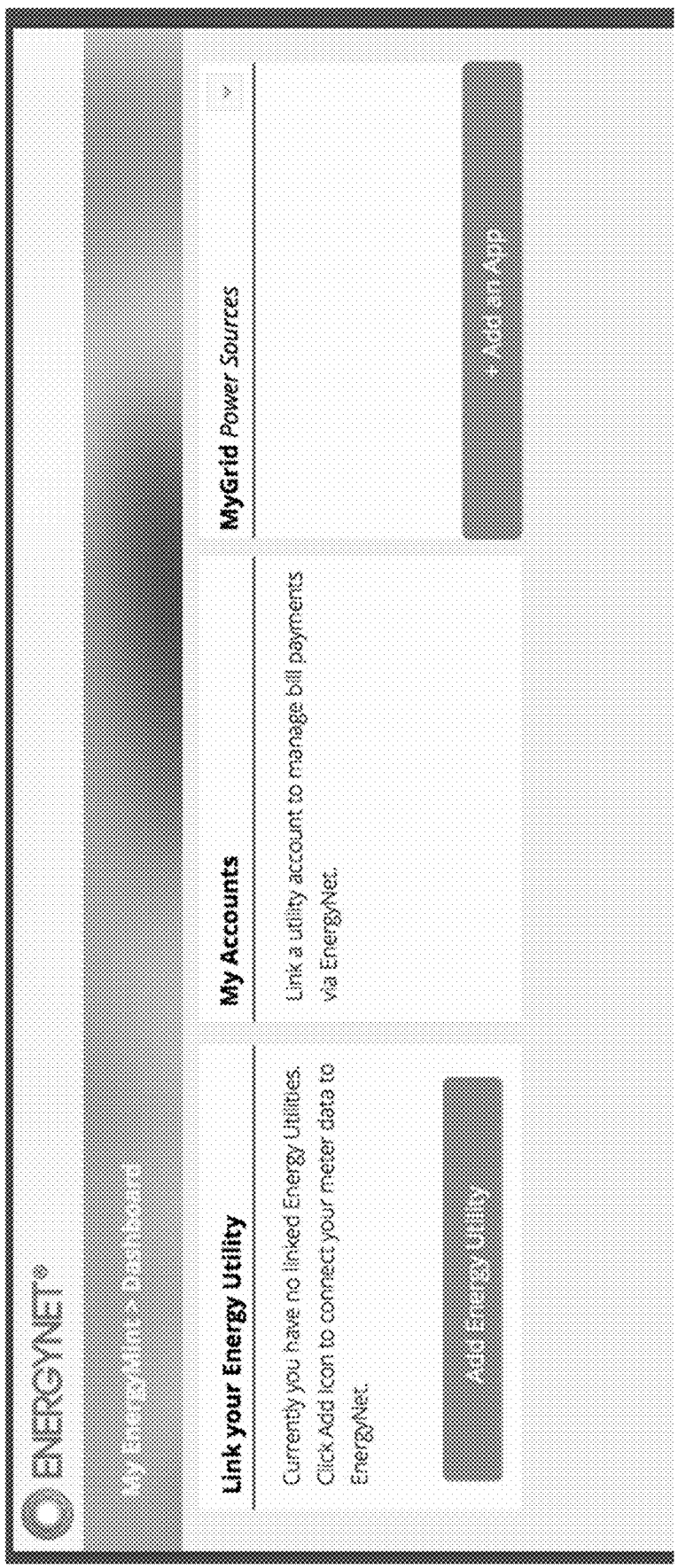
FIG. 57 is a screenshot for customer account interface.
Figure 58:
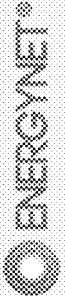
FIG. 58 is a screenshot for Link your Energy Utility.
Figure 59:
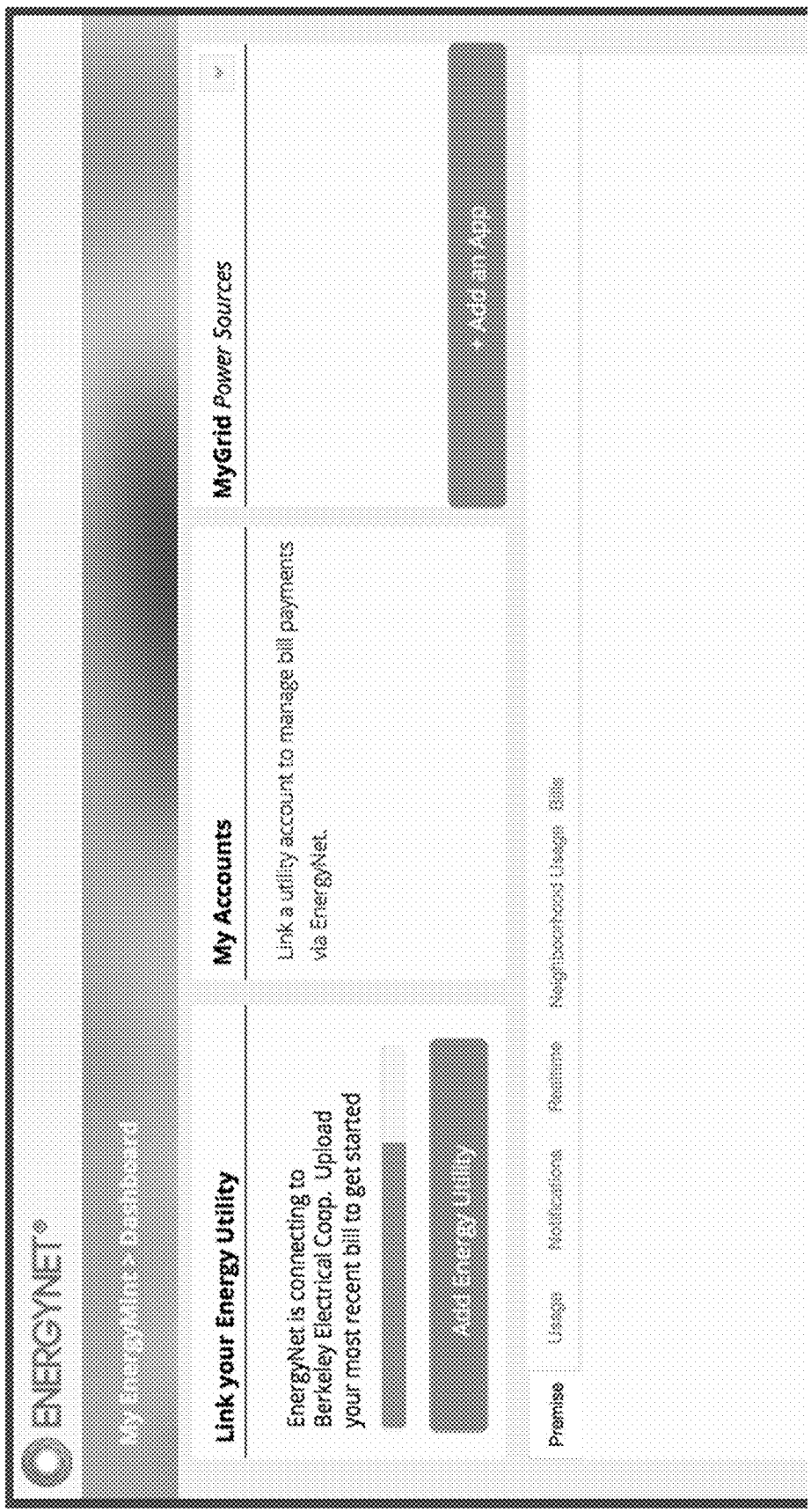
FIG. 59 is a screenshot for the progress for Link your Energy Utility.
Figure 60:
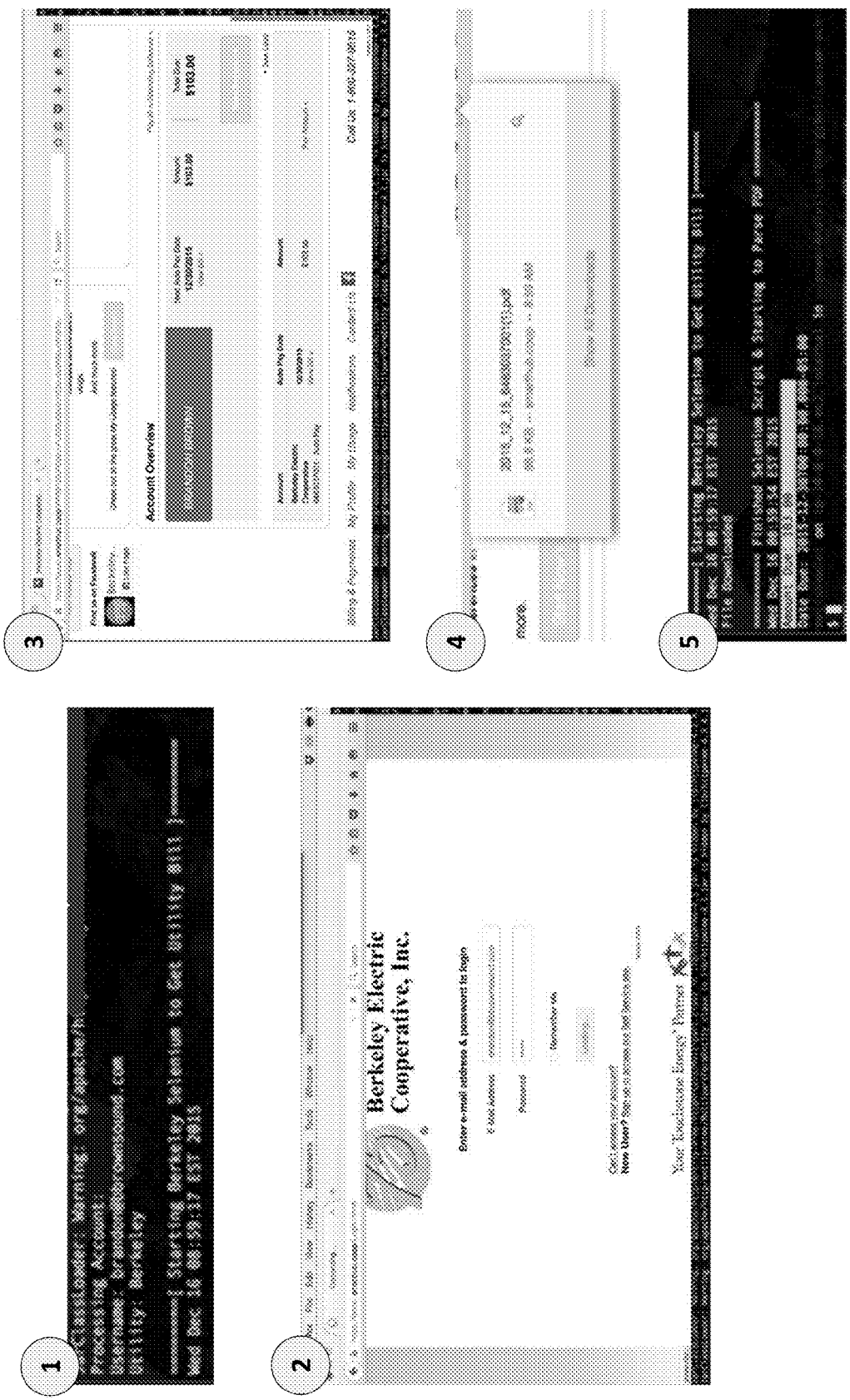
FIG. 60 is an illustration of an automated software process to query a utility portal.
Figure 61:
FIG. 61 is a screenshot for premise information from an added utility account.
Figure 62:
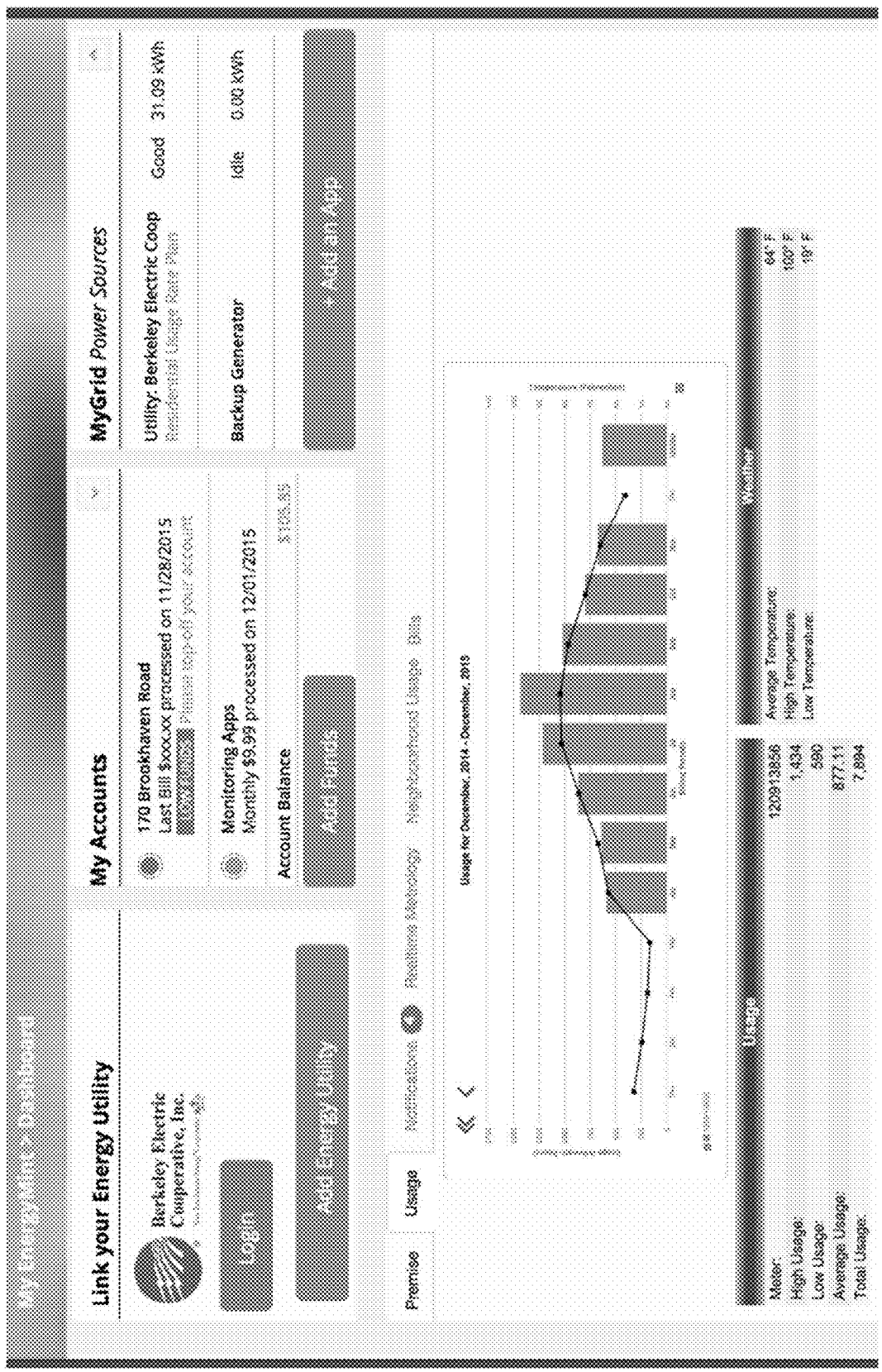
FIG. 62 is a screenshot for usage information from an added utility account.
Figure 63:
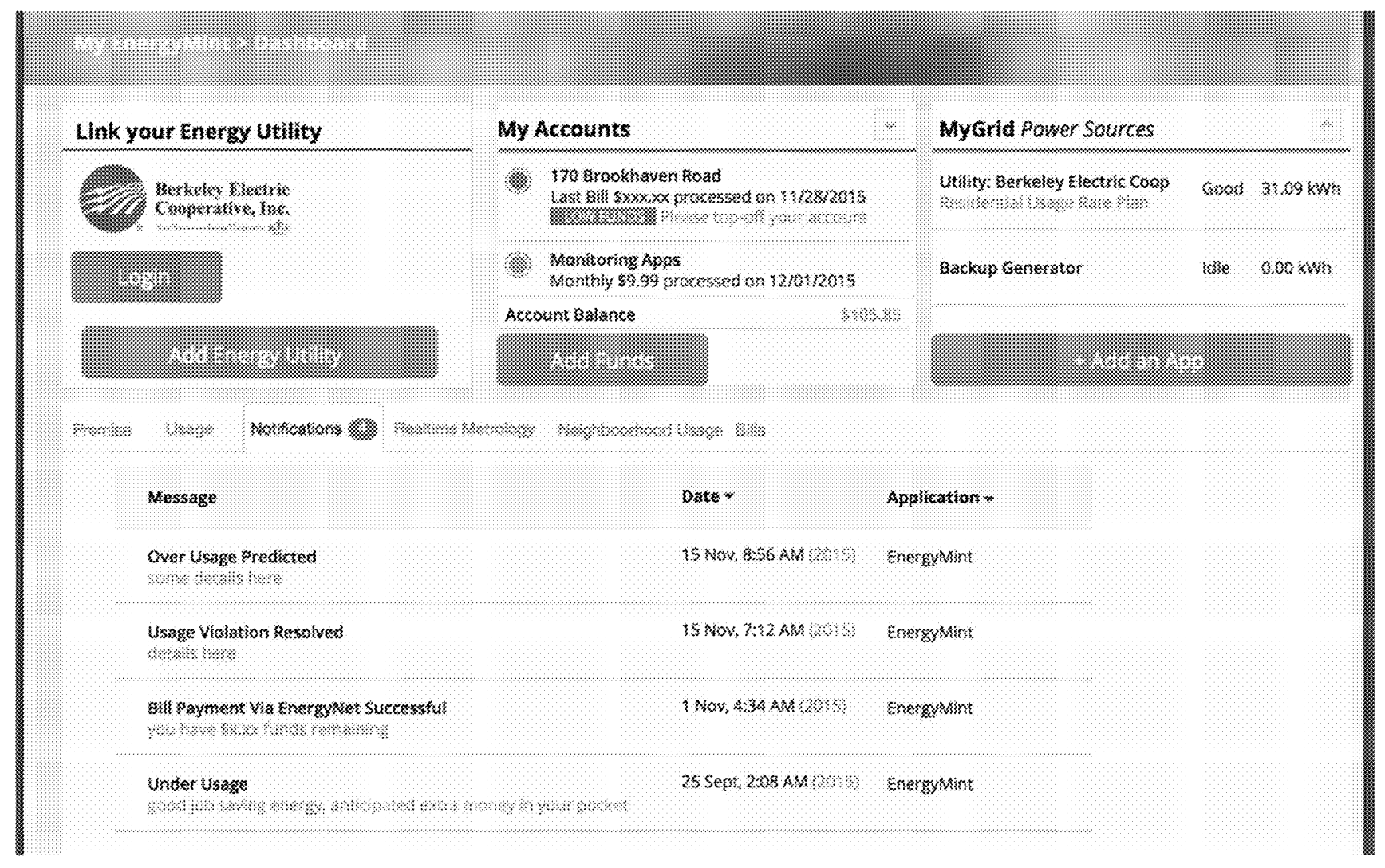
Figure 64:
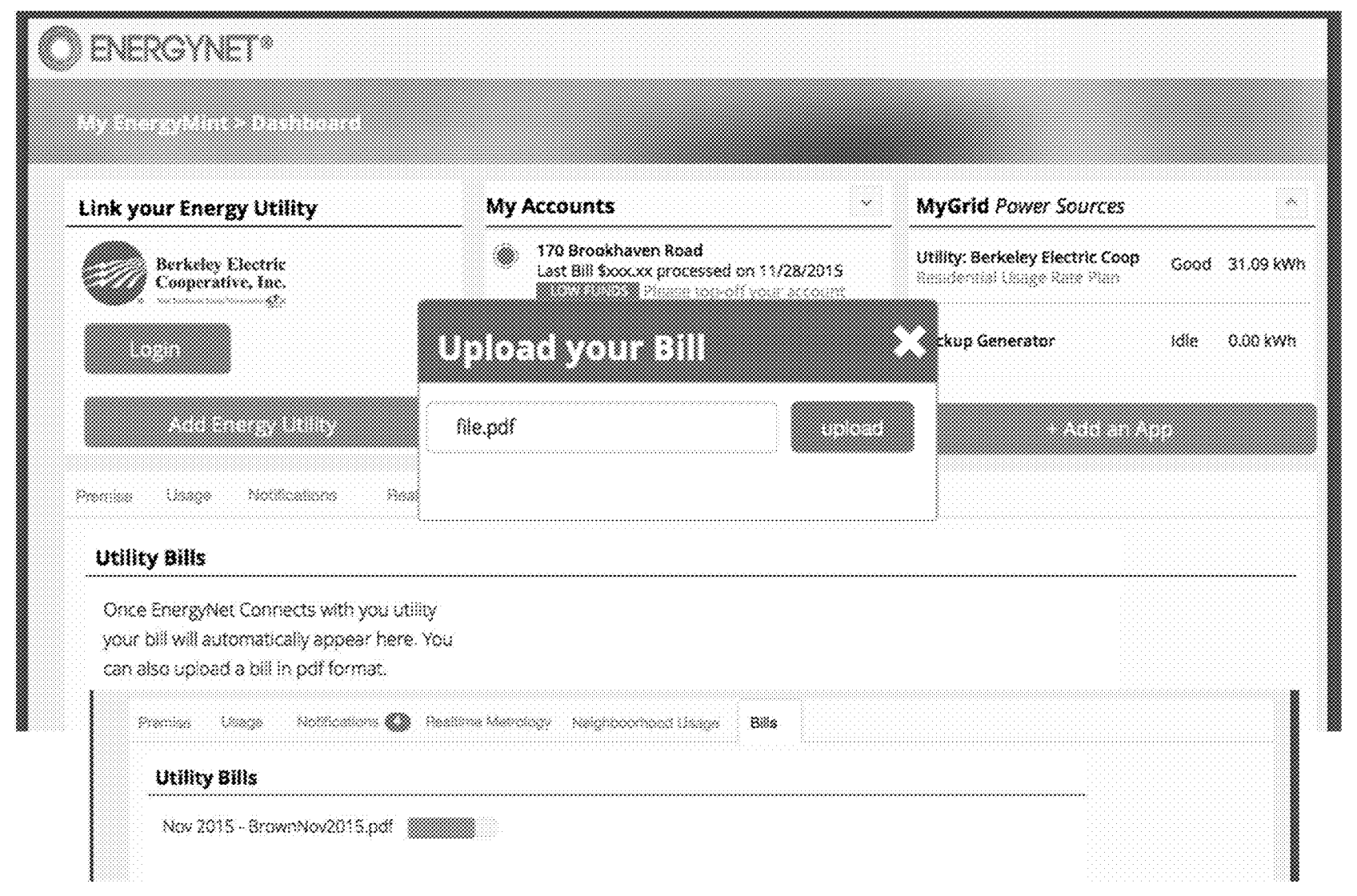

FIG. 57 is a screenshot for customer account interface. A utility retail customer has a new account, and is prompted to Add Energy Utility or Add an App. Many apps require some meter data to be associated with the user account. Adding your Energy Utility is a quick method of importing current and historical utility metering, invoicing, and tariff information. FIG. 58 is a screenshot for Link your Energy Utility. A utility retail customer is prompted to choose their utility and provide login information. FIG. 59 is a screenshot for the progress for Link your Energy Utility. A utility retail customer is shown a progress indicating that a back end software process is communicating with the utility portal on the user's behalf. FIG. 60 is an illustration of an automated software process to query a utility portal. This automated software process is authorized on behalf of a utility retail customer. The process starts on a regular schedule, authorized for a user account on a utility portal. The process then logs into the utility portal automatically via a web browser; visit an invoice list over the utility portal, downloads all PDF documents and invoices; and parses invoices for amount due and date. FIG. 61 is a screenshot for premise information from an added utility account. When a customer's utility account is successfully linked, the latest invoice, rate plan, customer information, and premise/service location information is automatically imported into the customer's EnergyNet secure account and profile. FIG. 62 is a screenshot for usage information from an added utility account. Once a customer's utility account is successfully linked, the customer has access to new trends, metrics, and analysis of data from their utility. FIG. 63 is a screenshot for notification information from an added utility account. Once a customer's utility account is successfully linked, the customer has alarms, recommendations, and notifications based on utility invoice and meter data feed. FIG. 64 is a screenshot for bill information from an added utility account. Once EnergyNet connects with a customer's utility account, the customer's bill will automatically appear. The customer can upload a historical or one-off PDF bill directly without providing utility login.

Figure 65:
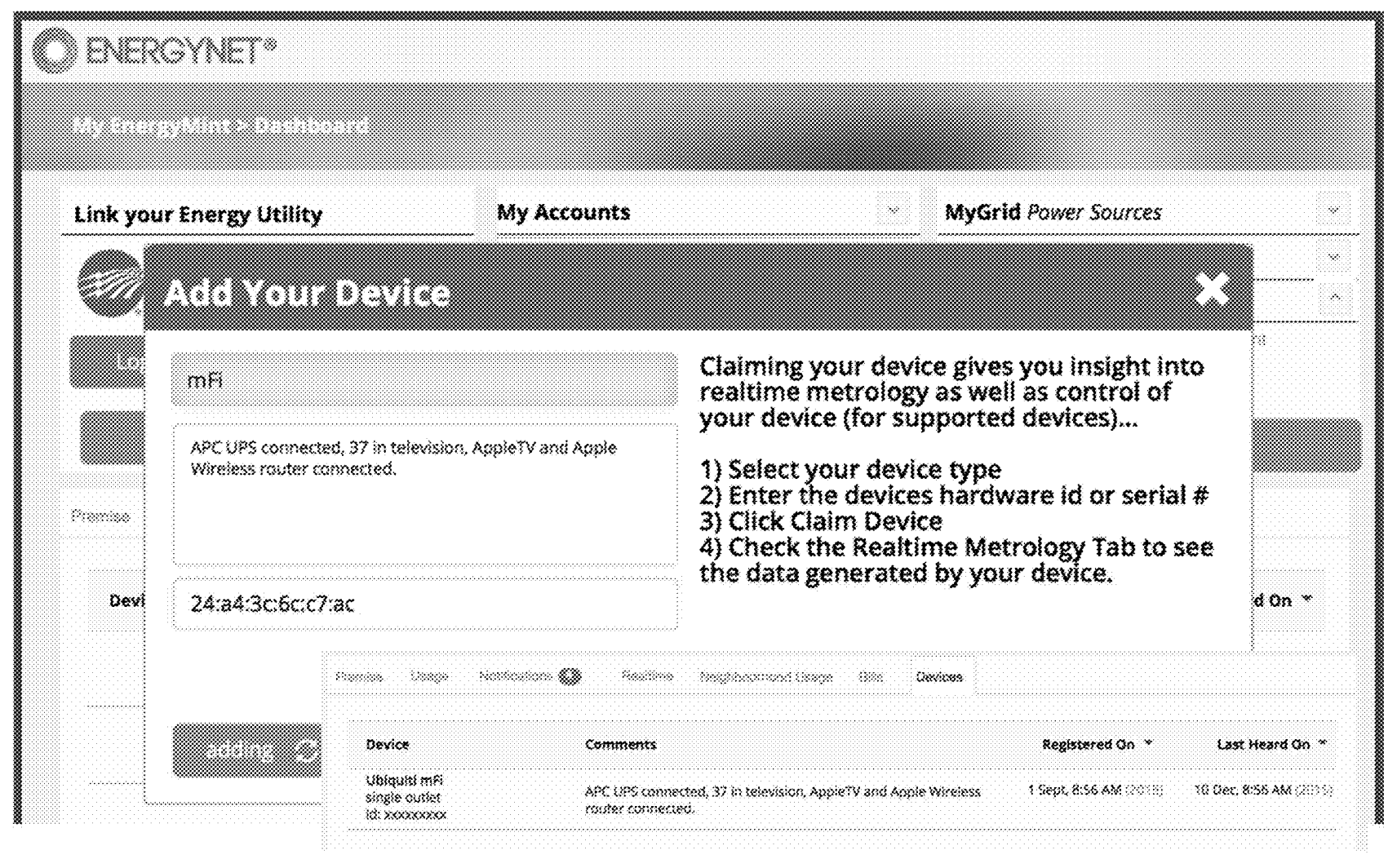

FIG. 65 is a screenshot for Add Your Device via EnergyNet. Once a customer installs a new grid element device and connects to network, the customer can claim the ownership of the new device via EnergyNet portal using hardware MAC address identifier. Claiming the ownership of a device gives a customer sight into real-time metrology as well as control of the device.

In embodiments of the present invention systems and methods, the account, consumer, and/or user profile(s) preferably includes a unique user identifier or identification, such as, by way of example and not limitation, a username and password. Further information is preferably provided, including an account identifier, user financial account information, utility and/or market participant account information, geodetic information such as smartphone location identifier (such as GPS-based location information, RFID, and/or near-field communication identifier), which is preferably communicated wirelessly over network-based communication to the server computer and/or processor with memory associated with the account for advanced energy settlements, and/or communicated with user of optical bar code, QR code, Digital Radio, Radio Frequency Identification, Optical Pattern Matching, etc. Additional information may optionally be associated and/or stored with the consumer profile, and communicated via the network, including historical data relating to energy consumption, status, supply systems (by way of example and not limitation, back-up power supply, generator(s), battery, alternative energy such as solar, wind, etc., smartphone transactions relating to energy-affected activities, history of purchases made for products and/or services, history of offers and responses made for products and/or services, and combinations thereof. At least one message included with the GUI preferably includes information about electric power supply pricing and corresponding plan alternatives associated with advanced energy settlements; additional advertising and offers for products and/or services may be provided via the GUI based upon the corresponding profile for the user and/or account, opt-in/opt-out inputs, and combinations thereof. Preferably, market pricing conditions via a customer profile that can be loaded to a computer, smart phone, tablet, or any web-enabled appliance for accepting or modifying a profile or moreover a profile that automated controls based upon previously selected economic messages. In a further embodiment, energy consumption patterns within active grid elements profiles could be used to identify opportunities for up selling, down selling, or cross selling. These opportunities may be determined by the power utility or market participant, REP, and/or by affiliates, partners, or advertisers. Data from active grid elements profiles associated with the user and/or account (including historical data, real-time data, and/or projected or predicted future data) may be used to provide insights on inefficient devices, defective devices, or devices that require updating to meet current standards, and/or products and services corresponding or complementary to the active grid elements or the user/account. Active grid elements profiles data, individually or collectively (or selectively) in the aggregate, performance and/or participation, actions or activities, may also be used to identify related power grid participation opportunities. Data from consumer purchase and marketing activities may be used to provide insights on inefficient merchants or service providers.

By way of example and not limitation, consider the design, specification, construction, and management of a data center or microgrid. GUI, icons, and/or visual representations or symbols of grid elements (Grid Element Icons—GEIs) are provided by the system and methods of the present invention, and associated with corresponding data for each of the grid elements stored in a grid element library or virtual or digital catalog. The grid element data may be provided by corresponding grid element suppliers, equipment manufacturers, distributors, historical data from user/account (including but not limited to grid element purchases, acquisitions, grid element activations for registration with the electric power grid, etc.), publicly available data from the internet, proprietary data, and/or custom-generated data. Preferably, the GUIs are selectable by a remote user on a computer having a display and interactive graphic user interface for making a digital design for a data center. The GUIs may be click-selected and/or by drag-and-drop selection from the grid element library to the design layout or schematic diagram, as illustrated on FIG. 14.

The active grid elements within an electric power grid (or off the grid in alternative embodiments) operate to receive information automatically through a plurality of methods utilizing IP-based communications methods and web based devices such as in car computers, smart phones, computers, text messages, paging messages, or even voice response units or live customer service agents. Under a real time scenario, active grid elements could dynamically "Opt In" to a pre-determined profile or "Opt Out" or more importantly change the profile dynamically to take advantage of real time market pricing of electricity being sold by the utility, market participant, REP or any entity authorized to buy, sell and trade electric commodity or demand response products on behalf of the owner. Control activity including messaging for changing account and/or grid element settings, profile, functionality, and combinations thereof is also provided; analytics are included as well. Event-based messaging is also provided. In one embodiment, electric power is supplied through non-islanded microgrid or cogeneration. The settlement is independent of utility. Transformers are functioning like diodes; current flowing through the branch is stopped. The advanced EnergyNet settlement platform matches load and supply as long as not exceeding limitations of the leg. The flow of power is stopped that is being measured by utility revenue grid meter by TDSP. In another embodiment, still with utility connected microgrid, but the advanced EnergyNet settlement platform can run bilateral transaction that is settled as described herein within. Add FERC Order No. 2003 and No. 2006 are incorporate by reference in entirety herein. The systems and methods of the present invention further provide for Analyzing the control activity, responses to the controls (for example like Google adwords so that when a marketing message is provided, then there is compensation for the messaging like Google adwords), e.g., least cost provider for recharging mobile electric power storage and/or EVs; whoever plugs in also is preferably connected to the financial settlement network associated with the mobile app and/or charging terminal, which may further include a marketing database, so that as the consumer is reviewing possible opportunities. The system includes AES messaging and/or payment to clear the messages and/or data packet transmission, and for delivering the marketing message, and the analytics over the marketing message including but not limited to open rate, response rate, referral rate, purchase conversion rate.

In one embodiment of the present invention, the EV app and GUI provide for targeted mobile and in-car advertising, including recommended or suggested Apps, products, and/or services offered within the EnergyNet network of power system to the user, entity, and/or consumer based upon the consumer profile, in particular where the consumer has authorized information to be shared or used for purposes other than for EV charging at any given time.

While the foregoing description of preferred embodiments illustrates the applications for EVs as automobiles, the present invention further includes other EV applications, including but not limited to trucks, transport vehicles, boats and boat marinas, and the like, and mobile battery charging for portable storage of electric power. Also, the present invention for EV automobiles applies to private residence and/or private parking facilities, as well as fixed and temporary public EV charging including but not limited to hotels, public parking slips or spots, public parking in garage settings, corporate parking, event venue parking, temporary parking, overflow parking, etc.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

What is claimed is:

1. A system for facilitating electric power grid transactions, comprising:
a server platform in network communication with at least one distributed energy resource (DER) and at least one grid element;
wherein the server platform is operable to create a profile for the at least one grid element;
wherein the server platform is operable to receive a power purchase offering from the at least one DER, wherein the power purchase offering includes power available for purchase;
wherein the server platform is operable to match the at least one DER to the at least one grid element for consumption of power by the at least one grid element based on the power purchase offering and the profile for the at least one grid element;
wherein the at least one DER provides power to the at least one grid element;
wherein the server platform is operable to collect revenue grade energy data from the at least one DER, wherein the revenue grade energy data is related to the power provided to the at least one grid element;
wherein the revenue grade energy data is measured in real time; and
wherein the server platform is further operable to automatically collect payment for the consumption of power by the at least one grid element, wherein the payment for the consumption of power by the at least one grid element is based on the revenue grade energy data.

2. The system of claim 1, wherein the server platform is operable to aggregate the revenue grade energy data into at least one settlement block and map the at least one settlement block to at least one power purchase agreement associated with the power purchase offering.

3. The system of claim 1, wherein the revenue grade energy data is measured in real time through submetering technology.

4. The system of claim 1, wherein the revenue grade energy data is incorporated into a settlement block, and wherein the settlement block includes a cost for power lost due to line losses.

5. The system of claim 1, wherein the revenue grade energy data is measured by at least one smart meter.

6. The system of claim 1, wherein the server platform receives the revenue grade energy data via an Internet Protocol (IP)-based message.

7. The system of claim 1, wherein the payment for the consumption of power by the at least one grid element is provided through a clearing house.

8. The system of claim 1, wherein the power available for purchase is provided through power generation by the at least one DER or through curtailment of power consumption by the at least one DER.

9. The system of claim 1, wherein the profile includes a demand profile, and wherein the demand profile is operable to be changed dynamically to increase consumption of the power available for purchase from the at least one DER.

10. The system of claim 1, wherein the at least one DER comprises a multiplicity of DERs, wherein the server platform ranks the multiplicity of DERs based on the profile of the at least one grid element, wherein the profile of the least one grid element includes cost, payment preference, and locality.

11. The system of claim 1, wherein the at least one DER includes an electric vehicle or a generator.

12. A system for facilitating electric power grid transactions, comprising:
a server platform in network communication with at least one distributed energy resource (DER) and at least one grid element;
wherein the server platform is operable to create a profile for the at least one grid element;

wherein the server platform is operable to receive a power purchase offering from the at least one DER, wherein the power purchase offering includes power available for purchase;

wherein the server platform is operable to match the at least one DER to the at least one grid element for consumption of power by the at least one grid element based on the power purchase offering and the profile for the at least one grid element;

wherein the server platform is operable to collect energy data from the at least one DER via at least one Internet Protocol (IP)-based message; and wherein the profile includes a demand profile, and wherein the demand profile is operable to be changed dynamically to increase consumption of the power available for purchase from the at least one DER.

13. The system of claim 12, wherein payment for the consumption of power by the at least one grid element is provided on a kilowatt packet (kWp) settlement timeline.

14. The system of claim 12, wherein the at least one DER comprises a multiplicity of DERs, wherein the server platform ranks the multiplicity of DERs based on the profile of the at least one grid element, wherein the profile of the least one grid element includes cost, payment preference, and locality.

15. The system of claim 12, wherein the server platform is operable to receive a power supply offering from the at least one grid element, wherein the at least one grid element provides the power supply offering through power generation or curtailment of power consumed by the at least one grid element.

16. The system of claim 12, wherein the server platform is operable to store and organize packet level information for forecasting, data mining, revenue extraction, event detection, sophisticated energy management and enterprise integration.

17. A method for facilitating electric power grid transactions, comprising:

a server platform creating a profile for at least one grid element;

the server platform receiving a power purchase offering from the at least one DER, wherein the power purchase offering includes power available for purchase;

the server platform matching the at least one DER to the at least one grid element for consumption of power by the at least one grid element based on the power purchase offering and the profile for the at least one grid element;

the server platform causing the at least one DER to provide power to the at least one grid element;

the server platform receiving revenue grade energy data from the at least one DER, wherein the revenue grade energy data is related to the power provided to the at least one grid element;

the server platform automatically collecting payment for the consumption of power by the at least one grid element;

wherein the payment for the consumption of power by the at least one grid element is based on the revenue grade energy data; and wherein the revenue grade energy data is measured in real time.

18. The method of claim 17, wherein the server platform receives the revenue grade energy data via an Internet Protocol (IP)-based message.

19. The method of claim 17, wherein the profile includes a demand profile, and further comprising dynamically changing the demand profile to increase consumption of the power available for purchase from the at least one DER.

20. The method of claim 17, wherein the at least one DER comprises a multiplicity of DERs, further comprising the server platform ranking the multiplicity of DERs based on the profile of the at least one grid element, wherein the profile of the least one grid element includes cost, payment preference, and locality.

* * * * *